US012551463B2

(12) United States Patent
Brandhuber et al.

(10) Patent No.: US 12,551,463 B2
(45) Date of Patent: Feb. 17, 2026

(54) DOSING OF A BRUTON'S TYROSINE KINASE INHIBITOR

(71) Applicant: Loxo Oncology, Inc., Indianapolis, IN (US)

(72) Inventors: Barbara Jean Brandhuber, Golden, CO (US); Nora Chien Yee Ku, Woodside, CA (US); Nisha Nanda, San Francisco, CA (US); Steven August Smith, San Jose, CA (US); Donald Tsai, Springfield, PA (US)

(73) Assignee: LOXO ONCOLOGY, INC., Indianapolis, IN (US)

( * ) Notice: Subject to any disclaimer, the term of this patent is extended or adjusted under 35 U.S.C. 154(b) by 768 days.

(21) Appl. No.: 17/782,758

(22) PCT Filed: Dec. 3, 2020

(86) PCT No.: PCT/US2020/063089
§ 371 (c)(1),
(2) Date: Jun. 6, 2022

(87) PCT Pub. No.: WO2021/113497
PCT Pub. Date: Jun. 10, 2021

(65) Prior Publication Data
US 2023/0041515 A1    Feb. 9, 2023

Related U.S. Application Data

(60) Provisional application No. 63/109,698, filed on Nov. 4, 2020, provisional application No. 63/077,996, filed on Sep. 14, 2020, provisional application No. 62/944,674, filed on Dec. 6, 2019.

(51) Int. Cl.
| | |
|---|---|
| *A61K 31/4155* | (2006.01) |
| *A61K 9/00* | (2006.01) |
| *A61K 9/20* | (2006.01) |
| *A61K 9/48* | (2006.01) |
| *A61P 35/02* | (2006.01) |

(52) U.S. Cl.
CPC ........ *A61K 31/4155* (2013.01); *A61K 9/0053* (2013.01); *A61K 9/20* (2013.01); *A61K 9/48* (2013.01); *A61P 35/02* (2018.01)

(58) Field of Classification Search
CPC .... A61K 31/4155; A61K 9/0053; A61K 9/20; A61K 9/48; A61P 35/02
See application file for complete search history.

(56) References Cited

U.S. PATENT DOCUMENTS

| | | | |
|---|---|---|---|
| 7,514,444 B2 | 4/2009 | Buggy et al. | |
| 10,342,780 B2 | 7/2019 | Guisot | |
| 10,464,905 B2 | 11/2019 | Guisot | |
| 10,695,323 B2 * | 6/2020 | Guisot | C07D 403/04 |
| 10,918,622 B2 | 2/2021 | Guisot | |
| 11,471,441 B2 | 10/2022 | Guisot | |
| 2021/0330643 A1 | 10/2021 | Brandhuber et al. | |
| 2022/0062239 A1 | 3/2022 | Guisot | |

FOREIGN PATENT DOCUMENTS

| | | | |
|---|---|---|---|
| EA | 018573 B1 | 9/2013 | |
| JP | 2018538307 T2 | 12/2018 | |
| WO | 2014/068527 A | 5/2014 | |
| WO | 20170103611 | 6/2017 | |
| WO | WO-2017103611 A1 * | 6/2017 | ........... A61K 31/415 |
| WO | 2017/218844 A2 | 12/2017 | |
| WO | 20180192462 A1 | 10/2018 | |
| WO | 20190020606 A1 | 1/2019 | |
| WO | 20200028258 A1 | 2/2020 | |

OTHER PUBLICATIONS

Federico, Massimo, et al. "Prognostic factors in low-grade non-Hodgkin lymphomas." Current hematologic malignancy reports 4.4 (2009): 202-210. (Year: 2009).*
Abrisqueta, P. et al. From genetics to therapy: unraveling the complexities of Richter transformation in chronic lymphocytic leukemia Cancer Treat Rev., 120 (2023), Article 102619.
Koffman, Brian. "Richter's Transformation." CLL Society, May 28, 2025, https://cllsociety.org/treatment-and-research/richters-transformation/. Accessed Jun. 20, 2025.
Wierda, William G. et al. Pirtobrutinib, a highly selective, non-covalent (reversible) BTK inhibitor in patients with B-cell malignancies: analysis of the Richter transformation subgroup from the multicentre, open-label, phase 1/2 BRUIN study, The Lancet Haematology, vol. 11, Issue 9, Jul. 18, 2024, p. 682-692.
Wierda, William G. et al., Pirtobrutinib in Richter Transformation: Updated Efficacy and Safety Results with 18-Month Median Survival Follow-up from the Phase 1/2 BRUIN Study, Blood, American Society of Hematology, vol. 142, Issue Supplement 1, Nov. 2, 2023, p. 1737-1741.
Jerkeman, Mats, et al. "Ibrutinib, lenalidomide, and rituximab in relapsed or refractory mantle cell lymphoma (PHILEMON): a multicentre, open-label, single-arm, phase 2 trial." The Lancet Haematology 5.3 (2018): e109-e116.
Niemann, Carsten Utoft, et al. "Venetoclax and ibrutinib for patients with relapsed/refractory chronic lymphocytic leukemia (R/R CLL)-15-month safety, response and MRD evaluation: third interim analysis from the phase II vision HO141 trial." Blood 134 (2019): 4292.
International Search Report and Written Opinion in International Application No. PCT/US2020/063089, mailed Mar. 4, 2021, 8 pages.

(Continued)

*Primary Examiner* — James H Alstrum-Acevedo
*Assistant Examiner* — Justin Christopher Sanchez
(74) *Attorney, Agent, or Firm* — Tina M. Tyson

(57) ABSTRACT

The present invention provides a method of administering doses of the BTK inhibitor, (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof for use in treating conditions such as cancer and autoimmune diseases.

8 Claims, No Drawings

(56) References Cited

OTHER PUBLICATIONS

Naeem, Aishath S., et al. , "LOXO-305: Targeting C481S Bruton Tyrosine Kinase in Patients with Ibrutinib-Resistant CLL," ASH 2019 Meeting oral presentation, (Dec. 8, 2019), 21 pages.
Mato, Anthony R., et al., "Results from the First-in-Human, Proof-of-Concept Phase 1 BRUIN Trial in Pretreated B-Cell Malignancies for LOXO-305, a Next-Generation, Highly Selective, Non-Covalent BTK Inhibitor," ASH 2019 Meeting abstract oral presentation, (Oct. 25, 2019), 2 pages.
Yang, Liu; et al., "Overcoming CAR T Resistance with Non-covalent BTK Inhibitor LOXO-305 in Mantle Cell Lymphoma," ASH 2020 Meeting oral presentation, (Dec. 7, 2020), 9 pages.
Byrd J, Brown J, O'Brien S. Ibrutinib versus ofatumumab in previously treated chronic lymphoid leukemia. N Engl J Med. 2014; 371(3):213-223.
O'Brien S, Jones J, Coutre S. Ibrutinib for patients with relapsed or refractory chronic lymphocytic leukaemia with 17p deletion (RESONATE-17): a phase 2, openlabel, multicentre study. *Lancet Oncol.* 2016; 17(10):1409-1418.
Burger J, Tedeschi A, Barr P. Ibrutinib as initial therapy for patients with chronic lymphocytic leukemia. *N Engl J Med.* 2015; 373(25):2425-2437.
Byrd J, Hillmen P, O'Brien S. Long-term efficacy and safety with ibrutinib (ibr) in previously treated chronic lymphocytic leukemia (CLL): up to four years follow-up of the RESONATE study. *J Clin Oncol.* 2017; 35(suppl).
Maddocks K, Ruppert A, Lozanski G. Etiology of ibrutinib therapy discontinuation and outcomes in patients with chronic lymphocytic leukemia. *JAMA Oncol.* 2015; 1(1):80-87.
Woyach J, Ruppert A, Guinn D. BTKC481S-mediated resistance to ibrutinib in chronic lymphocytic leukemia. *J Clin Oncol.* 2017; 35(13):1437-1443.
O'Brien S, Furman R, Coutre S. Five-year experience with single-agent ibrutinib in patients with previously untreated and relapsed/refractory chronic lymphocytic leukemia/small Lymphocytic Leukemia. *Blood.* 2016; 128:233.
Jain P, Thompson P, Keating M. Long-term outcomes for patients with chronic lymphocytic leukemia who discontinue ibrutinib. Cancer. 2017; 123(12):2268-2273.
Mato A, Nabhan C, Barr P. Outcomes of CLL patients treated with sequential kinase inhibitor therapy: a real world experience. *Blood.* 2016; 128(18):2199-2205.
Parikh S, Chaffee K, Call T. Ibrutinib therapy for chronic lymphocytic leukemia (CLL): an analysis of a large cohort of patients treated in routine clinical practice. *Blood.* 2015; 126(23):2935.
Sandoval-Sus J, Chavez J, Dalia S. Outcomes of patients with relapsed/refractory chronic lymphocytic leukemia after ibrutinib discontinuation outside clinical trials: a single institution experience. *Blood.* 2015; 126:2945.
Winqvist M, Asklid A, Andersson P. Real-world results of ibrutinib in patients with relapsed or refractory chronic lymphocytic leukemia: data from 95 consecutive patients treated in a compassionate use program. *Haematologica.* 2016; 101(12):1573-1580.
Forum, UK CLL. Ibrutinib for relapsed/refractory chronic lymphocytic leukemia: a UK and Ireland analysis of outcomes in 315 patients. *Haematologica.* 2016; 101(12):1563-1572.
Cheson B, Byrd J, Rai K. Novel targeted agents and the need to refine clinical end points in chronic lymphocytic leukemia. *J Clin Oncol.* 2012; 30(23):2820-2822.
O'Brien SM, Byrd JC, Hillmen P. Outcomes with ibrutinib by line of therapy in patients with CLL: analyses from phase III data. *J Clin Oncol.* 2016; 34(15_suppl):7520.
Mato, Anthony R., Chadhi Nabhan, Meghan C. Thompson, Nicole Lamanna, Danielle M. Brander, Brian Hill, Christina Howlett et al. "Toxicities and outcomes of 616 ibrutinib-treated patients in the United States: a real-world analysis." *Haematologica* 103, No. 5 (2018): 874.
Byrd, John C., Richard R. Furman, Steven E. Coutre, Ian W. Flinn, Jan A. Burger, Kristie A. Blum, Barbara Grant et al. "Targeting BTK with ibrutinib in relapsed chronic lymphocytic leukemia." *New England Journal of Medicine* 369, No. 1 (2013): 32-42.
Byrd, John C., Bonnie Harrington, Susan O'Brien, Jeffrey A. Jones, Anna Schuh, Steve Devereux, Jorge Chaves et al. "Acalabrutinib (ACP-196) in relapsed chronic lymphocytic leukemia." *New England Journal of Medicine* 374, No. 4 (2016): 323-332.
Brandhuber, Barbara, et al., "LOXO-305, A Next Generation Non-Covalent BTK Inhibitor, for Overcoming Acquired Resistance to Covalent BTK Inhibitors," SOHO Annual Meeting 2018 abstract publication, (Sep. 12, 2018), https://doi.org/10.1016/j.clml.2018.07.081, 2 pages.
Brandhuber, Barbara, et al., "LOXO-305, A Next Generation Reversible BTK Inhibitor, for Overcoming Acquired Resistance to Irreversible BTK Inhibitors," SOHO 2018 Meeting abstract publication, (Aug. 28, 2018), https://doi.org/10.1016/j.clml.2018.07.081, 1 page.
Naeem, Aishath S., et al. , "LOXO-305: Targeting C481S Bruton Tyrosine Kinase in Patients with Ibrutinib-Resistant Cll," Ash 2019 Meeting abstract publication, (Nov. 6, 2019), https://doi.org/10.1182/blood-2019-124362, 3 pages.
Mato, Anthony R., et al., "Results from the First-in-Human, Proof-of-Concept Phase 1 BRUIN Trial in Pretreated B- Cell Malignancies for LOXO-305, a Next-Generation, Highly Selective, Non-Covalent BTK Inhibitor," at ASH 2019 Meeting oral presentation, (Dec. 8, 2019), https://www.loxooncology.com/docs/presentations/LOXO-305-ASH2019-Phase1-8DEC2019-Final-V3.pdf, 19 pages.
Mato, Anthony R., at al., "Results from a First-in-Human, Proof-of-Concept Phase 1 Trial in Pretreated B-Cell Malignancies for Loxo-305, a Next-Generation, Highly Selective, Non-Covalent BTK Inhibitor," ASH 2019 Meeting abstract, (Nov. 6, 2019), https://www.sciencedirect.com/science/article/pii/S0006497118584196, 4 pages.
Gomez, Eliana B., et al., "LOXO-305, a highly selective and non-covalent next generation BTK inhibitor, inhibits diverse Btk C481 substitution mutations," ASH 2019 Meeting poster presentation, (Dec. 9, 2019), https://www. loxooncology.com/docs/presentations/ASH-poster-2Dec-2019-Final.pdf, 2 pages.
Gomez, Eliana B., et al., "In Vivo Pre-Clinical Evaluation of LOXO-305 Alone and in Combination with Venetoclax, R-CHOP or Obinutuzumab on Human Xenograft Lymphoma Tumor Models in Mice," ASH 2020 Meeting online abstract, (Nov. 5, 2020), https://doi.org/10.1182/blood-2019-126114, 6 pages.
Gomez, Eliana B., et al., "LOXO-305, a highly selective and non-covalent next generation BTK inhibitor, inhibits diverse Btk C481 substitution mutations," ASH 2019 Meeting abstract publication, (Nov. 13, 2019), https://www.sciencedirect.com/science/article/pii/S0006497118625728, 2 pages.
Wang, Michael L., et al., "LOXO-305, a Next Generation, Highly Selective, NonCovalent BTK Inhibitor in Previously Treated Mantle Cell Lymphoma, Waldenstrom's Macroglobulinemia, and Other Non-Hodgkin Lymphomas: Results from the Phase 1/2 BRUIN Study," ASH 2020 Meeting online abstract, (Nov. 5, 2020), https://ash.confex.com/ash/2020/webprogram/Paper134314.html, 6 pages.
Wang, Michael L., et al., "LOXO-305, a Next Generation, Highly Selective, NonCovalent BTK Inhibitor in Previously Treated Mantle Cell Lymphoma, Waldenstrom's Macroglobulinemia, and Other Non-Hodgkin Lymphomas: Results from the Phase 1/2 BRUIN Study," ASH 2020 Meeting oral presentation, (Dec. 5, 2020), https://www. loxooncology.com/docs/presentations/Wang-MCL-ASH2020-FINAL.pdf, 6 pages.
Mato, Anthony R., et al., "LOXO-305, A Next Generation, Highly Selective, Non-Covalent BTK Inhibitor In Previously Treated CLL/SLL: Results From The Phase 1/2 BRUIN Study," ASH 2020 Meeting oral presentation, (Dec. 7, 2020), https://www.loxooncology.com/docs/presentations/Mato-CLL-ASH2020-FINAL.pdf, 16 pages.
Mato, Anthony R., et al., "LOXO-305, A Next Generation, Highly Selective, Non-Covalent BTK Inhibitor In Previously Treated CLL/SLL: Results From The Phase 1/2 BRUIN Study," ASH 2020 Meeting online abstract, (Nov. 4, 2020), https://ash.confex.com/ash/2020/webprogram/Paper134970.html, 4 pages.
Mato, Anthony R., et al., "LOXO-305, A Next Generation, Highly Selective, Non-Covalent BTK Inhibitor In Previously Treated CLL/SLL: Results From The Phase 1/2 BRUIN Study," ASH 2020

(56) References Cited

OTHER PUBLICATIONS

Meeting abstract publication, (Nov. 5, 2020), https://doi.org/10.1182/blood-2020-134970, 5 pages.
Gomez, Eliana B., et al., "In Vivo Pre-Clinical Evaluation of LOXO-305 Alone and in Combination with Venetoclax, R-CHOP or Obinutuzumab on Human Xenograft Lymphoma Tumor Models in Mice," ASH 2020 Meeting poster, (Dec. 5, 2020), 4 pages.
Gomez, Eliana B., et al., In Vivo Pre-Clinical Evaluation of LOXO-305 Alone and in Combination with Venetoclax, R-CHOP or Obinutuzumab on Human Xenograft Lymphoma Tumor Models in Mice, ASH 2020 Meeting online abstract, (Nov. 5, 2020), https://ash.confex.com/ash/2020/webprogram/Paper140581.html, 3 pages.
Gomez, Eliana B., et al., "In Vivo Pre-Clinical Evaluation of LOXO-305 Alone and in Combination with Venetoclax, R-CHOP or Obinutuzumab on Human Xenograft Lymphoma Tumor Models in Mice," ASH 2020 Meeting abstract publication, (Nov. 5, 2020), https://doi.org/10.1182/blood-2020-140581, 6 pages.
Yang, Liu, et al., "Overcoming Car T Resistance with Non-covalent BTK Inhibitor LOXO-305 in Mantle Cell Lymphoma," ASH 2020 Meeting online abstract, (Nov. 5, 2020), https://ash.confex.com/ash/2020/webprogram/ Paper137645.html, 3 pages.
Yang, Liu, et al., "Overcoming Car T Resistance with Non-covalent BTK Inhibitor LOXO-305 in Mantle Cell Lymphoma," ASH 2020 Meeting abstract publication, (Nov. 5, 2020), https://doi.org/10.1182/blood-2020-137645, 2 pages.
Press Release "Fochon Pharmaceuticals, Ltd. (a Subsidiary of Fosun Pharma) Announces Licensing Agreement with Eli Lilly and Company for Novel Selective BCL-2 Inhibitor," https://fochonpharma.com/2020/fochon-pharmaceuticals-ltd-a-subsidiary-of-fosun-pharma-announces-licensing-agreement-with-eli-lilly-and-company-for-novel-selective-bcl-2-inhibitor/, Nov. 4, 2020, 5 pages.
A Study of Oral LOXO-305 in Patients With Previously Treated CLL/SLL or NHL, Clinical Trial NCT03740529 (Submitted Nov. 12, 2018) (v1), downloaded from https://www.clinicaltrials.gov/ct2/history/NCT03740529? V_1=View#StudyPage Top on May 10, 2022, 6 pages.
A Study of Oral LOXO-305 in Patients With Previously Treated CLL/SLL or NHL, Clinical Trial NCT03740529 (Submitted Dec. 6, 2018) (v2), downloaded from https://www.clinicaltrials.gov/ct2/history/NCT03740529? V_2=View#StudyPageTop on May 10, 2022, 7 pages.
A Study of Oral LOXO-305 in Patients With Previously Treated CLL/SLL or NHL, Clinical Trial NCT03740529 (Submitted Jan. 24, 2019) (v3), downloaded from https://www.clinicaltrials.gov/ct2/history/NCT03740529? V_3=View#StudyPageTop on May 10, 2022, 7 pages.
A Study of Oral LOXO-305 in Patients With Previously Treated CLL/SLL or NHL, Clinical Trial NCT03740529 (Submitted May 3, 2019) (v4), downloaded from https://www.clinicaltrials.gov/ct2/history/NCT03740529? V_4=View#StudyPageTop on May 10, 2022, 8 pages.
A Study of Oral LOXO-305 in Patients With Previously Treated CLL/SLL or NHL, Clinical Trial NCT03740529 (Submitted Oct. 24, 2019) (v5), downloaded from https://www.clinicaltrials.gov/ct2/history/NCT03740529? V_5=View#StudyPageTop on May 10, 2022, 8 pages.
A Study of Oral LOXO-305 in Patients With Previously Treated CLL/SLL or NHL, Clinical Trial NCT03740529 (Submitted Mar. 11, 2020) (v6), downloaded from https://www.clinicaltrials.gov/ct2/history/NCT03740529? V_6=View#StudyPageTop on May 10, 2022, 9 pages.
A Study of Oral LOXO-305 in Patients With Previously Treated CLL/SLL or NHL, Clinical Trial NCT03740529 (Submitted Oct. 12, 2020) (v7), downloaded from https://www.clinicaltrials.gov/ct2/history/NCT03740529? V_7=View#StudyPageTop on May 10, 2022, 9 pages.
A Study of Oral LOXO-305 in Patients With Previously Treated CLL/SLL or NHL, Clinical Trial NCT03740529 (Submitted Nov. 30, 2020) (v8), downloaded from https://www.clinicaltrials.gov/ct2/history/NCT03740529? V_8=View#StudyPageTop on May 10, 2022, 10 pages.
Study of BTK Inhibitor LOXO-305 Versus Approved BTK Inhibitor Drugs in Patients With Mantle Cell Lymphoma (Mcl) (BRUIN-MCL-321), Clinical Trial NCT04662255 (Submitted Dec. 4, 2020) (v1), downloaded from https://www.clinicaltrials.gov/ct2/history/NCT04662255?V_1=View#StudyPageTop on May 10, 2022, 5 pages.

\* cited by examiner

DOSING OF A BRUTON'S TYROSINE KINASE INHIBITOR

The present invention relates to the use of (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof for the treatment of conditions such as cancer and autoimmune diseases.

Bruton's Tyrosine Kinase (BTK) is a member of the src-related Tec family of cytoplasmic tyrosine kinases. BTK plays a key role in the B-cell antigen receptor signaling pathway, which is required for the development, activation, and survival of normal white blood cells, known as B-cells. BTK also plays a critical role in the proliferation and survival of diverse B-cell malignancies. Therefore, BTK is a molecular target useful for treatment across numerous B-cell leukemias and lymphomas including, for example, indolent and aggressive mature B-cell non-Hodgkin lymphomas, chronic lymphocytic leukemia/small lymphocytic lymphoma, Waldenstrom's macroglobulinemia, mantle cell lymphoma, follicular lymphoma, diffuse large B-cell lymphoma, B-cell prolymphocytic leukemia, hairy cell leukemia, and marginal zone lymphoma.

It has also been reported that B-cells play a prominent role in the development of chronic graft versus host disease (cGVHD), a life-threatening complication of allogeneic stem cell transplantation, prompting studies of B-cell-targeted therapies for the prevention and treatment of cGVHD. Rituximab has shown mixed efficacy in steroid-refractory cGVHD and may help prevent its development. Additionally, the covalent BTK inhibitor, ibrutinib, was approved in 2017 by the US FDA in refractory cGVHD.

The compound, (S)-5-amino-3-(4-((5-fluoro-2-methoxybenzamido)methyl)phenyl)-1-(1,1,1-trifluoropropane-2-yl)-1H-pyrazole-4-carboxamide (hereinafter referred to as "BTK-I"), and pharmaceutically acceptable salts thereof are disclosed in WO17/103611 and WO2020/028258 as selective inhibitors of BTK.

Many patients who are being treated with BTK inhibitors for cancer and specifically BTK-mediated cancers become refractory or resistant to further treatment or are intolerant to the treatment due to relapse or adverse events, which may be severe or even life threatening. For example, patients treated with the BTK inhibitor, ibrutinib, can become resistant and/or intolerant to further treatment. (Mato A., et al., "Toxicities and Outcomes of 616 Ibrutinib-Treated Patients in the United States: A Real-World Analysis", Haematologica, 2018, 103(5), 874-879.) For patients who develop resistance, increasing the dose of ibrutinib to overcome the resistance may not be a viable option because of toxicities associated with ibrutinib, which include neutropenia, thrombocytopenia, diarrhea, anemia, musculoskeletal pain, rash, nausea, bruising, fatigue, hemorrhage, and pyrexia.

As noted in Mato, (2018), for ibrutinib, toxicity was the most common reason for discontinuation in all settings, accounting for 63.1% of discontinuations in front-line use and 50.2% of discontinuations in relapsed/refractory (R/R) use. Toxicity was the most common reason for discontinuation in several settings including: commercial use and clinical trial use (50% of discontinuations in front-line commercial use, 77.7% of discontinuations in front-line clinical trial use, 52.5% of discontinuations in R/R commercial use, and 39.7% of discontinuations in R/R trial use). Toxicities of ibrutinib that led to dose interruptions and treatment discontinuation include arthralgia, atrial fibrillation, rash, cytopenias, infection, pneumonitis, bleeding, and diarrhea. In the literature, these toxicities have been attributed to both on-target BTK inhibition and off-target inhibition of other kinases such as Tec.

Notably, the proportion of discontinuations due to progressive disease (PD) was lower: 15.8% in the front-line setting and 20.9% in R/R use. Richter transformation to diffuse large B-cell lymphoma or Hodgkin lymphoma accounted for 5.3% of the discontinuations in the front-line setting and 5.0% in the R/R setting. Interestingly, the ibrutinib starting dose (420 mg daily versus <420 mg daily) did not correlate with the proportion of patients who discontinued ibrutinib due to toxicity (51% versus 50%) or disease progression (19.6% versus 21.4%). A retrospective analysis of the RESONATE trial indicated worse progression-free survival (PFS) in patients with R/R chronic lymphocytic leukemia with lower ibrutinib dose intensity and dose interruptions lasting for longer than 7 days, suggesting treatment interruptions for toxicity can adversely impact long-term outcomes. Acalabrutinib, which is a more selective BTK inhibitor than ibrutinib against off-targets in preclinical studies, was associated with lower overall frequency of some (e.g., atrial fibrillation, major bleeding), but not other (e.g., cytopenias, upper respiratory infection, diarrhea) toxicities in clinical trials (Byrd, Furman et al. N Engl J Med (Jul. 4, 2013), 369:32-42; Byrd, Harrington et al. N Engl J Med (Jan. 28, 2016); 374:323-332).

There remains a need to provide alternative treatment therapies for patients suffering from cancer and autoimmune diseases. In addition, there remains a need to provide alternative therapies for patients suffering from cGVHD. In particular, there remains a need to provide alternative treatment therapies for patients who develop resistance or become intolerant to current therapies, to provide alternative BTK inhibitors with activity against resistant mutants of BTK and that possess better tolerability profiles, or to provide alternative therapies that allow for maximum BTK inhibition with limited adverse events and fewer dose interruptions or discontinuations.

During human clinical trials, administration of BTK-I has not induced the severity of adverse effects that have been observed with other BTK inhibitors, such as ibrutinib and acalabrutinib, such as atrial fibrillation, hemorrhage, cytopenia, cardiac arrhythmias, along with severe leukopenia neutropenia, decreased platelet count, reticulocyte count, and red cell mass consistent with bone marrow suppression/toxicity. (Mato A., et al., "Toxicities and Outcomes of 616 Ibrutinib-Treated Patients in the United States: A Real-World Analysis", Haematologica, 2018, 103(5), 874-879.) Between Mar. 21, 2019 and Sep. 27, 2020, across 7 dose levels ranging from 25 mg once daily (QD) to 300 mg QD in 323 patients, the only treatment-emergent adverse events regardless of attribution or grade seen in ≥10% of patients (n=323) were fatigue (n=65, 20%), diarrhea (n=55, 17%), and contusion (n=42, 13%). In 121 efficacy-evaluable cBTKi-treated chronic lymphocytic leukemia (CLL) patients (median prior lines=4), overall response rate (ORR) was 62% (95% CI: 53-71), rising to 84% in patients followed for ≥10 months. ORR was similar in (chronic lymphocytic leukemia/small lymphocytic lymphoma (CLL/SLL) patients with prior cBTKi resistance (67%, 53/79), cBTKi intolerance (52%, 22/42), BTK C481-mutant (71%, 17/24) and BTK-wildtype (66%, 43/65) disease. In 52 efficacy-evaluable cBTKi-treated mantle cell lymphoma (MCL) patients, the ORR was 52% (95% CI: 38-66). Of 117 responding CLL or MCL patients, all but 8 remain progression-free. Responses were also observed in Waldenstrom's macroglobulinemia (WM) (n=19, ORR 68%) and follicular lymphoma (FL) (n=8, ORR 50%). Furthermore, dose interruptions, reductions, and permanent discontinuations for drug-related adverse events (AEs) were observed in 8.0% (in 26), 2.2% (in 7), and 1.5% (in 5) of patients, respectively.

Atrial arrythmias and hemorrhage are two important AEs associated with covalent BTK inhibitor discontinuation. In the overall safety population of 323 patients, atrial fibrillation/flutter was seen in only 2 (0.6%) patients, with both events grade 2 and considered unrelated to BTK-I due to a history of prior atrial fibrillation in each. Only 1 patient experienced a grade 3 hemorrhage, a subarachnoid bleed sustained during a bicycle accident. In total, 18 patients had discontinued a prior BTK inhibitor for cardiovascular toxicity (in 15) or hemorrhage (3). None experienced recurrence of these events on BTK-I.

The present invention provides a method of treating cancer or an autoimmune disease in a patient in need thereof. In one embodiment, the method comprises administering to the patient a daily dose of between about 120 mg and about 600 mg of a compound that is BTK-I or a pharmaceutically acceptable salt thereof. Preferably, the daily dose is between about 125 mg and about 600 mg. Preferably, the method is treating cancer. Preferably, the compound is BTK-I. Preferably, the patient is relapsed or refractory. Preferably, the patient is treatment naïve. Preferably, the patient has received at least one prior anti-cancer therapy. Preferably, the patient has received at least one prior anti-cancer therapy that includes at least one BTK inhibitor based therapy. Preferably, the patient received no prior anti-cancer therapy containing a BTK inhibitor. Preferably, the patient received one prior anti-cancer therapy. Preferably, the patient received two prior anti-cancer therapies. Preferably, the patient received more than two prior anti-cancer therapies. In another embodiment, the method further comprises the simultaneous, separate, or sequential administration of a B-cell lymphoma 2 (BCL-2) inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is rituximab, cyclophosphamide, doxorubicin hydrochloride, vincristine sulfate, and prednisone (such therapy referred to as "R-CHOP"). Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a method of inhibiting proliferation and/or survival of activated B-cells in a patient suffering from a BTK-mediated cancer, comprising: orally administering to the patient suffering from the BTK-mediated cancer a therapeutically effective amount of BTK-I or a pharmaceutically acceptable salt thereof, on a continuous daily dose regimen until progression of the BTK-mediated cancer or unacceptable toxicity occurs, wherein the therapeutically effective amount of the compound or salt thereof is an amount that results in greater than 90 percent inhibition of BTK at steady state in the patient 24 hours following administration and wherein proliferation and survival of the activated B-cells are inhibited. Preferably, the compound is BTK-I. Preferably, the patient is relapsed or refractory. Preferably, the patient is treatment naïve. Preferably, the patient received at least one prior anti-cancer therapy. Preferably, the patient received at least one prior anti-cancer therapy that includes at least one BTK inhibitor based therapy. Preferably, the patient received no prior anti-cancer therapy containing a BTK inhibitor. Preferably, the patient received one prior anti-cancer therapy. Preferably, the patient received two prior anti-cancer therapies. Preferably, the patient received more than two prior anti-cancer therapies. In another embodiment, the method further comprises the simultaneous, separate, or sequential administration of a B-cell lymphoma 2 (BCL-2) inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1+/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a method of inhibiting proliferation and/or survival of activated B-cells in a patient suffering from a BTK-mediated cancer, comprising: orally administering to the patient suffering from the BTK-mediated cancer a therapeutically effective amount of BTK-I or a pharmaceutically acceptable salt thereof, on a continuous daily dose regimen until progression of the BTK-mediated cancer or unacceptable toxicity occurs, wherein said administration of the therapeutically effective amount results in an AUC$_{(0-24)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I. Preferably, the patient is relapsed or refractory.

Preferably, the patient is treatment naïve. Preferably, the patient received at least one prior anti-cancer therapy. Preferably, the patient received at least one prior anti-cancer therapy that includes at least one BTK inhibitor based therapy. Preferably, the patient received no prior anti-cancer therapy containing a BTK inhibitor. Preferably, the patient received one prior anti-cancer therapy. Preferably, the patient received two prior anti-cancer therapies. Preferably, the patient received more than two prior anti-cancer therapies. In another embodiment, the method further comprises the simultaneous, separate, or sequential administration of a B-cell lymphoma 2 (BCL-2) inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1+/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a compound which is BTK-I or a pharmaceutically acceptable salt thereof for use in the treatment of cancer or an autoimmune disease wherein the compound or salt is administered to a patient at a daily dose of between about 120 mg and about 600 mg. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the compound or salt is administered in simultaneous, separate, or sequential administration with a BCL-2 inhibitor and/or an anti-CD20 based therapy based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient is relapsed or refractory. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient is relapsed or refractory, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient is treatment naïve. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient is treatment naïve, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient received at least one prior anti-cancer therapy. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received at least one prior anti-cancer therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg wherein the patient received at least one prior anti-cancer therapy that includes at least one BTK inhibitor based therapy. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received at least one prior anti-cancer therapy that includes at least one BTK inhibitor based therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient received no prior anti-cancer therapy containing a BTK inhibitor. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received no prior anti-cancer therapy containing a BTK inhibitor, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient received one prior anti-cancer therapy. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received one prior anti-cancer therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1+/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient received two prior anti-cancer therapies. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received two prior anti-cancer therapies, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1+/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of cancer wherein the compound or salt is administered to a patient at a daily dose of between about 120 mg and about 600 mg and wherein the patient received more than two prior anti-cancer therapies. Preferably, the dose is between about 125 mg and about 600 mg. Preferably, the compound is BTK-I.

Also provided herein is a compound which is BTK-I or a pharmaceutically acceptable salt thereof for use in the treatment of cancer wherein the compound or salt is administered to a patient at a daily dose of between about 120 mg and about 600 mg, wherein the patient received more than two prior anti-cancer therapies, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a compound which is BTK-I or a pharmaceutically acceptable salt thereof for use in inhibiting proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer
wherein the patient received at least one prior anti-cancer therapy that includes at least one BTK inhibitor based therapy, comprising. orally administering to the patient suffering from the BTK-mediated cancer a therapeutically effective amount of e the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m2 as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ as a split dose on day 1 and 2 and rituximab is then either administered at about 500 mg/m$^2$ day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg 15 for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a compound which is BTK-I or a pharmaceutically acceptable salt thereof for use in inhibiting proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-24)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient is relapsed or refractory, comprising: orally administering to the patient suffering from the BTK-mediated cancer a therapeutically effective amount the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in inhibiting proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in inhibiting proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a compound which is BTK-I or a pharmaceutically acceptable salt thereof for use in the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use for use in the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received at least one prior anti-cancer therapy that includes at least one BTK inhibitor based therapy, comprising. orally administering to the patient suffering from the BTK-mediated cancer a therapeutically effective amount of e the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day I and 2. Preferably, the anti-CD20 based therapy is administered on day 1 +/−3 days of a first 28-day cycle at about 375 mg/m² as a split dose on day I and 2. Preferably, the anti-CD20 based therapy is administered on day 1 of a first 28-day cycle or as a split dose on day 1 and 2 and then the anti-CD20 based therapy is either administered on day I or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-1 or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² as a split dose on day 1 and 2. Preferably, rituximab is administered on day 1 of a first 28-day cycle at about 375 mg/m² or as a split dose on day 1 and 2 and rituximab is then either administered at about 500 mg/m² day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² day 1 or not at all during each of any subsequent cycles 10 and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles Also provided herein is a compound which is BTK-I or a pharmaceutically acceptable salt thereof for use in the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Also provided herein is a compound which is BTK-I or a pharmaceutically acceptable salt thereof for use in the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is a compound which is BTK-I or a pharmaceutically acceptable salt thereof for use in the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides a compound which is BTK-I or a pharmaceutically acceptable salt thereof for use in the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an AUC$_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an AUC$_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient is relapsed or refractory, comprising: orally administering to the patient suffering from the BTK-mediated cancer a therapeutically effective amount the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL; and
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient is treatment naive, comprising: orally administering to a patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Also provided herein is a compound which is BTK-I or a pharmaceutically acceptable salt thereof for use in the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
 wherein said administration of the therapeutically effective amount results in an $AUC_{(0-2)}$ of greater than or equal to about 52400 ng*h/mL; and
 wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
 wherein said administration of the therapeutically effective amount results in an $AUC_{(0-2)}$ of greater than or equal to about 52400 ng*h/mL;
 wherein said administration of the therapeutically effective amount results in an exposure of greater than or equal to about 806 ng/mL twenty-four hours following said administration; and
 wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy.

Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
- wherein said administration of the therapeutically effective amount results in an $AUC_{(0-2)}$ of greater than or equal to about 52400 ng*h/mL; and
- wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
- wherein said administration of the therapeutically effective amount results in an $AUC_{(0-2)}$ of greater than or equal to about 52400 ng*h/mL;
- wherein said administration of the therapeutically effective amount results in an exposure of greater than or equal to about 806 ng/mL twenty-four hours following said administration; and
- wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
- wherein said administration of the therapeutically effective amount results in an $AUC_{(0-2)}$ of greater than or equal to about 52400 ng*h/mL; and
- wherein said administration of the therapeutically effective amount results in an exposure of greater than or equal to about 806 ng/mL twenty-four hours following said administration. Preferably, the compound is BTK-I.

Also provided herein is a compound which is BTK-I or a pharmaceutically acceptable salt thereof for use in the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
- wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides the use of a compound which is BTK-I or a pharmaceutically acceptable salt thereof for the manufacture of a medicament for the treatment of cancer wherein the compound or salt is administered to a patient at a daily dose of between about 120 mg and about 600 mg. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient is relapsed or refractory. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient is relapsed or refractory, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient is treatment naïve. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient is treatment naïve, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received at least one prior anti-cancer therapy. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient received at least one prior anti-cancer therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received at least one prior anti-cancer therapy that includes at least one BTK inhibitor based therapy. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient received at least one prior anti-cancer therapy that includes at least one BTK inhibitor based therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received no prior anti-cancer therapy containing a BTK inhibitor. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient received no prior anti-cancer therapy containing a BTK inhibitor, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1+/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received one prior anti-cancer therapy. Preferably, the dose is between about 125 mg and about 600 mg. Preferably, the compound is BTK-I.

Also provided herein is the use of a compound which is BTK-I or a pharmaceutically acceptable salt thereof for the treatment of cancer wherein the compound or salt is administered to a patient at a daily dose of between about 120 mg and about 600 mg, wherein the patient received one prior anti-cancer therapy, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received two prior anti-cancer therapies. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg, wherein the patient received two prior anti-cancer therapies, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of cancer wherein the compound or salt is administered to a patient at a daily dose of between about 120 mg and about 600 mg and wherein the patient received more than two prior anti-cancer therapies. Preferably, the dose is between about 125 mg and about 600 mg. Preferably, the compound is BTK-I.

Also provided herein is the use of a compound which is BTK-I or a pharmaceutically acceptable salt thereof for the manufacture of a medicament for the treatment of cancer and the compound or salt is administered to a patient at a daily dose of between about 120 mg and about 600 mg, wherein the patient received more than two prior anti-cancer therapies, and wherein the compound or salt is administered in simultaneous, separate, or sequential administration with a BCL-2 inhibitor and/or an anti-CD20 based therapy. Preferably, the dose is between about 125 mg and about 600 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides the use of a compound which is BTK-I or a pharmaceutically acceptable salt thereof for the manufacture of a medicament for the inhibition of proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament of for the inhibition of proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day I, the anti-CD20 based therapy is administered on day I of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ as a split dose on day 1 and 2. Preferably, rituximab is administered on day 1 of a first 28-day cycle at about 375 mg/m$^2$ as a split dose on day 1 and 2 and rituximab is then either administered at about 500 mg/m$^2$ day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ as a split dose on day 1 and 2 and rituximab is then either administered at about 500 mg/m$^2$ day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ as a split dose on day 1 and 2 and rituximab is then either administered at about 500 mg/m$^2$ day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or a salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration and wherein proliferation and survival of the activated B-cells are inhibited; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration and wherein proliferation and survival of the activated B-cells are inhibited; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides the use of a compound which is BTK-I or a pharmaceutically acceptable salt thereof for the manufacture of a medicament for the inhibition of proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of medicament for the inhibition of proliferation and/or survival of activated B-cells in a patient suffering from a BTK-mediated cancer wherein the patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is treatment naive, comprising: orally administering to the patient suffering from the BTK-mediated cancer a therapeutically effective amount of the compound 25 or salt, on a continuous daily dose regimen until progression of the BTK-mediated cancer or unacceptable toxicity occurs, wherein said administration of the therapeutically effective amount results in an AUC$_{(0-24)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an AUC$_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received no prior anti-cancer therapy containing a BTK inhibitor, comprising:

orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP". Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an AUC$_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an AUC$_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the inhibition of proliferation and/or survival inhibiting proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
   wherein said administration of the therapeutically effective amount results in an $AUC_{(0-2)}$ of greater than or equal to about 52400 ng*h/mL; and
   wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the inhibition of proliferation and/or survival of activated B-cells in a patient suffering from a BTK-mediated cancer wherein the patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
   wherein said administration of the therapeutically effective amount results in an $AUC_{(0-2)}$ of greater than or equal to about 52400 ng*h/mL;
   wherein said administration of the therapeutically effective amount results in an exposure of greater than or equal to about 806 ng/mL twenty-four hours following said administration; and
   wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides the use of a compound which is BTK-I or a pharmaceutically acceptable salt thereof for the manufacture of a medicament for the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs,
   wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs,
   wherein the therapeutically effective amount of the compound or salt is an amount that results in greater than 90 percent inhibition of BTK at steady state in the patient 24 hours following administration; and
   wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
   wherein the therapeutically effective amount of the compound or salt is an amount that results in greater than 90 percent inhibition of BTK at steady state in the patient 24 hours following administration Preferably, the compound is BTK-I.

Also provided herein is the use of a compound which is BTK-I or a pharmaceutically acceptable salt thereof for the manufacture of a medicament for the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs
   wherein the therapeutically effective amount of the compound or salt is an amount that results in greater than 90 percent inhibition of BTK at steady state in the patient 24 hours following administration. Preferably, the compound is BTK-I.
   wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient is treatment naive, comprising: orally administering to the patient suffering from the BTK-mediated cancer a therapeutically effective amount of the compound or a salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP". Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at 15 about 375 mg/m$^2$ as a split dose on day 1 and 2 and rituximab is then either administered at about 500 mg/m$^2$ day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ as a split dose on day 1 and 2 and rituximab is then either administered at about 500 mg/m$^2$ day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ as a split dose on day 1 and 2 and rituximab is then either administered at about 500 mg/mi on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein the therapeutically effective amount of the compound or salt is an amount that results in greater than 90 percent inhibition of BTK at steady state in the patient 24 hours following administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

The present invention also provides the use of a compound which is BTK-I or a pharmaceutically acceptable salt thereof for the manufacture of a medicament for the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer, comprising: orally administering to a patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a patient suffering from a BTK-mediated cancer wherein a patient is relapsed or refractory, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an AUC$_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient is treatment naive, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-24)}$ of greater than or equal to about 52400 ng*h/mL; and
wherein said administration of the therapeutically effective amount results in an exposure of greater than or equal to about 806 ng/ml twenty-four hours following said administration. Preferably, the compound is BTK-I Also provided herein is the use of a compound which is BTK-I or a pharmaceutically acceptable salt thereof for the manufacture of a medicament for the treatment of a BTK-mediated cancer wherein the patient is treatment naive, comprising: orally administering to a patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received at least one prior anti-cancer therapy, comprising: orally administering to the patient suffering from the BTK-mediated cancer a therapeutically effective amount of the compound or salt on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received at least one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Also provided herein is the use of a compound which is BTK-I or a pharmaceutically acceptable salt thereof for the manufacture of a medicament for the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL; and
  wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received at least one prior anti-cancer therapy that includes at least one BTK inhibitor based therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
  wherein said administration of the therapeutically effective amount results in an $AUC_{(0-2)}$ of greater than or equal to about 52400 ng*h/mL;
  wherein said administration of the therapeutically effective amount results in an exposure of greater than or equal to about 806 ng/mL twenty-four hours following said administration; and
  wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received no prior anti-cancer therapy containing a BTK inhibitor, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL; and
wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the treatment of a BTK-mediated cancer wherein a patient received one prior anti-cancer therapy, comprising: orally administering to the patient suffering from the BTK-mediated cancer a therapeutically effective amount of the compound or salt, on a continuous daily dose regimen until progression of the BTK-mediated cancer or unacceptable toxicity occurs,
wherein said administration of the therapeutically effective amount results in an $AUC_{(0-2)}$ of greater than or equal to about 52400 ng*h/mL;
wherein said administration of the therapeutically effective amount results in an exposure of greater than or equal to about 806 ng/mL twenty-four hours following said administration; and
wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is the use of a compound which is BTK-I or a pharmaceutically acceptable salt thereof for the manufacture of a medicament for the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration. Preferably, the compound is BTK-I.

Also provided herein is the use of a compound which is BTK-I or a pharmaceutically acceptable salt thereof for the manufacture of a medicament for the treatment of a BTK-mediated cancer wherein a patient received more than two prior anti-cancer therapies, comprising: orally administering to the patient suffering from the BTK-mediated cancer a therapeutically effective amount of the compound or salt, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL;

wherein said administration of the therapeutically effective amount results in an exposure of greater than or equal to about 806 ng/mL twenty-four hours following said administration; and wherein the compound or salt is administered in simultaneous, separate, or sequential administration with a BCL-2 inhibitor and/or an anti-CD20 based therapy. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

In one embodiment of the methods and uses described herein, the dose is administered once daily (QD). In another embodiment, the dose is administered twice daily (BID). Preferably, the dose(s) administered either QD or BID are administered daily for a 28-day cycle. The 28-day administration cycle can be repeated as determined by a health care provider. After administration of BTK-I or a pharmaceutically acceptable salt thereof for a cycle the patient may be afforded a drug holiday, in which the patient does not receive BTK-I or a pharmaceutically acceptable salt thereof. The timing and duration of a drug holiday can be varied as determined by a health care provider. A typical drug holiday can be 28 days. The 28-day administration cycle and drug holidays may be repeated as often as deemed beneficial or necessary for the patient as determined by a health care provider.

In another embodiment of the methods and uses described herein, the dose is selected to be between about 125 mg and about 600 mg. In another embodiment, the dose is selected to be between about 150 mg and about 600 mg. In another embodiment, the dose is selected to be between about 175 mg and about 600 mg. In another embodiment, the dose is selected to be between about 200 mg and about 600 mg. In another embodiment, the dose is selected to be between about 225 mg and about 600 mg. In another embodiment, the dose is selected to be between about 250 mg and about 600 mg. In another embodiment, the dose is selected to be between about 275 mg and about 600 mg. In another embodiment, the dose is selected to be between about 300 mg and about 600 mg. In another embodiment, the dose is selected to be between about 120 mg and about 500 mg. In another embodiment, the dose is selected to be between about 125 mg and about 500 mg. In another embodiment, the dose is selected to be between about 150 mg and about 200 mg. In another embodiment, the dose is selected to be between about 175 mg and about 500 mg. In another embodiment, the dose is selected to be between about 200 mg and about 500 mg. In another embodiment, the dose is selected to be between about 225 mg and about 500 mg. In another embodiment, the dose is selected to be between about 250 mg and about 500 mg. In another embodiment, the dose is selected to be between about 275 mg and about 500 mg. In another embodiment, the dose is selected to be between about 300 mg and about 500 mg. In another embodiment, the dose is selected to be between about 120 mg and about 400 mg. In another embodiment, the dose is selected to be between about 125 mg and about 400 mg. In another embodiment, the dose is selected to be between about 150 mg and about 400 mg. In another embodiment, the dose is selected to be between about 175 mg and about 400 mg. In another embodiment, the dose is selected to be between about 200 mg and about 400 mg. In another embodiment, the dose is selected to be between about 225 mg and about 400 mg. In another embodiment, the dose is selected to be between about 250 mg and about 400 mg. In another embodiment, the dose is selected to be between about 275 mg and about 400 mg. In another embodiment, the dose is selected to be between about 300 mg and about 400 mg. In another embodiment, the dose is selected to be between about 120 mg and about 300 mg. In another embodiment, the dose is selected to be between about 125 mg and about 300 mg. In another embodiment, the dose is selected to be between about 150 mg and about 300 mg. In another embodiment, the dose is selected to be between about 175 mg and about 300 mg. In another embodiment, the dose is selected to be between about 200 mg and about 300 mg. In another embodiment, the dose is selected to be between about 225 mg and about 300 mg. In another embodiment, the dose is selected to be between about 250 mg and about 300 mg. In another embodiment, the dose is selected to be between about 275 mg and about 300 mg. In another embodiment, the dose is selected to be about 300 mg. In another embodiment, the dose is selected to be between about 120 mg and about 200 mg. In another embodiment, the dose is selected to be between about 125 mg and about 200 mg. In another embodiment, the dose is selected to be between about 150 mg and about 200 mg. In another embodiment, the dose is selected to be between about 175 mg and about 200 mg. In another embodiment, the dose is selected to be about 200 mg. In another embodiment, the dose is selected to be about 200 mg and is administered in two 100 mg tablets. In another embodiment, the dose is selected to be between about 120 mg and about 150 mg. In another embodiment, the dose is selected to be between about 125 mg and about 150 mg. In another embodiment, the dose is elected to about 150 mg. In another embodiment, the dose is selected to be about 150 mg and is administered in a 100 mg tablet together with a 50 mg tablet.

In another embodiment, the maximum daily dose is between about 120 mg and about 300 mg. In another embodiment, the maximum daily dose is between about 125 mg and about 300 mg. In another embodiment, the maximum daily dose is about 150 mg. In another embodiment, the maximum daily dose is about 200 mg. In another embodiment, the maximum daily dose is about 250 mg. In another embodiment, the maximum daily dose is about 300 mg.

Also provided herein is a method of dose reducing a compound which is BTK-I or a pharmaceutically acceptable salt thereof for a patient in need thereof wherein the starting dose of BTK-I may be reduced by 50 mg, then by 100 mg, and then by 150 mg (for example 200 mg starting dose, to 150 mg dose, to 100 mg dose, and then to 50 mg dose). Preferably, the dose reduction is due to toxicity. Preferably, the dose reduction is due to a clinically significant adverse event. Preferably, the dose reduction is due to intolerability. Preferably, the intolerability is related to a drug-drug interaction. Preferably, the intolerability is related to a food effect.

Also provided herein is a method of dose reducing a compound which is BTK-I or a pharmaceutically acceptable salt thereof for a patient in need thereof wherein the starting dose of BTK-I may be reduced by 100 mg and then by 150 mg (for example 200 mg starting dose, to 100 mg dose, and then to 50 mg dose). Preferably, the dose reduction is due to toxicity. Preferably, the dose reduction is due to a clinically signification adverse event. Preferably, the dose reduction is due to intolerability. Preferably, the intolerability is related to a drug-drug interaction. Preferably, the intolerability is related to a food effect.

In another embodiment of the methods and uses described herein, the cancer is selected from. B-cell malignancy, B-cell lymphoma, diffuse large B-cell lymphoma, mantle cell lymphoma (MCL), chronic lymphocytic leukemia (CLL), non-Hodgkin lymphoma (NHL), small lymphocytic lymphoma (SLL), Waldenstrom's macroglobulinemia, marginal zone lymphoma (MZL), activated B-cell-like diffuse large B-cell lymphoma (ABC-DLBCL), follicular lymphoma, hairy cell leukemia, multiple myeloma, B-cell prolymphocytic leukemia, and B-cell non-Hodgkin lymphoma (B-cell NHL). In yet another embodiment, the cancer is selected from diffuse large B-cell lymphoma (DLBCL), MCL, CLL, NHL, SLL, CLL/SLL, Waldenstrom's macroglobulinemia, and marginal zone lymphoma. In still yet another embodiment, the cancer is selected from MCL, CLL, SLL, CLL/SLL, and NHL. Preferably, the patient has WT BTK. Preferably, the patient has a C481S BTK mutation.

In another embodiment, the cancer is B-cell NHL. In another embodiment, cancer is B-cell NHL and the dose is between about 120 mg and about 300 mg. In another embodiment, the cancer is B-cell NHL and the dose is between about 125 mg and about 300 mg. In another embodiment, the cancer is B-cell NHL and the dose is between about 150 mg and about 300 mg. In another embodiment, the cancer is B-cell NHL and the dose is between about 175 mg and about 300 mg. In another embodiment, the cancer is B-cell NHL and the dose is between about 200 mg and about 300 mg. In another embodiment, the cancer is B-cell NHL and the dose is between about 225 mg and about 300 mg. In another embodiment, the cancer is B-cell NHL and the dose is between about 250 mg and about 300 mg. In another embodiment, the cancer is B-cell NHL and the dose is between about 275 mg and about 300 mg. In another embodiment, the cancer is B-cell NHL and the dose is between about 120 mg and about 200 mg. In another embodiment, the cancer is B-cell NHL and the dose is between about 125 mg and about 200 mg. In another embodiment, the cancer is B-cell NHL and the dose is between about 150 mg and about 200 mg. In another embodiment, the cancer is B-cell NHL and the dose is between about 175 mg and about 200 mg. In another embodiment, the cancer is B-cell NHL and the dose is between about 120 mg and about 150 mg. In another embodiment, the cancer is B-cell NHL and the dose is between about 125 mg and about 150 mg.

In another embodiment, the cancer is low-grade B-cell NHL with transformation. In another embodiment, the cancer is low-grade B-cell NHL with Richter's transformation. In another embodiment, the cancer is low-grade B-cell NHL with transformation and the dose is between about 120 mg and about 300 mg. In another embodiment, the cancer is low-grade B-cell NHL with Richter's transformation and the dose is between about 120 mg and about 300 mg. In another embodiment, the cancer is low-grade B-cell NHL with transformation and the dose is between about 125 mg and about 300 mg. In another embodiment, the cancer is low-grade B-cell NHL with Richter's transformation and the dose is between about 125 mg and about 300 mg. In another embodiment, the cancer is low-grade B-cell NHL with transformation and the dose is between about 150 mg and about 300 mg. In another embodiment, the cancer is low-grade B-cell NHL with Richter's transformation and the dose is between about 150 mg and about 300 mg. In another embodiment, the cancer is low-grade B-cell NHL with transformation and the dose is between about 175 mg and about 300 mg. In another embodiment, the cancer is low-grade B-cell NHL with Richter's transformation and the dose is between about 175 mg and about 300 mg. In another embodiment, the cancer is low-grade B-cell NHL with transformation and the dose is between about 200 mg and about 300 mg. In another embodiment, the cancer is low-grade B-cell NHL with Richter's transformation and the dose is between about 200 mg and about 300 mg. In another embodiment, the cancer is low-grade B-cell NHL with transformation and the dose is between about 225 mg and about 300 mg. In another embodiment, the cancer is low-grade B-cell NHL with Richter's transformation and the dose is between about 225 mg and about 300 mg. In another embodiment, the cancer is low-grade B-cell NHL with transformation and the dose is between about 250 mg and about 300 mg. In another embodiment, the cancer is low-grade B-cell NHL with Richter's transformation and the dose is between about 250 mg and about 300 mg. In another embodiment, the cancer is low-grade B-cell NHL with transformation and the dose is between about 275 mg and about 300 mg. In another embodiment, the cancer is low-grade B-cell NHL with Richter's transformation and the dose is between about 275 mg and about 300 mg. In another embodiment, the cancer is low-grade B-cell NHL with transformation and the dose is between about 120 mg and about 200 mg. In another embodiment, the cancer is low-grade B-cell NHL with Richter's transformation and the dose is between about 120 mg and about 200 mg. In another embodiment, the cancer is low-grade B-cell NHL with transformation and the dose is between about 125 mg and about 200 mg. In another embodiment, the cancer is low-grade B-cell NHL with Richter's transformation and the dose is between about 125 mg and about 200 mg. In another embodiment, the cancer is low-grade B-cell NHL with transformation and the dose is between about 150 mg and about 200 mg. In another embodiment, the cancer is low-grade B-cell NHL with Richter's transformation and the dose is between about 150 mg and about 200 mg. In another embodiment, the cancer is low-grade B-cell NHL with transformation and the dose is between about 175 mg and about 200 mg. In another embodiment, the cancer is low-grade B-cell NHL with Richter's transformation and the dose is between about 175 mg and about 200 mg. In another embodiment, the cancer is low-grade B-cell NHL with transformation and the dose is between about 120 mg and about 150 mg. In another embodiment, the cancer is low-grade B-cell NHL with Richter's transformation and the dose is between about 120 mg and about 150 mg. In another embodiment, the cancer is low-grade B-cell NHL with transformation and the dose is between about 125 mg and about 150 mg. In another embodiment, the cancer is low-grade B-cell NHL with Richter's transformation and the dose is between about 125 mg and about 150 mg.

In another embodiment, the cancer is B-cell NHL with central nervous system (CNS) involvement or is a primary CNS lymphoma. In another embodiment, the cancer is B-cell NHL with CNS involvement or is a primary CNS lymphoma and the dose is between about 120 mg and about 300 mg. In another embodiment, the cancer is B-cell NHL with CNS involvement or is a primary CNS lymphoma and the dose is between about 125 mg and about 300 mg. In another embodiment, the cancer is B-cell NHL with CNS involvement or is a primary CNS lymphoma and the dose is between about 150 mg and about 300 mg. In another embodiment, the cancer is B-cell NHL with CNS involvement or is a primary CNS lymphoma and the dose is between about 175 mg and about 300 mg. In another embodiment, the cancer is B-cell NHL with CNS involvement or is a primary CNS lymphoma and the dose is between about 200 mg and about 300 mg. In another embodiment, the cancer is B-cell NHL with CNS involvement or is a primary CNS lymphoma and the dose is between about 225 mg and about 300 mg. In another embodiment, the cancer is B-cell NHL with CNS involvement or is a primary CNS lymphoma and the dose is between about 250 mg and about 300 mg. In another embodiment, the cancer is B-cell NHL with CNS involvement or is a primary CNS lymphoma and the dose is between about 275 mg and about 300 mg. In another embodiment, the cancer is B-cell NHL with CNS involvement or is a primary CNS lymphoma and the dose is between about 120 mg and about 200 mg. In another embodiment, the cancer is B-cell NHL with CNS involvement or is a primary CNS lymphoma and the dose is between about 125 mg and about 200 mg. In another embodiment, the cancer is B-cell NHL with CNS involvement or is a primary CNS lymphoma and the dose is between about 150 mg and about 200 mg. In another embodiment, the cancer is B-cell NHL with CNS involvement or is a primary CNS lymphoma and the dose is between about 175 mg and about 200 mg. In another embodiment, the cancer is B-cell NHL with CNS involvement or is a primary CNS lymphoma and the dose is between about 120 mg and about 150 mg. In another embodiment, the cancer is B-cell NHL with CNS involvement or is a primary CNS lymphoma and the dose is between about 125 mg and about 150 mg.

In another embodiment, the cancer is DLBCL. In another embodiment, the cancer is DLBCL and the dose is between about 120 mg and about 300 mg. In another embodiment, the cancer is DLBCL and the dose is between about 125 mg and about 300 mg. In another embodiment, the cancer is DLBCL and the dose is between about 150 mg and about 300 mg. In another embodiment, the cancer is DLBCL and the dose is between about 175 mg and about 300 mg. In another embodiment, the cancer is DLBCL and the dose is between about 200 mg and about 300 mg. In another embodiment, the cancer is DLBCL and the dose is between about 225 mg and about 300 mg. In another embodiment, the cancer is DLBCL and the dose is between about 250 mg and about 300 mg. In another embodiment, the cancer is DLBCL and the dose is between about 275 mg and about 300 mg. In another embodiment, the cancer is DLBCL and the dose is between about 120 mg and about 200 mg. In another embodiment, the cancer is DLBCL and the dose is between about 125 mg and about 200 mg. In another embodiment, the cancer is DLBCL and the dose is between about 150 mg and about 200 mg. In another embodiment, the cancer is DLBCL and the dose is between about 175 mg and about 200 mg. In another embodiment, the cancer is DLBCL and the dose is between about 120 mg and about 150 mg. In another embodiment, the cancer is DLBCL and the dose is between about 125 mg and about 150 mg.

In another embodiment, the cancer is double hit DLBCL. In another embodiment, the cancer is double hit DLBCL and the dose is between about 120 mg and about 300 mg. In another embodiment, the cancer is double hit DLBCL and the dose is between about 125 mg and about 300 mg. In another embodiment, the cancer is double hit DLBCL and the dose is between about 150 mg and about 300 mg. In another embodiment, the cancer is double hit DLBCL and the dose is between about 175 mg and about 300 mg. In another embodiment, the cancer is double hit DLBCL and the dose is between about 200 mg and about 300 mg. In another embodiment, the cancer is double hit DLBCL and the dose is between about 225 mg and about 300 mg. In another embodiment, the cancer is double hit DLBCL and the dose is between about 250 mg and about 300 mg. In another embodiment, the cancer is double hit DLBCL and the dose is between about 275 mg and about 300 mg. In another embodiment, the cancer is double hit DLBCL and the dose is between about 120 mg and about 200 mg. In another embodiment, the cancer is double hit DLBCL and the dose is between about 125 mg and about 200 mg. In another embodiment, the cancer is double hit DLBCL and the dose is between about 150 mg and about 200 mg. In another embodiment, the cancer is double hit DLBCL and the dose is between about 175 mg and about 200 mg. In another embodiment, the cancer is double hit DLBCL and the dose is between about 120 mg and about 150 mg. In another embodiment, the cancer is double hit DLBCL and the dose is between about 125 mg and about 150 mg.

In another embodiment, the cancer is double expressor DLBCL. In another embodiment, the cancer is double expressor DLBCL and the dose is between about 120 mg and about 300 mg. In another embodiment, the cancer is double expressor DLBCL and the dose is between about 125 mg and about 300 mg. In another embodiment, the cancer is double expressor DLBCL and the dose is between about 150 mg and about 300 mg. In another embodiment, the cancer is double expressor DLBCL and the dose is between about 175 mg and about 300 mg. In another embodiment, the cancer is double expressor DLBCL and the dose is between about 200 mg and about 300 mg. In another embodiment, the cancer is double expressor DLBCL and the dose is between about 225 mg and about 300 mg. In another embodiment, the cancer is double expressor DLBCL and the dose is between about 250 mg and about 300 mg. In another embodiment, the cancer is double expressor DLBCL and the dose is between about 275 mg and about 300 mg. In another embodiment, the cancer is double expressor DLBCL and the dose is between about 120 mg and about 200 mg. In another embodiment, the cancer is double expressor DLBCL and the dose is between about 125 mg and about 200 mg. In another embodiment, the cancer is double expressor DLBCL and the dose is between about 150 mg and about 200 mg. In another embodiment, the cancer is double expressor DLBCL and the dose is between about 175 mg and about 200 mg. In another embodiment, the cancer is double expressor DLBCL and the dose is between about 120 mg and about 150 mg. In another embodiment, the cancer is double expressor DLBCL and the dose is between about 125 mg and about 150 mg.

In another embodiment, the cancer is DLBCL and the patient is post stem cell transplant. In another embodiment, the cancer is DLBCL, the patient is post stem cell transplant, and the dose is between about 120 mg and about 300 mg. In another embodiment, the cancer is DLBCL, the patient is post stem cell transplant, and the dose is between about 125 mg and about 300 mg. In another embodiment, the cancer is DLBCL, the patient is post stem cell transplant, and the dose is between about 150 mg and about 300 mg. In another embodiment, the cancer is DLBCL, the patient is post stem cell transplant, and the dose is between about 175 mg and about 300 mg. In another embodiment, the cancer is DLBCL, the patient is post stem cell transplant, and the dose is between about 200 mg and about 300 mg. In another embodiment, the cancer is DLBCL, the patient is post stem cell transplant, and the dose is between about 225 mg and about 300 mg. In another embodiment, the cancer is DLBCL, the patient is post stem cell transplant, and the dose is between about 250 mg and about 300 mg. In another embodiment, the cancer is DLBCL, the patient is post stem cell transplant, and the dose is between about 275 mg and about 300 mg. In another embodiment, the cancer is DLBCL, the patient is post stem cell transplant, and the dose is between about 120 mg and about 200 mg. In another embodiment, the cancer is DLBCL, the patient is post stem cell transplant, and the dose is between about 125 mg and about 200 mg. In another embodiment, the cancer is DLBCL, the patient is post stem cell transplant, and the dose is between about 150 mg and about 200 mg. In another embodiment, the cancer is DLBCL, the patient is post stem cell transplant, and the dose is between about 175 mg and about 200 mg. In another embodiment, the cancer is DLBCL, the patient if is post stem cell transplant, and the dose is between about 120 mg and about 150 mg. In another embodiment, the cancer is DLBCL, the patient is post stem cell transplant, and the dose is between about 125 mg and about 150 mg. Preferably, the stem cells are autologous. Preferably, the stem cells are allogeneic.

In another embodiment, the cancer is DLBCL and the patient is post CAR-T therapy. In another embodiment, the cancer is DLBCL, the patient is post CAR-T therapy, and the dose is between about 120 mg and about 300 mg. In another embodiment, the cancer is DLBCL, the patient is post CAR-T therapy, and the dose is between about 125 mg and about 300 mg. In another embodiment, the cancer is DLBCL, the patient is post CAR-T therapy, and the dose is between about 150 mg and about 300 mg. In another embodiment, the cancer is DLBCL, the patient is post CAR-T therapy, and the dose is between about 175 mg and about 300 mg. In another embodiment, the cancer is DLBCL, the patient is post CAR-T therapy, and the dose is between about 200 mg and about 300 mg. In another embodiment, the cancer is DLBCL, the patient is post CAR-T therapy, and the dose is between about 225 mg and about 300 mg. In another embodiment, the cancer is DLBCL, the patient is post CAR-T therapy, and the dose is between about 250 mg and about 300 mg. In another embodiment, the cancer is DLBCL, the patient is post CAR-T therapy, and the dose is between about 275 mg and about 300 mg. In another embodiment, the cancer is DLBCL, the patient is post CAR-T therapy, and the dose is between about 120 mg and about 200 mg. In another embodiment, the cancer is DLBCL, the patient is post CAR-T therapy, and the dose is between about 125 mg and about 200 mg. In another embodiment, the cancer is DLBCL, the is post CAR-T therapy, and the dose is between about 150 mg and about 200 mg. In another embodiment, the cancer is DLBCL, the patient is post CAR-T therapy, and the dose is between about 175 mg and about 200 mg. In another embodiment, the cancer is DLBCL, the patient is post CAR-T therapy, and the dose is between about 120 mg and about 150 mg. In another embodiment, the cancer is DLBCL, the patient is post CAR-T therapy, and the dose is between about 125 mg and about 150 mg.

In another embodiment, the cancer is B-cell prolymphocytic leukemia (B-cell PLL). In another embodiment, the cancer is B-cell PLL and the dose is between about 120 mg and about 300 mg. In another embodiment, the cancer is B-cell PLL and the dose is between about 125 mg and about 300 mg. In another embodiment, the cancer is B-cell PLL and the dose is between about 150 mg and about 300 mg. In another embodiment, the cancer is B-cell PLL and the dose is between about 175 mg and about 300 mg. In another embodiment, the cancer is B-cell PLL and the dose is between about 200 mg and about 300 mg. In another embodiment, the cancer is B-cell PLL and the dose is between about 225 mg and about 300 mg. In another embodiment, the cancer is B-cell PLL and the dose is between about 250 mg and about 300 mg. In another embodiment, the cancer is B-cell PLL and the dose is between about 275 mg and about 300 mg. In another embodiment, the cancer is B-cell PLL and the dose is between about 120 mg and about 200 mg. In another embodiment, the cancer is B-cell PLL and the dose is between about 125 mg and about 200 mg. In another embodiment, the cancer is B-cell PLL and the dose is between about 150 mg and about 200 mg. In another embodiment, the cancer is B-cell PLL and the dose is between about 175 mg and about 200 mg. In another embodiment, the cancer is B-cell PLL and the dose is between about 120 mg and about 150 mg. In another embodiment, the cancer is B-cell PLL and the dose is between about 125 mg and about 150 mg.

In another embodiment, the cancer is MCL. In another embodiment, the cancer is blastoid MCL. In another embodiment, the cancer is non-blastoid MCL. In another embodiment, the cancer is MCL and the dose is between about 120 mg and about 300 mg. In another embodiment, the cancer is blastoid MCL and the dose is between about 120 mg and about 300 mg. In another embodiment, the cancer is non-blastoid MCL and the dose is between about 120 mg and about 300 mg. In another embodiment, the cancer is MCL and the dose is between about 125 mg and about 300 mg. In another embodiment, the cancer is blastoid MCL and the dose is between about 125 mg and about 300 mg. In another embodiment, the cancer is non-blastoid MCL and the dose is between about 125 mg and about 300 mg. In another embodiment, the cancer is MCL and the dose is between about 150 mg and about 300 mg. In another embodiment, the cancer is blastoid MCL and the dose is between about 150 mg and about 300 mg. In another embodiment, the cancer is non-blastoid MCL and the dose is between about 150 mg and about 300 mg. In another embodiment, the cancer is MCL and the dose is between about 175 mg and about 300 mg. In another embodiment, the cancer is blastoid MCL and the dose is between about 175 mg and about 300 mg. In another embodiment, the cancer is non-blastoid MCL and the dose is between about 175 mg and about 300 mg. In another embodiment, the cancer is MCL and the dose is between about 200 mg and about 300 mg. In another embodiment, the cancer is blastoid MCL and the dose is between about 200 mg and about 300 mg. In another embodiment, the cancer is non-blastoid MCL and the dose is between about 200 mg and about 300 mg. In another embodiment, the cancer is MCL and the dose is between about 225 mg and about 300 mg. In another embodiment, the cancer is blastoid MCL and the dose is between about 225 mg and about 300 mg. In another embodiment, the cancer is non-blastoid MCL and the dose is between about 225 mg and about 300 mg. In another embodiment, the cancer is MCL and the dose is between about 250 mg and about 300 mg. In another embodiment, the cancer is blastoid MCL and the dose is between about 250 mg and about 300 mg. In another embodiment, the cancer is non-blastoid MCL and the dose is between about 275 mg and about 300 mg. In another embodiment, the cancer is MCL and the dose is between about 120 mg and about 200 mg. In another embodiment, the cancer is blastoid MCL and the dose is between about 120 mg and about 200 mg. In another embodiment, the cancer is non-blastoid MCL and the dose is between about 120 mg and about 200 mg. In another embodiment, the cancer is MCL and the dose is between about 125 mg and about 200 mg. In another embodiment, the cancer is blastoid MCL and the dose is between about 125 mg and about 200 mg. In another embodiment, the cancer is non-blastoid MCL and the dose is between about 125 mg and about 200 mg. In another embodiment, the cancer is MCL and the dose is between about 150 mg and about 200 mg. In another embodiment, the cancer is blastoid MCL and the dose is between about 150 mg and about 200 mg. In another embodiment, the cancer is non-blastoid MCL and the dose is between about 150 mg and about 200 mg. In another embodiment, the cancer is MCL and the dose is between about 175 mg and about 200 mg. In another embodiment, the cancer is blastoid MCL and the dose is between about 175 mg and about 200 mg. In another embodiment, the cancer is non-blastoid MCL and the dose is between about 175 mg and about 200 mg. In another embodiment, the cancer is MCL and the dose is between about 120 mg and about 150 mg. In another embodiment, the cancer is blastoid MCL and the dose is between about 120 mg and about 150 mg. In another embodiment, the cancer is non-blastoid MCL and the dose is between about 120 mg and about 150 mg. In another embodiment, the cancer is MCL and the dose is between about 125 mg and about 150 mg. In another embodiment, the cancer is blastoid MCL and the dose is between about 125 mg and about 150 mg. In another embodiment, the cancer is non-blastoid MCL and the dose is between about 125 mg and about 150 mg.

In another embodiment, the cancer is pleomorphic MCL. In another embodiment, the cancer is pleomorphic MCL and the dose is between about 120 mg and about 300 mg. In another embodiment, the cancer is pleomorphic MCL and the dose is between about 125 mg and about 300 mg. In another embodiment, the cancer is pleomorphic MCL and the dose is between about 150 mg and about 300 mg. In another embodiment, the cancer is pleomorphic MCL and the dose is between about 175 mg and about 300 mg. In another embodiment, the cancer is pleomorphic MCL and the dose is between about 200 mg and about 300 mg. In another embodiment, the cancer is pleomorphic MCL and the dose is between about 225 mg and about 300 mg. In another embodiment, the cancer is pleomorphic MCL and the dose is between about 275 mg and about 300 mg. In another embodiment, the cancer is pleomorphic MCL and the dose is between about 120 mg and about 200 mg. In another embodiment, the cancer is pleomorphic MCL and the dose is between about 125 mg and about 200 mg. In another embodiment, the cancer is pleomorphic MCL and the dose is between about 150 mg and about 200 mg. In another embodiment, the cancer is pleomorphic MCL and the dose is between about 175 mg and about 200 mg. In another embodiment, the cancer is pleomorphic MCL and the dose is between about 120 mg and about 150 mg. In another embodiment, the cancer is pleomorphic MCL and the dose is between about 125 mg and about 150 mg.

In another embodiment, the cancer is MCL with an overexpression of cyclin D1 and/or t(11;14). In another embodiment, the cancer is MCL with an overexpression of cyclin D1 and/or t(11;14) and the dose is between about 120 mg and about 300 mg. In another embodiment, the cancer is MCL with an overexpression of cyclin D1 and/or t(11;14) and the dose is between about 125 mg and about 300 mg. In another embodiment, the cancer is MCL with an overexpression of cyclin D1 and/or t(11;14) and the dose is between about 150 mg and about 300 mg. In another embodiment, the cancer is MCL with an overexpression of cyclin D1 and/or t(11;14) and the dose is between about 175 mg and about 300 mg. In another embodiment, the cancer is MCL with an overexpression of cyclin D1 and/or t(11;14) and the dose is between about 200 mg and about 300 mg. In another embodiment, the cancer is MCL with an overexpression of cyclin D1 and/or t(11;14) and the dose is between about 225 mg and about 300 mg. In another embodiment, the cancer is MCL with an overexpression of cyclin D1 and/or t(11;14) and the dose is between about 250 mg and about 300 mg. In another embodiment, the cancer is MCL with an overexpression of cyclin D1 and/or t(11;14) and the dose is between about 275 mg and about 300 mg. In another embodiment, the cancer is MCL with an overexpression of cyclin D1 and/or t(11;14) and the dose is between about 120 mg and about 200 mg. In another embodiment, the cancer is MCL with an overexpression of cyclin D1 and/or t(11;14) and the dose is between about 125 mg and about 200 mg. In another embodiment, the cancer is MCL with an overexpression of cyclin D1 and/or t(11;14) and the dose is between about 150 mg and about 200 mg. In another embodiment, the cancer is MCL with an overexpression of cyclin D1 and/or t(11;14) and the dose is between about 175 mg and about 200 mg. In another embodiment, the cancer is MCL with an overexpression of cyclin D1 and/or t(11;14), and the dose is between about 120 mg and about 150 mg. In another embodiment, the cancer is MCL with an overexpression of cyclin D1 and/or t(11;14) and the dose is between about 125 mg and about 150 mg.

In another embodiment, the cancer is MCL and the patient is post CAR-T therapy. In another embodiment, the cancer is MCL, the patient is post CAR-T therapy, and the dose is between about 120 mg and about 300 mg. In another embodiment, the cancer is MCL, the patient is post CAR-T therapy, and the dose is between about 125 mg and about 300 mg. In another embodiment, the cancer is MCL, the patient is post CAR-T therapy, and the dose is between about 150 mg and about 300 mg. In another embodiment, the cancer is MCL, the patient is post CAR-T therapy, and the dose is between about 175 mg and about 300 mg. In another embodiment, the cancer is MCL, the patient is post CAR-T therapy, and the dose is between about 200 mg and about 300 mg. In another embodiment, the cancer is MCL, the patient is post CAR-T therapy, and the dose is between about 225 mg and about 300 mg. In another embodiment, the cancer is MCL, the patient is post CAR-T therapy, and the dose is between about 250 mg and about 300 mg. In another embodiment, the cancer is MCL, the patient is post CAR-T therapy, and the dose is between about 275 mg and about 300 mg. In another embodiment, the cancer is MCL, the patient is post CAR-T therapy, and the dose is between about 120 mg and about 200 mg. In another embodiment, the cancer is MCL, the patient is post CAR-T therapy, and the dose is between about 125 mg and about 200 mg. In another embodiment, the cancer is MCL, the patient is post CAR-T therapy, and the dose is between about 150 mg and about 200 mg. In another embodiment, the cancer is MCL, the patient is post CAR-T therapy, and the dose is between about 175 mg and about 200 mg. In another embodiment, the cancer is MCL, the patient is post CAR-T therapy, and the dose is between about 120 mg and about 150 mg. In another embodiment, the cancer is MCL, the patient is post CAR-T therapy, and the dose is between about 125 mg and about 150 mg.

In another embodiment, the cancer is MCL and the patient is post stem cell transplant. In another embodiment, the cancer is MCL, the patient is post stem cell transplant, and the dose is between about 120 mg and about 300 mg. In another embodiment, the cancer is MCL, the patient is post stem cell transplant, and the dose is between about 125 mg and about 300 mg. In another embodiment, the cancer is MCL, the patient is post stem cell transplant, and the dose is between about 150 mg and about 300 mg. In another embodiment, the cancer is MCL, the patient is post stem cell transplant, and the dose is between about 175 mg and about 300 mg. In another embodiment, the cancer is MCL, the patient is post stem cell transplant, and the dose is between about 200 mg and about 300 mg. In another embodiment, the cancer is MCL, the patient is post stem cell transplant, and the dose is between about 225 mg and about 300 mg. In another embodiment, the cancer is MCL, the patient is post stem cell transplant, and the dose is between about 250 mg and about 300 mg. In another embodiment, the cancer is MCL, the patient is post stem cell transplant, and the dose is between about 275 mg and about 300 mg. In another embodiment, the cancer is MCL, the patient is post stem cell transplant, and the dose is between about 120 mg and about 200 mg. In another embodiment, the cancer is MCL, the patient is post stem cell transplant, and the dose is between about 125 mg and about 200 mg. In another embodiment, the cancer is MCL, the patient is post stem cell transplant, and the dose is between about 150 mg and about 200 mg. In another embodiment, the cancer is MCL, the patient is post stem cell transplant, and the dose is between about 175 mg and about 200 mg. In another embodiment, the cancer is MCL, the patient is post stem cell transplant, and the dose is between about 120 mg and about 150 mg. In another embodiment, the cancer is MCL, the patient is post stem cell transplant, and the dose is between about 125 mg and about 150 mg. Preferably, the stem cells are autologous. Preferably, the stem cells are allogeneic.

In another embodiment, the cancer is MCL and the patient has a 17p deletion. In another embodiment, the cancer is MCL, the patient has a 17p deletion, and the dose is between about 120 mg and about 300 mg. In another embodiment, the cancer is MCL, the patient has a 17p deletion, and the dose is between about 125 mg and about 300 mg. In another embodiment, the cancer is MCL, the patient has a 17p deletion, and the dose is between about 150 mg and about 300 mg. In another embodiment, the cancer is MCL, the patient has a 17p deletion, and the dose is between about 175 mg and about 300 mg. In another embodiment, the cancer is MCL, the patient has a 17p deletion, and the dose is between about 200 mg and about 300 mg. In another embodiment, the cancer is MCL, the patient has a 17p deletion, and the dose is between about 225 mg and about 300 mg. In another embodiment, the cancer is MCL, the patient has a 17p deletion, and the dose is between about 250 mg and about 300 mg. In another embodiment, the cancer is MCL, the patient has a 17p deletion, and the dose is between about 275 mg and about 300 mg. In another embodiment, the cancer is MCL, the patient has a 17p deletion, and the dose is between about 120 mg and about 200 mg. In another embodiment, the cancer is MCL, the patient has a 17p deletion, and the dose is between about 125 mg and about 200 mg. In another embodiment, the cancer is MCL, the patient has a 17p deletion, and the dose is between about 150 mg and about 200 mg. In another embodiment, the cancer is MCL, the patient has a 17p deletion, and the dose is between about 175 mg and about 200 mg. In another embodiment, the cancer is MCL, the patient has a 17p deletion, and the dose is between about 120 mg and about 150 mg. In another embodiment, the cancer is MCL, the patient has a 17p deletion, and the dose is between about 125 mg and about 150 mg.

In another embodiment, the cancer is MCL and the patient has a TP53 deletion. In another embodiment, the cancer is MCL, the patient has a TP53 deletion, and the dose is between about 120 mg and about 300 mg. In another embodiment, the cancer is MCL, the patient has a TP53 deletion, and the dose is between about 125 mg and about 300 mg. In another embodiment, the cancer is MCL, the patient has a TP53 deletion, and the dose is between about 150 mg and about 300 mg. In another embodiment, the cancer is MCL, the patient has a TP53 deletion, and the dose is between about 175 mg and about 300 mg. In another embodiment, the cancer is MCL, the patient has a TP53 deletion, and the dose is between about 200 mg and about 300 mg. In another embodiment, the cancer is MCL, the patient has a TP53 deletion, and the dose is between about 225 mg and about 300 mg. In another embodiment, the cancer is MCL, the patient has a TP53 deletion, and the dose is between about 250 mg and about 300 mg. In another embodiment, the cancer is MCL, the patient has a TP53 deletion, and the dose is between about 275 mg and about 300 mg. In another embodiment, the cancer is MCL, the patient has a TP53 deletion, and the dose is between about 120 mg and about 200 mg. In another embodiment, the cancer is MCL, the patient has a TP53 deletion, and the dose is between about 125 mg and about 200 mg. In another embodiment, the cancer is MCL, the patient has a TP53 deletion, and the dose is between about 150 mg and about 200 mg. In another embodiment, the cancer is MCL, the patient has a TP53 deletion, and the dose is between about 175 mg and about 200 mg. In another embodiment, the cancer is MCL, the patient has a TP53 deletion, and the dose is between about 120 mg and about 150 mg. In another embodiment, the cancer is MCL, the patient has a TP53 deletion, and the dose is between about 125 mg and about 150 mg.

In another embodiment, the cancer is MCL and the patient has a TP53 mutation. In another embodiment, the cancer is MCL, the patient has a TP53 mutation, and the dose is between about 120 mg and about 300 mg. In another embodiment, the cancer is MCL, the patient has a TP53 mutation, and the dose is between about 125 mg and about 300 mg. In another embodiment, the cancer is MCL, the patient has a TP53 mutation, and the dose is between about 150 mg and about 300 mg. In another embodiment, the cancer is MCL, the patient has a TP53 mutation, and the dose is between about 175 mg and about 300 mg. In another embodiment, the cancer is MCL, the patient has a TP53 mutation, and the dose is between about 200 mg and about 300 mg. In another embodiment, the cancer is MCL, the patient has a TP53 mutation, and the dose is between about 225 mg and about 300 mg. In another embodiment, the cancer is MCL, the patient has a TP53 mutation, and the dose is between about 250 mg and about 300 mg. In another embodiment, the cancer is MCL, the patient has a TP53 mutation, and the dose is between about 275 mg and about 300 mg. In another embodiment, the cancer is MCL, the patient has a TP53 mutation, and the dose is between about 120 mg and about 200 mg. In another embodiment, the cancer is MCL, the patient has a TP53 mutation, and the dose is between about 125 mg and about 200 mg. In another embodiment, the cancer is MCL, the patient has a TP53 mutation, and the dose is between about 150 mg and about 200 mg. In another embodiment, the cancer is MCL, the patient has a TP53 mutation, and the dose is between about 175 mg and about 200 mg. In another embodiment, the cancer is MCL, the patient has a TP53 mutation, and the dose is between about 120 mg and about 150 mg. In another embodiment, the cancer is MCL, the patient has a TP53 mutation, and the dose is between about 125 mg and about 150 mg.

In another embodiment, the cancer is MCL and the patient has a 17p13 deletion and a TP53 mutation. In another embodiment, the cancer is MCL, the patient has a 17p13 deletion and a TP53 mutation, and the dose is between about 120 mg and about 300 mg. In another embodiment, the cancer is MCL, the patient has a 17p13 deletion and a TP53 mutation, and the dose is between about 125 mg and about 300 mg. In another embodiment, the cancer is MCL, the patient has a 17p13 deletion and a TP53 mutation, and the dose is between about 150 mg and about 300 mg. In another embodiment, the cancer is MCL, the patient has a 17p13 deletion and a TP53 mutation, and the dose is between about 175 mg and about 300 mg. In another embodiment, the cancer is MCL, the patient has a 17p13 deletion and a TP53 mutation, and the dose is between about 200 mg and about 300 mg. In another embodiment, the cancer is MCL, the patient has a 17p13 deletion and a TP53 mutation, and the dose is between about 225 mg and about 300 mg. In another embodiment, the cancer is MCL, the patient has a 17p13 deletion and a TP53 mutation, and the dose is between about 250 mg and about 300 mg. In another embodiment, the cancer is MCL, the patient has a 17p13 deletion and a TP53 mutation, and the dose is between about 275 mg and about 300 mg. In another embodiment, the cancer is MCL, the patient has a 17p13 deletion and a TP53 mutation, and the dose is between about 120 mg and about 200 mg. In another embodiment, the cancer is MCL the patient has a 17p13 deletion and a TP53 mutation, and the dose is between about 125 mg and about 200 mg. In another embodiment, the cancer is MCL, the patient has a 17p13 deletion and a TP53 mutation, and the dose is between about 150 mg and about 200 mg. In another embodiment, the cancer is MCL, the patient has a 17p13 deletion and TP53 mutation, and the dose is between about 175 mg and about 200 mg. In another embodiment, the cancer is MCL, the patient has a 17p13 deletion and TP53 mutation, and the dose is between about 120 mg and about 150 mg. In another embodiment, the cancer is MCL, the patient has a 17p13 deletion and TP53 mutation, and the dose is between about 125 mg and about 150 mg.

In another embodiment, the cancer is CLL. In another embodiment, the cancer is CLL and the dose is between about 120 mg and about 300 mg. In another embodiment, the cancer is CLL and the dose is between about 125 mg and about 300 mg. In another embodiment, the cancer is CLL and the dose is between about 150 mg and about 300 mg. In another embodiment, the cancer is CLL and the dose is between about 175 mg and about 300 mg. In another embodiment, the cancer is CLL and the dose is between about 200 mg and about 300 mg. In another embodiment, the cancer is CLL and the dose is between about 225 mg and about 300 mg. In another embodiment, the cancer is CLL and the dose is between about 250 mg and about 300 mg. In another embodiment, the cancer is CLL and the dose is between about 275 mg and about 300 mg. In another embodiment, the cancer is CLL and the dose is between about 120 mg and about 200 mg. In another embodiment, the cancer is CLL and the dose is between about 125 mg and about 200 mg. In another embodiment, the cancer is CLL and the dose is between about 150 mg and about 200 mg. In another embodiment, the cancer is CLL and the dose is between about 175 mg and about 200 mg. In another embodiment, the cancer is CLL and the dose is between about 120 mg and about 150 mg. In another embodiment, the cancer is CLL and the dose is between about 125 mg and about 150 mg.

In another embodiment, the cancer is CLL and the patient has a PLCg2 mutation. In another embodiment, the cancer is CLL, the patient has a PLCg2 mutation, and the dose is between about 120 mg and about 300 mg. In another embodiment, the cancer is CLL, the patient has a PLCg2 mutation, and the dose is between about 125 mg and about 300 mg. In another embodiment, the cancer is CLL, the patient has a PLCg2 mutation, and the dose is between about 150 mg and about 300 mg. In another embodiment, the cancer is CLL, the patient has a PLCg2 mutation, and the dose is between about 175 mg and about 300 mg. In another embodiment, the cancer is CLL, the patient has a PLCg2 mutation, and the dose is between about 200 mg and about 300 mg. In another embodiment, the cancer is CLL, the patient has a PLCg2 mutation, and the dose is between about 225 mg and about 300 mg. In another embodiment, the cancer is CLL, the patient has a PLCg2 mutation, and the dose is between about 250 mg and about 300 mg. In another embodiment, the cancer is CLL, the patient has a PLCg2 mutation, and the dose is between about 275 mg and about 300 mg. In another embodiment, the cancer is CLL, the patient has a PLCg2 mutation, and the dose is between about 120 mg and about 200 mg. In another embodiment, the cancer is CLL, the patient has a PLCg2 mutation, and the dose is between about 125 mg and about 200 mg. In another embodiment, the cancer is CLL, the patient has a PLCg2 mutation and the dose is between about 150 mg and about 200 mg. In another embodiment, the cancer is CLL, the patient has a PLCg2 mutation, and the dose is between about 175 mg and about 200 mg. In another embodiment, the cancer is CLL, the patient has a PLCg2 mutation, and the dose is between about 120 mg and about 150 mg. In another embodiment, the cancer is CLL, the patient has a PLCg2 mutation, and the dose is between about 125 mg and about 150 mg.

In another embodiment, the cancer is trisomy 12 CLL. In another embodiment, the cancer is trisomy 12 CLL and the dose is between about 120 mg and about 300 mg. In another embodiment, the cancer is trisomy 12 CLL and the dose is between about 125 mg and about 300 mg. In another embodiment, the cancer is trisomy 12 CLL and the dose is between about 150 mg and about 300 mg. In another embodiment, the cancer is trisomy 12 CLL and the dose is between about 175 mg and about 300 mg. In another embodiment, the cancer is trisomy 12 CLL and the dose is between about 200 mg and about 300 mg. In another embodiment, the cancer is trisomy 12 CLL and the dose is between about 225 mg and about 300 mg. In another embodiment, the cancer is trisomy 12 CLL and the dose is between about 250 mg and about 300 mg. In another embodiment, the cancer is trisomy 12 CLL and the dose is between about 275 mg and about 300 mg. In another embodiment, the cancer is trisomy 12 CLL and the dose is between about 120 mg and about 200 mg. In another embodiment, the cancer is trisomy 12 CLL and the dose is between about 125 mg and about 200 mg. In another embodiment, the cancer is trisomy 12 CLL and the dose is between about 150 mg and about 200 mg. In another embodiment, the cancer is trisomy 12 CLL and the dose is between about 175 mg and about 200 mg. In another embodiment, the cancer is trisomy 12 CLL and the dose is between about 120 mg and about 150 mg. In another embodiment, the cancer is trisomy 12 CLL and the dose is between about 125 mg and about 150 mg.

In another embodiment, the cancer is CLL and the patient has Richter's transformation. In another embodiment, the cancer is CLL, the patient has Richter's transformation, and the dose is between about 120 mg and about 300 mg. In another embodiment, the cancer is CLL, the patient has Richter's transformation, and the dose is between about 125 mg and about 300 mg. In another embodiment, the cancer is CLL, the patient has Richter's transformation, and the dose is between about 150 mg and about 300 mg. In another embodiment, the cancer is CLL, the patient has Richter's transformation, and the dose is between about 175 mg and about 300 mg. In another embodiment, the cancer is CLL, the patient has Richter's transformation, and the dose is between about 200 mg and about 300 mg. In another embodiment, the cancer is CLL, the patient has Richter's transformation, and the dose is between about 225 mg and about 300 mg. In another embodiment, the cancer is CLL, the patient has Richter's transformation, and the dose is between about 250 mg and about 300 mg. In another embodiment, the cancer is CLL, the patient has Richter's transformation, and the dose is between about 275 mg and about 300 mg. In another embodiment, the cancer is CLL, the patient has Richter's transformation, and the dose is between about 120 mg and about 200 mg. In another embodiment, the cancer is CLL, the patient has Richter's transformation, and the dose is between about 125 mg and about 200 mg. In another embodiment, the cancer is CLL, the patient has Richter's transformation, and the dose is between about 150 mg and about 200 mg. In another embodiment, the cancer is CLL, the patient has Richter's transformation, and the dose is between about 175 mg and about 200 mg. In another embodiment, the cancer is CLL, the patient has Richter's transformation, and the dose is between about 120 mg and about 150 mg. In another embodiment, the cancer is CLL, the patient has Richter's transformation, and the dose is between about 125 mg and about 150 mg.

In another embodiment, the cancer is CLL and the patient has a 17p deletion. In another embodiment, the cancer is CLL, the patient has a 17p deletion, and the dose is between about 120 mg and about 300 mg. In another embodiment, the cancer is CLL, the patient has a 17p deletion, and the dose is between about 125 mg and about 300 mg. In another embodiment, the cancer is CLL, the patient has a 17p deletion, and the dose is between about 150 mg and about 300 mg. In another embodiment, the cancer is CLL, the patient has a 17p deletion, and the dose is between about 175 mg and about 300 mg. In another embodiment, the cancer is CLL, the patient has a 17p deletion, and the dose is between about 200 mg and about 300 mg. In another embodiment, the cancer is CLL, the patient has a 17p deletion, and the dose is between about 225 mg and about 300 mg. In another embodiment, the cancer is CLL, the patient has a 17p deletion, and the dose is between about 250 mg and about 300 mg. In another embodiment, the cancer is CLL, the patient has a 17p deletion, and the dose is between about 275 mg and about 300 mg. In another embodiment, the cancer is CLL, the patient has a 17p deletion, and the dose is between about 120 mg and about 200 mg. In another embodiment, the cancer is CLL the patient has a 17p deletion, and the dose is between about 125 mg and about 200 mg. In another embodiment, the cancer is CLL, the patient has a 17p deletion, and the dose is between about 150 mg and about 200 mg. In another embodiment, the cancer is CLL, the patient has a 17p deletion, and the dose is between about 175 mg and about 200 mg. In another embodiment, the cancer is CLL, the patient has a 17p deletion, and the dose is between about 120 mg and about 150 mg. In another embodiment, the cancer is CLL, the patient has a 17p deletion, and the dose is between about 125 mg and about 150 mg.

In another embodiment, the cancer is CLL and the patient has a 17p13 deletion and a TP53 mutation. In another embodiment, the cancer is CLL, the patient has a 17p13 deletion and a TP53 mutation, and the dose is between about 120 mg and about 300 mg. In another embodiment, the cancer is CLL, the patient has a 17p13 deletion and a TP53 mutation, and the dose is between about 125 mg and about 300 mg. In another embodiment, the cancer is CLL, the patient has a 17p13 deletion and a TP53 mutation, and the dose is between about 150 mg and about 300 mg. In another embodiment, the cancer is CLL, the patient has a 17p13 deletion and a TP53 mutation, and the dose is between about 175 mg and about 300 mg. In another embodiment, the cancer is CLL, the patient has a 17p13 deletion and a TP53 mutation, and the dose is between about 200 mg and about 300 mg. In another embodiment, the cancer is CLL, the patient has a 17p13 deletion and a TP53 mutation, and the dose is between about 225 mg and about 300 mg. In another embodiment, the cancer is CLL, the patient has a 17p13 deletion and a TP53 mutation, and the dose is between about 250 mg and about 300 mg. In another embodiment, the cancer is CLL, the patient has a 17p13 deletion and a TP53 mutation, and the dose is between about 275 mg and about 300 mg. In another embodiment, the cancer is CLL, the patient has a 17p13 deletion and a TPS3 mutation, and the dose is between about 120 mg and about 200 mg. In another embodiment, the cancer is CLL the patient has a 17p13 deletion and a TP53 mutation, and the dose is between about 125 mg and about 200 mg. In another embodiment, the cancer is CLL, the patient has a 17p13 deletion and a TPS3 mutation, and the dose is between about 150 mg and about 200 mg. In another embodiment, the cancer is CLL, the patient has a 17p13 deletion and TP53 mutation, and the dose is between about 175 mg and about 200 mg. In another embodiment, the cancer is CLL, the patient has a 17p13 deletion and TP53 mutation, and the dose is between about 120 mg and about 150 mg. In another embodiment, the cancer is CLL, the patient has a 17p13 deletion and TP53 mutation, and the dose is between about 125 mg and about 150 mg.

In another embodiment, the cancer is CLL and the patient has a TP53 deletion. In another embodiment, the cancer is CLL, the patient has a TP53 deletion, and the dose is between about 120 mg and about 300 mg. In another embodiment, the cancer is CLL, the patient has a TP53 deletion, and the dose is between about 125 mg and about 300 mg. In another embodiment, the cancer is CLL, the patient has a TP53 deletion, and the dose is between about 150 mg and about 300 mg. In another embodiment, the cancer is CLL, the patient has a TP53 deletion, and the dose is between about 175 mg and about 300 mg. In another embodiment, the cancer is CLL, the patient has a TP53 deletion, and the dose is between about 200 mg and about 300 mg. In another embodiment, the cancer is CLL, the patient has a TP53 deletion, and the dose is between about 225 mg and about 300 mg. In another embodiment, the cancer is CLL, the patient has a TP53 deletion, and the dose is between about 250 mg and about 300 mg. In another embodiment, the cancer is CLL, the patient has a TP53 deletion, and the dose is between about 275 mg and about 300 mg. In another embodiment, the cancer is CLL, the patient has a TP53 deletion, and the dose is between about 120 mg and about 200 mg. In another embodiment, the cancer is CLL, the patient has a TP53 deletion, and the dose is between about 125 mg and about 200 mg. In another embodiment, the cancer is CLL, the patient has a TP53 deletion, and the dose is between about 150 mg and about 200 mg. In another embodiment, the cancer is CLL, the patient has a TP53 deletion, and the dose is between about 175 mg and about 200 mg. In another embodiment, the cancer is CLL, the patient has a TP53 deletion, and the dose is between about 120 mg and about 150 mg. In another embodiment, the cancer is CLL, the patient has a TP53 deletion, and the dose is between about 125 mg and about 150 mg.

In another embodiment, the cancer is CLL and the patient has a TP53 mutation. In another embodiment, the cancer is CLL, the patient has a TP53 mutation, and the dose is between about 120 mg and about 300 mg. In another embodiment, the cancer is CLL, the patient has a TP53 mutation, and the dose is between about 125 mg and about 300 mg. In another embodiment, the cancer is CLL, the patient has a TP53 mutation, and the dose is between about 150 mg and about 300 mg. In another embodiment, the cancer is CLL, the patient has a TP53 mutation, and the dose is between about 175 mg and about 300 mg. In another embodiment, the cancer is CLL, the patient has a TP53 mutation, and the dose is between about 200 mg and about 300 mg. In another embodiment, the cancer is CLL, the patient has a TP53 mutation, and the dose is between about 225 mg and about 300 mg. In another embodiment, the cancer is CLL, the patient has a TP53 mutation, and the dose is between about 250 mg and about 300 mg. In another embodiment, the cancer is CLL, the patient has a TP53 mutation, and the dose is between about 275 mg and about 300 mg. In another embodiment, the cancer is CLL, the patient has a TP53 mutation, and the dose is between about 120 mg and about 200 mg. In another embodiment, the cancer is CLL, the patient has a TP53 mutation, and the dose is between about 125 mg and about 200 mg. In another embodiment, the cancer is CLL, the patient has a TP53 mutation, and the dose is between about 150 mg and about 200 mg. In another embodiment, the cancer is CLL, the patient has a TP53 mutation, and the dose is between about 175 mg and about 200 mg. In another embodiment, the cancer is CLL, the patient has a TP53 mutation, and the dose is between about 120 mg and about 150 mg. In another embodiment, the cancer is CLL, the patient has a TP53 mutation, and the dose is between about 125 mg and about 150 mg.

In another embodiment, the cancer is CLL and the patient has a 11q deletion. In another embodiment, the cancer is CLL, the patient has a 11q deletion, and the dose is between about 120 mg and about 300 mg. In another embodiment, the cancer is CLL, the patient has a 11q deletion, and the dose is between about 125 mg and about 300 mg. In another embodiment, the cancer is CLL, the patient has a 11q deletion, and the dose is between about 150 mg and about 300 mg. In another embodiment, the cancer is CLL, the patient has a 11q deletion, and the dose is between about 175 mg and about 300 mg. In another embodiment, the cancer is CLL, the patient has a 11q deletion, and the dose is between about 200 mg and about 300 mg. In another embodiment, the cancer is CLL, the patient has a 11q deletion, and the dose is between about 225 mg and about 300 mg. In another embodiment, the cancer is CLL, the patient has a 11q deletion, and the dose is between about 250 mg and about 300 mg. In another embodiment, the cancer is CLL, the patient has a 11q deletion, and the dose is between about 275 mg and about 300 mg. In another embodiment, the cancer is CLL, the patient has a 11q deletion, and the dose is between about 120 mg and about 200 mg. In another embodiment, the cancer is CLL, the patient has a 11q deletion, and the dose is between about 125 mg and about 200 mg. In another embodiment, the cancer is CLL, the patient has a 11q deletion, and the dose is between about 150 mg and about 200 mg. In another embodiment, the cancer is CLL, the patient has a 11q deletion, and the dose is between about 175 mg and about 200 mg. In another embodiment, the cancer is CLL, the patient has a 11q deletion, and the dose is between about 120 mg and about 150 mg. In another embodiment, the cancer is CLL, the patient has a 11q deletion, and the dose is between about 125 mg and about 150 mg.

In another embodiment, the cancer is CLL and the patient has unmutated IGHV. In another embodiment, the cancer is CLL, the patient has unmutated IGHV, and the dose is between about 120 mg and about 300 mg. In another embodiment, the cancer is ¥ CLL, the patient has unmutated IGHV, and the dose is between about 125 mg and about 300 mg. In another embodiment, the cancer is CLL, the patient has unmutated IGHV, and the dose is between about 150 mg and about 300 mg. In another embodiment, the cancer is CLL, the patient has unmutated IGHV, and the dose is between about 175 mg and about 300 mg. In another embodiment, the cancer is CLL, the patient has unmutated IGHV, and the dose is between about 200 mg and about 300 mg. In another embodiment, the cancer is CLL, the patient has unmutated IGHV, and the dose is between about 225 mg and about 300 mg. In another embodiment, the cancer is CLL, the patient has unmutated IGHV, and the dose is between about 250 mg and about 300 mg. In another embodiment, the cancer is CLL, the patient has unmutated IGHV, and the dose is between about 275 mg and about 300 mg. In another embodiment, the cancer is CLL, the patient has unmutated IGHV, and the dose is between about 120 mg and about 200 mg. In another embodiment, the cancer is CLL, the patient has unmutated IGHV, and the dose is between about 125 mg and about 200 mg. In another embodiment, the cancer is CLL, the patient has unmutated IGHV, and the dose is between about 150 mg and about 200 mg. In another embodiment, the cancer is CLL, the patient has unmutated IGHV, and the dose is between about 175 mg and about 200 mg. In another embodiment, the cancer is CLL, the patient has unmutated IGHV, and the dose is between about 120 mg and about 150 mg. In another embodiment, the cancer is CLL, the patient has unmutated IGHV, and the dose is between about 125 mg and about 150 mg.

In another embodiment, the cancer is CLL and the patient has mutated IGHV. In another embodiment, the cancer is CLL, the patient has mutated IGHV, and the dose is between about 120 mg and about 300 mg. In another embodiment, the cancer is CLL, the patient has mutated IGHV, and the dose is between about 125 mg and about 300 mg. In another embodiment, the cancer is CLL, the patient has mutated IGHV, and the dose is between about 150 mg and about 300 mg. In another embodiment, the cancer is CLL, the patient has mutated IGHV, and the dose is between about 175 mg and about 300 mg. In another embodiment, the cancer is CLL, the patient has mutated IGHV, and the dose is between about 200 mg and about 300 mg. In another embodiment, the cancer is CLL, the patient has mutated IGHV, and the dose is between about 225 mg and about 300 mg. In another embodiment, the cancer is CLL, the patient has mutated IGHV, and the dose is between about 250 mg and about 300 mg. In another embodiment, the cancer is CLL, the patient has mutated IGHV, and the dose is between about 275 mg and about 300 mg. In another embodiment, the cancer is CLL, the patient has mutated IGHV, and the dose is between about 120 mg and about 200 mg. In another embodiment, the cancer is CLL, the patient has mutated IGHV, and the dose is between about 125 mg and about 200 mg. In another embodiment, the cancer is CLL, the patient has mutated IGHV, and the dose is between about 150 mg and about 200 mg. In another embodiment, the cancer is CLL, the patient has mutated IGHV, and the dose is between about 175 mg and about 200 mg. In another embodiment, the cancer is CLL, the patient has mutated IGHV, and the dose is between about 120 mg and about 150 mg. In another embodiment, the cancer is CLL, the patient has mutated IGHV, and the dose is between about 125 mg and about 150 mg.

In another embodiment, the cancer is CLL and the patient has a G101V BCL2 mutation. In another embodiment, the cancer is CLL, the patient has a G101V BCL2 mutation, and the dose is between about 120 mg and about 300 mg. In another embodiment, the cancer is CLL, the patient has a G101V BCL2 mutation, and the dose is between about 125 mg and about 300 mg. In another embodiment, the cancer is CLL, the patient has a G101V BCL2 mutation, and the dose is between about 150 mg and about 300 mg. In another embodiment, the cancer is CLL, the patient has a G101V BCL2 mutation, and the dose is between about 175 mg and about 300 mg. In another embodiment, the cancer is CLL, the patient has a G101V BCL2 mutation, and the dose is between about 200 mg and about 300 mg. In another embodiment, the cancer is CLL, the patient has a G101V BCL2 mutation, and the dose is between about 225 mg and about 300 mg. In another embodiment, the cancer is CLL, the patient has a G101V BCL2 mutation, and the dose is between about 250 mg and about 300 mg. In another embodiment, the cancer is CLL, the patient has a G101V BCL2 mutation, and the dose is between about 275 mg and about 300 mg. In another embodiment, the cancer is CLL, the patient has a G101V BCL2 mutation, and the dose is between about 120 mg and about 200 mg. In another embodiment, the cancer is CLL, the patient has a G101V BCL2 mutation, and the dose is between about 125 mg and about 200 mg. In another embodiment, the cancer is CLL, the patient has a G101V BCL2 mutation, and the dose is between about 150 mg and about 200 mg. In another embodiment, the cancer is CLL, the patient has a G101V BCL2 mutation, and the dose is between about 175 mg and about 200 mg. In another embodiment, the cancer is CLL, the patient has a G101V BCL2 mutation, and the dose is between about 120 mg and about 150 mg. In another embodiment, the cancer is CLL, the patient has a G101V BCL2 mutation, and the dose is between about 125 mg and about 150 mg.

In another embodiment, the cancer is SLL. In another embodiment, the cancer is SLL and the dose is between about 120 mg and about 300 mg. In another embodiment, the cancer is SLL and the dose is between about 125 mg and about 300 mg. In another embodiment, the cancer is SLL and the dose is between about 150 mg and about 300 mg. In another embodiment, the cancer is SLL and the dose is between about 175 mg and about 300 mg. In another embodiment, the cancer is SLL and the dose is between about 200 mg and about 300 mg. In another embodiment, the cancer is SLL and the dose is between about 225 mg and about 300 mg. In another embodiment, the cancer is SLL and the dose is between about 250 mg and about 300 mg. In another embodiment, the cancer is SLL and the dose is between about 275 mg and about 300 mg. In another embodiment, the cancer is SLL and the dose is between about 120 mg and about 200 mg. In another embodiment, the cancer is SLL and the dose is between about 125 mg and about 200 mg. In another embodiment, the cancer is SLL and the dose is between about 150 mg and about 200 mg. In another embodiment, the cancer is SLL and the dose is between about 175 mg and about 200 mg. In another embodiment, the cancer is SLL and the dose is between about 120 mg and about 150 mg. In another embodiment, the cancer is SLL and the dose is between about 125 mg and about 150 mg.

In another embodiment, the cancer is SLL and the patient has a PLCg2 mutation. In another embodiment, the cancer is SLL, the patient has a PLCg2 mutation, and the dose is between about 120 mg and about 300 mg. In another embodiment, the cancer is SLL, the patient has a PLCg2 mutation, and the dose is between about 125 mg and about 300 mg. In another embodiment, the cancer is SLL, the patient has a PLCg2 mutation, and the dose is between about 150 mg and about 300 mg. In another embodiment, the cancer is SLL, the patient has a PLCg2 mutation, and the dose is between about 175 mg and about 300 mg. In another embodiment, the cancer is SLL, the patient has a PLCg2 mutation, and the dose is between about 200 mg and about 300 mg. In another embodiment, the cancer is SLL, the patient has a PLCg2 mutation, and the dose is between about 225 mg and about 300 mg. In another embodiment, the cancer is SLL, the patient has a PLCg2 mutation, and the dose is between about 250 mg and about 300 mg. In another embodiment, the cancer is SLL, the patient has a PLCg2 mutation, and the dose is between about 275 mg and about 300 mg. In another embodiment, the cancer is SLL, the patient has a PLCg2 mutation, and the dose is between about 120 mg and about 200 mg. In another embodiment, the cancer is SLL, the patient has a PLCg2 mutation, and the dose is between about 125 mg and about 200 mg. In another embodiment, the cancer is SLL, the patient has a PLCg2 mutation and the dose is between about 150 mg and about 200 mg. In another embodiment, the cancer is SLL, the patient has a PLCg2 mutation, and the dose is between about 175 mg and about 200 mg. In another embodiment, the cancer is SLL, the patient has a PLCg2 mutation, and the dose is between about 120 mg and about 150 mg. In another embodiment, the cancer is SLL, the patient has a PLCg2 mutation, and the dose is between about 125 mg and about 150 mg. In another embodiment, the cancer is trisomy 12 SLL. In another embodiment, the cancer is trisomy 12 SLL and the dose is between about 120 mg and about 300 mg. In another embodiment, the cancer is trisomy 12 SLL and the dose is between about 125 mg and about 300 mg. In another embodiment, the cancer is trisomy 12 SLL and the dose is between about 150 mg and about 300 mg. In another embodiment, the cancer is trisomy 12 SLL and the dose is between about 175 mg and about 300 mg. In another embodiment, the cancer is trisomy 12 SLL and the dose is between about 200 mg and about 300 mg. In another embodiment, the cancer is trisomy 12 SLL and the dose is between about 225 mg and about 300 mg. In another embodiment, the cancer is trisomy 12 SLL and the dose is between about 250 mg and about 300 mg. In another embodiment, the cancer is trisomy 12 SLL and the dose is between about 275 mg and about 300 mg. In another embodiment, the cancer is trisomy 12 SLL and the dose is between about 120 mg and about 200 mg. In another embodiment, the cancer is trisomy 12 SLL and the dose is between about 125 mg and about 200 mg. In another embodiment, the cancer is trisomy 12 SLL and the dose is between about 150 mg and about 200 mg. In another embodiment, the cancer is trisomy 12 SLL and the dose is between about 175 mg and about 200 mg. In another embodiment, the cancer is trisomy 12 SLL and the dose is between about 120 mg and about 150 mg. In another embodiment, the cancer is trisomy 12 SLL and the dose is between about 125 mg and about 150 mg.

In another embodiment, the cancer is SLL and the patient has Richter's transformation. In another embodiment, the cancer is SLL, the patient has Richter's transformation, and the dose is between about 120 mg and about 300 mg. In another embodiment, the cancer is SLL, the patient has Richter's transformation, and the dose is between about 125 mg and about 300 mg. In another embodiment, the cancer is SLL, the patient has Richter's transformation, and the dose is between about 150 mg and about 300 mg. In another embodiment, the cancer is SLL, the patient has Richter's transformation, and the dose is between about 175 mg and about 300 mg. In another embodiment, the cancer is SLL, the patient has Richter's transformation, and the dose is between about 200 mg and about 300 mg. In another embodiment, the cancer is SLL, the patient has Richter's transformation, and the dose is between about 225 mg and about 300 mg. In another embodiment, the cancer is SLL, the patient has Richter's transformation, and the dose is between about 250 mg and about 300 mg. In another embodiment, the cancer is SLL, the patient has Richter's transformation, and the dose is between about 275 mg and about 300 mg. In another embodiment, the cancer is SLL, the patient has Richter's transformation, and the dose is between about 120 mg and about 200 mg. In another embodiment, the cancer is SLL, the patient has Richter's transformation, and the dose is between about 125 mg and about 200 mg. In another embodiment, the cancer is SLL, the patient has Richter's transformation, and the dose is between about 150 mg and about 200 mg. In another embodiment, the cancer is SLL, the patient has Richter's transformation, and the dose is between about 175 mg and about 200 mg. In another embodiment, the cancer is SLL, the patient has Richter's transformation, and the dose is between about 120 mg and about 150 mg. In another embodiment, the cancer is SLL, the patient has Richter's transformation, and the dose is between about 125 mg and about 150 mg.

In another embodiment, the cancer is SLL and the patient has a 17p deletion. In another embodiment, the cancer is SLL, the patient has a 17p deletion, and the dose is between about 120 mg and about 300 mg. In another embodiment, the cancer is SLL, the patient has a 17p deletion, and the dose is between about 125 mg and about 300 mg. In another embodiment, the cancer is SLL, the patient has a 17p deletion, and the dose is between about 150 mg and about 300 mg. In another embodiment, the cancer is SLL, the patient has a 17p deletion, and the dose is between about 175 mg and about 300 mg. In another embodiment, the cancer is SLL, the patient has a 17p deletion, and the dose is between about 200 mg and about 300 mg. In another embodiment, the cancer is SLL, the patient has a 17p deletion, and the dose is between about 225 mg and about 300 mg. In another embodiment, the cancer is SLL, the patient has a 17p deletion, and the dose is between about 250 mg and about 300 mg. In another embodiment, the cancer is SLL, the patient has a 17p deletion, and the dose is between about 275 mg and about 300 mg. In another embodiment, the cancer is SLL, the patient has a 17p deletion, and the dose is between about 120 mg and about 200 mg. In another embodiment, the cancer is SLL the patient has a 17p deletion, and the dose is between about 125 mg and about 200 mg. In another embodiment, the cancer is SLL, the patient has a 17p deletion, and the dose is between about 150 mg and about 200 mg. In another embodiment, the cancer is SLL, the patient has a 17p deletion, and the dose is between about 175 mg and about 200 mg. In another embodiment, the cancer is SLL, the patient has a 17p deletion, and the dose is between about 120 mg and about 150 mg. In another embodiment, the cancer is SLL, the patient has a 17p deletion, and the dose is between about 125 mg and about 150 mg.

In another embodiment, the cancer is SLL and the patient has a 17p13 deletion and a TP53 mutation. In another embodiment, the cancer is SLL, the patient has a 17p13 deletion and a TP53 mutation, and the dose is between about 120 mg and about 300 mg. In another embodiment, the cancer is SLL, the patient has a 17p13 deletion and a TP53 mutation, and the dose is between about 125 mg and about 300 mg. In another embodiment, the cancer is SLL, the patient has a 17p13 deletion and a TP53 mutation, and the dose is between about 150 mg and about 300 mg. In another embodiment, the cancer is SLL, the patient has a 17p13 deletion and a TP53 mutation, and the dose is between about 175 mg and about 300 mg. In another embodiment, the cancer is SLL, the patient has a 17p13 deletion and a TP53 mutation, and the dose is between about 200 mg and about 300 mg. In another embodiment, the cancer is SLL, the patient has a 17p13 deletion and a TP53 mutation, and the dose is between about 225 mg and about 300 mg. In another embodiment, the cancer is SLL, the patient has a 17p13 deletion and a TP53 mutation, and the dose is between about 250 mg and about 300 mg. In another embodiment, the cancer is SLL, the patient has a 17p13 deletion and a TP53 mutation, and the dose is between about 275 mg and about 300 mg. In another embodiment, the cancer is SLL, the patient has a 17p13 deletion and a TP53 mutation, and the dose is between about 120 mg and about 200 mg. In another embodiment, the cancer is SLL the patient h has a 17p13 deletion and a TP53 mutation, and the dose is between about 125 mg and about 200 mg. In another embodiment, the cancer is SLL, the patient has a 17p13 deletion and a TP53 mutation, and the dose is between about 150 mg and about 200 mg. In another embodiment, the cancer is SLL, the patient has a 17p13 deletion and a TP53 mutation, and the dose is between about 175 mg and about 200 mg. In another embodiment, the cancer is SLL, the patient has a 17p13 deletion and a TP53 mutation, and the dose is between about 120 mg and about 150 mg. In another embodiment, the cancer is SLL, the patient has a 17p13 deletion and a TP53 mutation, and the dose is between about 125 mg and about 150 mg.

In another embodiment, the cancer is SLL and the patient has a TP53 deletion. In another embodiment, the cancer is SLL, the patient has a TP53 deletion, and the dose is between about 120 mg and about 300 mg. In another embodiment, the cancer is SLL, the patient has a TP53 deletion, and the dose is between about 125 mg and about 300 mg. In another embodiment, the cancer is SLL, the patient has a TP53 deletion, and the dose is between about 150 mg and about 300 mg. In another embodiment, the cancer is SLL, the patient has a TP53 deletion, and the dose is between about 175 mg and about 300 mg. In another embodiment, the cancer is SLL, the patient has a TP53 deletion, and the dose is between about 200 mg and about 300 mg. In another embodiment, the cancer is SLL, the patient has a TP53 deletion, and the dose is between about 225 mg and about 300 mg. In another embodiment, the cancer is SLL, the patient has a TP53 deletion, and the dose is between about 250 mg and about 300 mg. In another embodiment, the cancer is SLL, the patient has a TP53 deletion, and the dose is between about 275 mg and about 300 mg. In another embodiment, the cancer is SLL, the patient has a TP53 deletion, and the dose is between about 120 mg and about 200 mg. In another embodiment, the cancer is SLL, the patient has a TP53 deletion, and the dose is between about 125 mg and about 200 mg. In another embodiment, the cancer is SLL, the patient has a TP53 deletion, and the dose is between about 150 mg and about 200 mg. In another embodiment, the cancer is SLL, the patient has a TP53 deletion, and the dose is between about 175 mg and about 200 mg. In another embodiment, the cancer is SLL, the patient has a TP53 deletion, and the dose is 25 between about 120 mg and about 150 mg. In another embodiment, the cancer is SLL, the patient has a TP53 deletion, and the dose is between about 125 mg and about 150 mg.

In another embodiment, the cancer is SLL and the patient has a TP53 mutation. In another embodiment, the cancer is SLL, the patient has a TP53 mutation, and the dose is between about 120 mg and about 300 mg. In another embodiment, the cancer is SLL, the patient has a TP53 mutation, and the dose is between about 125 mg and about 300 mg. In another embodiment, the cancer is SLL, the patient has a TP53 mutation, and the dose is between about 150 mg and about 300 mg. In another embodiment, the cancer is SLL, the patient has a TP53 mutation, and the dose is between about 175 mg and about 300 mg. In another embodiment, the cancer is SLL, the patient has a TP53 mutation, and the dose is between about 200 mg and about 300 mg. In another embodiment, the cancer is SLL, the patient has a TP53 mutation, and the dose is between about 225 mg and about 300 mg. In another embodiment, the cancer is SLL, the patient has a TP53 mutation, and the dose is between about 250 mg and about 300 mg. In another embodiment, the cancer is SLL, the patient has a TP53 mutation, and the dose is between about 275 mg and about 300 mg. In another embodiment, the cancer is SLL, the patient has a TP53 mutation, and the dose is between about 120 mg and about 200 mg. In another embodiment, the cancer is SLL, the patient has a TP53 mutation, and the dose is between about 125 mg and about 200 mg. In another embodiment, the cancer is SLL, the patient has a TP53 mutation, and the dose is between about 150 mg and about 200 mg. In another embodiment, the cancer is SLL, the patient has a TP53 mutation, and the dose is between about 175 mg and about 200 mg. In another embodiment, the cancer is SLL, the patient has a TP53 mutation, and the dose is between about 120 mg and about 150 mg. In another embodiment, the cancer is SLL, the patient has a TP53 mutation, and the dose is between about 125 mg and about 150 mg.

In another embodiment, the cancer is SLL and the patient has a 11q deletion. In another embodiment, the cancer is SLL, the patient has a 11q deletion, and the dose is between about 120 mg and about 300 mg. In another embodiment, the cancer is SLL, the patient has a 11q deletion, and the dose is between about 125 mg and about 300 mg. In another embodiment, the cancer is SLL, the patient has a 11q deletion, and the dose is between about 150 mg and about 300 mg. In another embodiment, the cancer is SLL, the patient has a 11q deletion, and the dose is between about 175 mg and about 300 mg. In another embodiment, the cancer is SLL, the patient has a 11q deletion, and the dose is between about 200 mg and about 300 mg. In another embodiment, the cancer is SLL, the patient has a 11q deletion, and the dose is between about 225 mg and about 300 mg. In another embodiment, the cancer is SLL, the patient has a 11q deletion, and the dose is between about 250 mg and about 300 mg. In another embodiment, the cancer is SLL, the patient has a 11q deletion, and the dose is between about 275 mg and about 300 mg. In another embodiment, the cancer is SLL, the patient has a 11q deletion, and the dose is between about 120 mg and about 200 mg. In another embodiment, the cancer is SLL, the patient has a 11q deletion, and the dose is between about 125 mg and about 200 mg. In another embodiment, the cancer is SLL, the patient has a 11q deletion, and the dose is between about 150 mg and about 200 mg. In another embodiment, the cancer is SLL, the patient has a 11q deletion, and the dose is between about 175 mg and about 200 mg. In another embodiment, the cancer is SLL, the patient has a 11q deletion, and the dose is between about 120 mg and about 150 mg. In another embodiment, the cancer is SLL, the patient has a 11q deletion, and the dose is between about 125 mg and about 150 mg.

In another embodiment, the cancer is SLL and the patient has unmutated IGHV. In another embodiment, the cancer is SLL, the patient has unmutated IGHV, and the dose is between about 120 mg and about 300 mg. In another embodiment, the cancer is SLL, the patient has unmutated IGHV, and the dose is between about 125 mg and about 300 mg. In another embodiment, the cancer is SLL, the patient has unmutated IGHV, and the dose is between about 150 mg and about 300 mg. In another embodiment, the cancer is SLL, the patient has unmutated IGHV, and the dose is between about 175 mg and about 300 mg. In another embodiment, the cancer is SLL, the patient has unmutated IGHV, and the dose is between about 200 mg and about 300 mg. In another embodiment, the cancer is SLL, the patient has unmutated IGHV, and the dose is between about 225 mg and about 300 mg. In another embodiment, the cancer is SLL, the patient has unmutated IGHV, and the dose is between about 250 mg and about 300 mg. In another embodiment, the cancer is SLL, the patient has unmutated IGHV, and the dose is between about 275 mg and about 300 mg. In another embodiment, the cancer is SLL, the patient has unmutated IGHV, and the dose is between about 120 mg and about 200 mg. In another embodiment, the cancer is SLL, the patient has unmutated IGHV, and the dose is between about 125 mg and about 200 mg. In another embodiment, the cancer is SLL, the patient has unmutated IGHV, and the dose is between about 150 mg and about 200 mg. In another embodiment, the cancer is SLL, the patient has unmutated IGHV, and the dose is between about 175 mg and about 200 mg. In another embodiment, the cancer is SLL, the patient has unmutated IGHV, and the dose is between about 120 mg and about 150 mg. In another embodiment, the cancer is SLL, the patient has unmutated IGHV, and the dose is between about 125 mg and about 150 mg.

In another embodiment, the cancer is SLL and the patient has mutated IGHV. In another embodiment, the cancer is SLL, the patient has mutated IGHV, and the dose is between about 120 mg and about 300 mg. In another embodiment, the cancer is SLL, the patient has mutated IGHV, and the dose is between about 125 mg and about 300 mg. In another embodiment, the cancer is SLL, the patient has mutated IGHV, and the dose is between about 150 mg and about 300 mg. In another embodiment, the cancer is SLL, the patient has mutated IGHV, and the dose is between about 175 mg and about 300 mg. In another embodiment, the cancer is SLL, the patient has mutated IGHV, and the dose is between about 200 mg and about 300 mg. In another embodiment, the cancer is SLL, the patient has mutated IGHV, and the dose is between about 225 mg and about 300 mg. In another embodiment, the cancer is SLL, the patient has mutated IGHV, and the dose is between about 250 mg and about 300 mg. In another embodiment, the cancer is SLL, the patient has mutated IGHV, and the dose is between about 275 mg and about 300 mg. In another embodiment, the cancer is SLL, the patient has mutated IGHV, and the dose is between about 120 mg and about 200 mg. In another embodiment, the cancer is SLL, the patient has mutated IGHV, and the dose is between about 125 mg and about 200 mg. In another embodiment, the cancer is SLL, the patient has mutated IGHV, and the dose is between about 150 mg and about 200 mg. In another embodiment, the cancer is SLL, the patient has mutated IGHV, and the dose is between about 175 mg and about 200 mg. In another embodiment, the cancer is SLL, the patient has mutated IGHV, and the dose is between about 120 mg and about 150 mg. In another embodiment, the cancer is SLL, the patient has mutated IGHV, and the dose is between about 125 mg and about 150 mg.

In another embodiment, the cancer is SLL and the patient has a G101V BCL2 mutation. In another embodiment, the cancer is SLL, the patient has a G101V BCL2 mutation, and the dose is between about 120 mg and about 300 mg. In another embodiment, the cancer is SLL, the patient has a G101V BCL2 mutation, and the dose is between about 125 mg and about 300 mg. In another embodiment, the cancer is SLL, the patient has a G101V BCL2 mutation, and the dose is between about 150 mg and about 300 mg. In another embodiment, the cancer is SLL, the patient has a G101V BCL2 mutation, and the dose is between about 175 mg and about 300 mg. In another embodiment, the cancer is SLL, the patient has a G101V BCL2 mutation, and the dose is between about 200 mg and about 300 mg. In another embodiment, the cancer is SLL, the patient has a G101V BCL2 mutation, and the dose is between about 225 mg and about 300 mg. In another embodiment, the cancer is SLL, the patient has a G101V BCL2 mutation, and the dose is between about 250 mg and about 300 mg. In another embodiment, the cancer is SLL, the patient has a G101V BCL2 mutation, and the dose is between about 275 mg and about 300 mg. In another embodiment, the cancer is SLL, the patient has a G101V BCL2 mutation, and the dose is between about 120 mg and about 200 mg. In another embodiment, the cancer is SLL, the patient has a G101V BCL2 mutation, and the dose is between about 125 mg and about 200 mg. In another embodiment, the cancer is SLL, the patient has a G101V BCL2 mutation, and the dose is between about 150 mg and about 200 mg. In another embodiment, the cancer is SLL, the patient has a G101V BCL2 mutation, and the dose is between about 175 mg and about 200 mg. In another embodiment, the cancer is SLL, the patient has a G101V BCL2 mutation, and the dose is between about 120 mg and about 150 mg. In another embodiment, the cancer is SLL, the patient has a G101V BCL2 mutation, and the dose is between about 125 mg and about 150 mg.

In another embodiment, the cancer is CLL/SLL. In another embodiment, the cancer is CLL/SLL and the dose is between about 120 mg and about 300 mg. In another embodiment, the cancer is CLL/SLL and the dose is between about 125 mg and about 300 mg. In another embodiment, the cancer is CLL/SLL and the dose is between about 150 mg and about 300 mg. In another embodiment, the cancer is CLL/SLL and the dose is between about 175 mg and about 300 mg. In another embodiment, the cancer is CLL/SLL and the dose is between about 200 mg and about 300 mg. In another embodiment, the cancer is CLL/SLL and the dose is between about 225 mg and about 300 mg. In another embodiment, the cancer is CLL/SLL and the dose is between about 250 mg and about 300 mg. In another embodiment, the cancer is CLL/SLL and the dose is between about 275 mg and about 300 mg. In another embodiment, the cancer is CLL/SLL and the dose is between about 120 mg and about 200 mg. In another embodiment, the cancer is CLL/SLL and the dose is between about 125 mg and about 200 mg. In another embodiment, the cancer is CLL/SLL and the dose is between about 150 mg and about 200 mg. In another embodiment, the cancer is CLL/SLL and the dose is between about 175 mg and about 200 mg. In another embodiment, the cancer is CLL/SLL and the dose is between about 120 mg and about 150 mg. In another embodiment, the cancer is CLL/SLL and the dose is between about 125 mg and about 150 mg.

In another embodiment, the cancer is CLL/SLL and the patient has a PLCg2 mutation. In another embodiment, the cancer is CLL/SLL, the patient has a PLCg2 mutation, and the dose is between about 120 mg and about 300 mg. In another embodiment, the cancer is CLL/SLL, the patient has a PLCg2 mutation, and the dose is between about 125 mg and about 300 mg. In another embodiment, the cancer is CLL/SLL, the patient has a PLCg2 mutation, and the dose is between about 150 mg and about 300 mg. In another embodiment, the cancer is CLL/SLL, the patient has a PLCg2 mutation, and the dose is between about 175 mg and about 300 mg. In another embodiment, the cancer is CLL/SLL, the patient has a PLCg2 mutation, and the dose is between about 200 mg and about 300 mg. In another embodiment, the cancer is CLL/SLL, the patient has a PLCg2 mutation, and the dose is between about 225 mg and about 300 mg. In another embodiment, the cancer is CLL/SLL, the patient has a PLCg2 mutation, and the dose is between about 250 mg and about 300 mg. In another embodiment, the cancer is CLL/SLL, the patient has a PLCg2 mutation, and the dose is between about 275 mg and about 300 mg. In another embodiment, the cancer is CLL/SLL, the patient has a PLCg2 mutation, and the dose is between about 120 mg and about 200 mg. In another embodiment, the cancer is CLL/SLL, the patient has a PLCg2 mutation, and the dose is between about 125 mg and about 200 mg. In another embodiment, the cancer is CLL/SLL, the patient has a PLCg2 mutation and the dose is between about 150 mg and about 200 mg. In another embodiment, the cancer is CLL/SLL, the patient has a PLCg2 mutation, and the dose is between about 175 mg and about 200 mg. In another embodiment, the cancer is CLL/SLL, the patient has a PLCg2 mutation, and the dose is between about 120 mg and about 150 mg. In another embodiment, the cancer is CLL/SLL, the patient has a PLCg2 mutation, and the dose is between about 125 mg and about 150 mg.

In another embodiment, the cancer is trisomy 12 CLL/SLL. In another embodiment, the cancer is trisomy 12 CLL/SLL and the dose is between about 120 mg and about 300 mg. In another embodiment, the cancer is trisomy 12 CLL/SLL and the dose is between about 125 mg and about 300 mg. In another embodiment, the cancer is trisomy 12 CLL/SLL and the dose is between about 150 mg and about 300 mg. In another embodiment, the cancer is trisomy 12 CLL/SLL and the dose is between about 175 mg and about 300 mg. In another embodiment, the cancer is trisomy 12 CLL/SLL and the dose is between about 200 mg and about 300 mg. In another embodiment, the cancer is trisomy 12 CLL/SLL and the dose is between about 225 mg and about 300 mg. In another embodiment, the cancer is trisomy 12 CLL/SLL and the dose is between about 250 mg and about 300 mg. In another embodiment, the cancer is trisomy 12 CLL/SLL and the dose is between about 275 mg and about 300 mg. In another embodiment, the cancer is trisomy 12 CLL/SLL and the dose is between about 120 mg and about 200 mg. In another embodiment, the cancer is trisomy 12 CLL/SLL and the dose is between about 125 mg and about 200 mg. In another embodiment, the cancer is trisomy 12 CLL/SLL and the dose is between about 150 mg and about 200 mg. In another embodiment, the cancer is trisomy 12 CLL/SLL and the dose is between about 175 mg and about 200 mg. In another embodiment, the cancer is trisomy 12 CLL/SLL and the dose is between about 120 mg and about 150 mg. In another embodiment, the cancer is trisomy 12 CLL/SLL and the dose is between about 125 mg and about 150 mg.

In another embodiment, the cancer is CLL/SLL and the patient has Richter's transformation. In another embodiment, the cancer is CLL/SLL, the patient has Richter's transformation, and the dose is between about 120 mg and about 300 mg. In another embodiment, the cancer is CLL/SLL, the patient has Richter's transformation, and the dose is between about 125 mg and about 300 mg. In another embodiment, the cancer is CLL/SLL, the patient has Richter's transformation, and the dose is between about 150 mg and about 300 mg. In another embodiment, the cancer is CLL/SLL, the patient has Richter's transformation, and the dose is between about 175 mg and about 300 mg. In another embodiment, the cancer is CLL/SLL, the patient has Richter's transformation, and the dose is between about 200 mg and about 300 mg. In another embodiment, the cancer is CLL/SLL, the patient has Richter's transformation, and the dose is between about 225 mg and about 300 mg. In another embodiment, the cancer is CLL/SLL, the patient has Richter's transformation, and the dose is between about 250 mg and about 300 mg. In another embodiment, the cancer is CLL/SLL, the patient has Richter's transformation, and the dose is between about 275 mg and about 300 mg. In another embodiment, the cancer is CLL/SLL, the patient has Richter's transformation, and the dose is between about 120 mg and about 200 mg. In another embodiment, the cancer is CLL/SLL, the patient has Richter's transformation, and the dose is between about 125 mg and about 200 mg. In another embodiment, the cancer is CLL/SLL, the patient has Richter's transformation, and the dose is between about 150 mg and about 200 mg. In another embodiment, the cancer is CLL/SLL, the patient has Richter's transformation, and the dose is between about 175 mg and about 200 mg. In another embodiment, the cancer is CLL/SLL, the patient has Richter's transformation, and the dose is between about 120 mg and about 150 mg. In another embodiment, the cancer is CLL/SLL, the patient has Richter's transformation, and the dose is between about 125 mg and about 150 mg.

In another embodiment, the cancer is CLL/SLL and the patient has a 17p deletion. In another embodiment, the cancer is CLL/SLL, the patient has a 17p deletion, and the dose is between about 120 mg and about 300 mg. In another embodiment, the cancer is CLL/SLL, the patient has a 17p deletion, and the dose is between about 125 mg and about 300 mg. In another embodiment, the cancer is CLL/SLL, the patient has a 17p deletion, and the dose is between about 150 mg and about 300 mg. In another embodiment, the cancer is CLL/SLL, the patient has a 17p deletion, and the dose is between about 175 mg and about 300 mg. In another embodiment, the cancer is CLL/SLL, the patient has a 17p deletion, and the dose is between about 200 mg and about 300 mg. In another embodiment, the cancer is CLL/SLL, the patient has a 17p deletion, and the dose is between about 225 mg and about 300 mg. In another embodiment, the cancer is CLL/SLL, the patient has a 17p deletion, and the dose is between about 250 mg and about 300 mg. In another embodiment, the cancer is CLL/SLL, the patient has a 17p deletion, and the dose is between about 275 mg and about 300 mg. In another embodiment, the cancer is CLL/SLL, the patient has a 17p deletion, and the dose is between about 120 mg and about 200 mg. In another embodiment, the cancer is CLL/SLL the patient has a 17p deletion, and the dose is between about 125 mg and about 200 mg. In another embodiment, the cancer is CLL/SLL, the patient has a 17p deletion, and the dose is between about 150 mg and about 200 mg. In another embodiment, the cancer is CLL/SLL, the patient has a 17p deletion, and the dose is between about 175 mg and about 200 mg. In another embodiment, the cancer is CLL/SLL, the patient has a 17p deletion, and the dose is between about 120 mg and about 150 mg. In another embodiment, the cancer is CLL/SLL, the patient has a 17p deletion, and the dose is between about 125 mg and about 150 mg.

In another embodiment, the cancer is CLL/SLL and the patient has a 17p13 deletion and a TP53 mutation. In another embodiment, the cancer is CLL/SLL, the patient has a 17p13 deletion and a TP53 mutation, and the dose is between about 120 mg and about 300 mg. In another embodiment, the cancer is CLL/SLL, the patient has a 17p13 deletion and a TPS3 mutation, and the dose is between about 125 mg and about 300 mg. In another embodiment, the cancer is CLL/SLL, the patient has a 17p13 deletion and a TP53 mutation, 20 and the dose is between about 150 mg and about 300 mg. In another embodiment, the cancer is CLL/SLL, the patient has a 17p13 deletion and a TP53 mutation, and the dose is between about 175 mg and about 300 mg. In another embodiment, the cancer is CLL/SLL, the patient has a 17p13 deletion and a TP53 mutation, and the dose is between about 200 mg and about 300 mg. In another embodiment, the cancer is CLL/SLL, the patient has a 17p13 deletion and a TP53 mutation, and the dose is between about 225 mg and about 300 mg. In another embodiment, the cancer is CLL/SLL, the patient has a 17p13 deletion and a TP53 mutation, and the dose is between about 250 mg and about 300 mg. In another embodiment, the cancer is CLL/SLL, the patient has a 17p13 deletion and a TP53 mutation, and the dose is between about 275 mg and about 300 mg. In another embodiment, the cancer is CLL/SLL, the patient has a 17p13 deletion and a TP53 mutation, and the dose is between about 120 mg and about 200 mg. In another embodiment, the cancer is CLL/SLL the patient has a 17p13 deletion and a TP53 mutation, and the dose is between about 125 mg and about 200 mg. In another embodiment, the cancer is CLL/SLL, the patient has a 17p13 deletion and a TP53 mutation, and the dose is between about 150 mg and about 200 mg. In another embodiment, the cancer is CLL/SLL, the patient has a 17p13 deletion and a TP53 mutation, and the dose is between about 175 mg and about 200 mg. In another embodiment, the cancer is CLL/SLL, the patient has a 17p13 deletion and a TP53 mutation, and the dose is between about 120 mg and about 150 mg. In another embodiment, the cancer is CLL/SLL, the patient has a 17p13 deletion and a TP53 mutation, and the dose is between about 125 mg and about 150 mg.

In another embodiment, the cancer is CLL/SLL and the patient has a TP53 deletion. In another embodiment, the cancer is CLL/SLL, the patient has a TP53 deletion, and the dose is between about 120 mg and about 300 mg. In another embodiment, the cancer is CLL/SLL, the patient has a TP53 deletion, and the dose is between about 125 mg and about 300 mg. In another embodiment, the cancer is CLL/SLL, the patient has a TP53 deletion, and the dose is between about 150 mg and about 300 mg. In another embodiment, the cancer is CLL/SLL, the patient has a TP53 deletion, and the dose is between about 175 mg and about 300 mg. In another embodiment, the cancer is CLL/SLL, the patient has a TP53 deletion, and the dose is between about 200 mg and about 300 mg. In another embodiment, the cancer is CLL/SLL, the patient has a TP53 deletion, and the dose is between about 225 mg and about 300 mg. In another embodiment, the cancer is CLL/SLL, the patient has a TP53 deletion, and the dose is between about 250 mg and about 300 mg. In another embodiment, the cancer is CLL/SLL, the patient has a TP53 deletion, and the dose is between about 275 mg and about 300 mg. In another embodiment, the cancer is CLL/SLL, the patient has a TP53 deletion, and the dose is between about 120 mg and about 200 mg. In another embodiment, the cancer is CLL/SLL, the patient has a TP53 deletion, and the dose is between about 125 mg and about 200 mg. In another embodiment, the cancer is CLL/SLL, the patient has a TP53 deletion, and the dose is between about 150 mg and about 200 mg. In another embodiment, the cancer is CLL/SLL, the patient has a TP53 deletion, and the dose is between about 175 mg and about 200 mg. In another embodiment, the cancer is CLL/SLL, the patient has a TP53 deletion, and the dose is between about 120 mg and about 150 mg. In another embodiment, the cancer is CLL/SLL, the patient has a TP53 deletion, and the dose is between about 125 mg and about 150 mg.

In another embodiment, the cancer is CLL/SLL and the patient has a TP53 mutation. In another embodiment, the cancer is CLL/SLL, the patient has a TP53 mutation, and the dose is between about 120 mg and about 300 mg. In another embodiment, the cancer is CLL/SLL, the patient has a TP53 mutation, and the dose is between about 125 mg and about 300 mg. In another embodiment, the cancer is CLL/SLL, the patient has a TP53 mutation, and the dose is between about 150 mg and about 300 mg. In another embodiment, the cancer is CLL/SLL, the patient has a TP53 mutation, and the dose is between about 175 mg and about 300 mg. In another embodiment, the cancer is CLL/SLL, the patient has a TP53 mutation, and the dose is between about 200 mg and about 300 mg. In another embodiment, the cancer is CLL/SLL, the patient has a TP53 mutation, and the dose is between about 225 mg and about 300 mg. In another embodiment, the cancer is CLL/SLL, the patient has a TP53 mutation, and the dose is between about 250 mg and about 300 mg. In another embodiment, the cancer is CLL/SLL, the patient has a TP53 mutation, and the dose is between about 275 mg and about 300 mg. In another embodiment, the cancer is CLL/SLL, the patient has a TP53 mutation, and the dose is between about 120 mg and about 200 mg. In another embodiment, the cancer is CLL/SLL, the patient has a TP53 mutation, and the dose is between about 125 mg and about 200 mg. In another embodiment, the cancer is CLL/SLL, the patient has a TP53 mutation, and the dose is between about 150 mg and about 200 mg. In another embodiment, the cancer is CLL/SLL, the patient has a TP53 mutation, and the dose is between about 175 mg and about 200 mg. In another embodiment, the cancer is CLL/SLL, the patient has a TP53 mutation, and the dose is between about 120 mg and about 150 mg. In another embodiment, the cancer is CLL/SLL, the patient has a TP53 mutation, and the dose is between about 125 mg and about 150 mg.

In another embodiment, the cancer is CLL/SLL and the patient has a 11q deletion. In another embodiment, the cancer is CLL/SLL, the patient has a 11q deletion, and the dose is between about 120 mg and about 300 mg. In another embodiment, the cancer is CLL/SLL, the patient has a 11q deletion, and the dose is between about 125 mg and about 300 mg. In another embodiment, the cancer is CLL/SLL, the patient has a 11q deletion, and the dose is between about 150 mg and about 300 mg. In another embodiment, the cancer is CLL/SLL, the patient has a 11q deletion, and the dose is between about 175 mg and about 300 mg. In another embodiment, the cancer is CLL/SLL, the patient has a 11q deletion, and the dose is between about 200 mg and about 300 mg. In another embodiment, the cancer is CLL/SLL, the patient has a 11q deletion, and the dose is between about 225 mg and about 300 mg. In another embodiment, the cancer is CLL/SLL, the patient has a 11q deletion, and the dose is between about 250 mg and about 300 mg. In another embodiment, the cancer is CLL/SLL, the patient has a 11q deletion, and the dose is between about 275 mg and about 300 mg. In another embodiment, the cancer is CLL/SLL, the patient has a 11q deletion, and the dose is between about 120 mg and about 200 mg. In another embodiment, the cancer is CLL/SLL, the patient has a 11q deletion, and the dose is between about 125 mg and about 200 mg. In another embodiment, the cancer is CLL/SLL, the patient has a 11q deletion, and the dose is between about 150 mg and about 200 mg. In another embodiment, the cancer is CLL/SLL, the patient has a 11q deletion, and the dose is between about 175 mg and about 200 mg. In another embodiment, the cancer is CLL/SLL, the patient has a 11q deletion, and the dose is between about 120 mg and about 150 mg. In another embodiment, the cancer is CLL/SLL, the patient has a 11q deletion, and the dose is between about 125 mg and about 150 mg.

In another embodiment, the cancer is CLL/SLL and the patient has unmutated IGHV. In another embodiment, the cancer is CLL/SLL, the patient has unmutated IGHV, and the dose is between about 120 mg and about 300 mg. In another embodiment, the cancer is CLL/SLL, the patient has unmutated IGHV, and the dose is between about 125 mg and about 300 mg. In another embodiment, the cancer is CLL/SLL, the patient has unmutated IGHV, and the dose is between about 150 mg and about 300 mg. In another embodiment, the cancer is CLL/SLL, the patient has unmutated IGHV, and the dose is between about 175 mg and about 300 mg. In another embodiment, the cancer is CLL/SLL, the patient has unmutated IGHV, and the dose is between about 200 mg and about 300 mg. In another embodiment, the cancer is CLL/SLL, the patient has unmutated IGHV, and the dose is between about 225 mg and about 300 mg. In another embodiment, the cancer is CLL/SLL, the patient has unmutated IGHV, and the dose is between about 250 mg and about 300 mg. In another embodiment, the cancer is CLL/SLL, the patient has unmutated IGHV, and the dose is between about 275 mg and about 300 mg. In another embodiment, the cancer is CLL/SLL, the patient has unmutated IGHV, and the dose is between about 120 mg and about 200 mg. In another embodiment, the cancer is CLL/SLL, the patient has unmutated IGHV, and the dose is between about 125 mg and about 200 mg. In another embodiment, the cancer is CLL/SLL, the patient has unmutated IGHV, and the dose is between about 150 mg and about 200 mg. In another embodiment, the cancer is CLL/SLL, the patient has unmutated IGHV, and the dose is between about 175 mg and about 200 mg. In another embodiment, the cancer is CLL/SLL, the patient has unmutated IGHV, and the dose is between about 120 mg and about 150 mg. In another embodiment, the cancer is CLL/SLL, the patient has unmutated IGHV, and the dose is between about 125 mg and about 150 mg.

In another embodiment, the cancer is CLL/SLL and the patient has mutated IGHV. In another embodiment, the cancer is CLL/SLL, the patient has mutated IGHV, and the dose is between about 120 mg and about 300 mg. In another embodiment, the cancer is CLL/SLL, the patient has mutated IGHV, and the dose is between about 125 mg and about 300 mg. In another embodiment, the cancer is CLL/SLL, the patient has mutated IGHV, and the dose is between about 150 mg and about 300 mg. In another embodiment, the cancer is CLL/SLL, the patient has mutated IGHV, and the dose is between about 175 mg and about 300 mg. In another embodiment, the cancer is CLL/SLL, the patient has mutated IGHV, and the dose is between about 200 mg and about 300 mg. In another embodiment, the cancer is CLL/SLL, the patient has mutated IGHV, and the dose is between about 225 mg and about 300 mg. In another embodiment, the cancer is CLL/SLL, the patient has mutated IGHV, and the dose is between about 250 mg and about 300 mg. In another embodiment, the cancer is CLL/SLL, the patient has mutated IGHV, and the dose is between about 275 mg and about 300 mg. In another embodiment, the cancer is CLL/SLL, the patient has mutated IGHV, and the dose is between about 120 mg and about 200 mg. In another embodiment, the cancer is CLL/SLL, the patient has mutated IGHV, and the dose is between about 125 mg and about 200 mg. In another embodiment, the cancer is CLL/SLL, the patient has mutated IGHV, and the dose is between about 150 mg and about 200 mg. In another embodiment, the cancer is CLL/SLL, the patient has mutated IGHV, and the dose is between about 175 mg and about 200 mg. In another embodiment, the cancer is CLL/SLL, the patient has mutated IGHV, and the dose is between about 120 mg and about 150 mg. In another embodiment, the cancer is CLL/SLL, the patient has mutated IGHV, and the dose is between about 125 mg and about 150 mg.

In another embodiment, the cancer is CLL/SLL and the patient has a G101V BCL2 mutation. In another embodiment, the cancer is CLL/SLL, the patient has a G101V BCL2 mutation, and the dose is between about 120 mg and about 300 mg. In another embodiment, the cancer is CLL/SLL, the patient has a G101V BCL2 mutation, and the dose is between about 125 mg and about 300 mg. In another embodiment, the cancer is CLL/SLL, the patient has a G101V BCL2 mutation, and the dose is between about 150 mg and about 300 mg. In another embodiment, the cancer is CLL/SLL, the patient has a G101V BCL2 mutation, and the dose is between about 175 mg and about 300 mg. In another embodiment, the cancer is CLL/SLL, the patient has a G101V BCL2 mutation, and the dose is between about 200 mg and about 300 mg. In another embodiment, the cancer is CLL/SLL, the patient has a G101V BCL2 mutation, and the dose is between about 225 mg and about 300 mg. In another embodiment, the cancer is CLL/SLL, the patient has a G101V BCL2 mutation, and the dose is between about 250 mg and about 300 mg. In another embodiment, the cancer is CLL/SLL, the patient has a G101V BCL2 mutation, and the dose is between about 275 mg and about 300 mg. In another embodiment, the cancer is CLL/SLL, the patient has a G101V BCL2 mutation, and the dose is between about 120 mg and about 200 mg. In another embodiment, the cancer is CLL/SLL, the patient has a G101V BCL2 mutation, and the dose is between about 125 mg and about 200 mg. In another embodiment, the cancer is CLL/SLL, the patient has a G101V BCL2 mutation, and the dose is between about 150 mg and about 200 mg. In another embodiment, the cancer is CLL/SLL, the patient has a G101V BCL2 mutation, and the dose is between about 175 mg and about 200 mg. In another embodiment, the cancer is CLL/SLL, the patient has a G101V BCL2 mutation, and the dose is between about 120 mg and about 150 mg. In another embodiment, the cancer is CLL/SLL, the patient has a G101V BCL2 mutation, and the dose is between about 125 mg and about 150 mg.

In another embodiment, the cancer is MZL. In another embodiment, the cancer is MZL and the dose is between about 120 mg and about 300 mg. In another embodiment, the cancer is MZL and the dose is between about 125 mg and about 300 mg. In another embodiment, the cancer is MZL and the dose is between about 150 mg and about 300 mg. In another embodiment, the cancer is MZL and the dose is between about 175 mg and about 300 mg. In another embodiment, the cancer is MZL and the dose is between about 200 mg and about 300 mg. In another embodiment, the cancer is MZL and the dose is between about 225 mg and about 300 mg. In another embodiment, the cancer is MZL and the dose is between about 250 mg and about 300 mg. In another embodiment, the cancer is MZL and the dose is between about 275 mg and about 300 mg. In another embodiment, the cancer is MZL and the dose is between about 120 mg and about 200 mg. In another embodiment, the cancer is MZL and the dose is between about 125 mg and about 200 mg. In another embodiment, the cancer is MZL and the dose is between about 150 mg and about 200 mg. In another embodiment, the cancer is MZL and the dose is between about 175 mg and about 200 mg. In another embodiment, the cancer is MZL and the dose is between about 120 mg and about 150 mg. In another embodiment, the cancer is MZL and the dose is between about 125 mg and about 150 mg.

In another embodiment, the cancer is Waldenstrom's macroglobulinemia. In another embodiment, the cancer is Waldenstrom's macroglobulinemia and the dose is between about 120 mg and about 300 mg. In another embodiment, the cancer is Waldenstrom's macroglobulinemia and the dose is between about 125 mg and about 300 mg. In another embodiment, the cancer is Waldenstrom's macroglobulinemia and the dose is between about 150 mg and about 300 mg. In another embodiment, the cancer is Waldenstrom's macroglobulinemia and the dose is between about 175 mg and about 300 mg. In another embodiment, the cancer is Waldenstrom's macroglobulinemia and the dose is between about 200 mg and about 300 mg. In another embodiment, the cancer is Waldenstrom's macroglobulinemia and the dose is between about 225 mg and about 300 mg. In another embodiment, the cancer is Waldenstrom's macroglobulinemia and the dose is between about 250 mg and about 300 mg. In another embodiment, the cancer is Waldenstrom's macroglobulinemia and the dose is between about 275 mg and about 300 mg. In another embodiment, the cancer is Waldenstrom's macroglobulinemia and the dose is between about 120 mg and about 200 mg. In another embodiment, the cancer is Waldenstrom's macroglobulinemia and the dose is between about 125 mg and about 200 mg. In another embodiment, the cancer is Waldenstrom's macroglobulinemia and the dose is between about 150 mg and about 200 mg. In another embodiment, the cancer is Waldenstrom's macroglobulinemia and the dose is between about 175 mg and about 200 mg. In another embodiment, the cancer is Waldenstrom's macroglobulinemia and the dose is between about 120 mg and about 150 mg. In another embodiment, the cancer is Waldenstrom's macroglobulinemia and the dose is between about 125 mg and about 150 mg.

In another embodiment, the cancer is Waldenstrom's macroglobulinemia wherein the patient has a MYD88 mutation. In another embodiment, the cancer is Waldenstrom's macroglobulinemia, the patient has a MYD88 mutation, and the dose is between about 120 mg and about 300 mg. In another embodiment, the cancer is Waldenstrom's macroglobulinemia, the patient has a MYD88 mutation, and the dose is between about 125 mg and about 300 mg. In another embodiment, the cancer is Waldenstrom's macroglobulinemia, the patient has a MYD88 mutation, and the dose is between about 150 mg and about 300 mg. In another embodiment, the cancer is Waldenstrom's macroglobulinemia, the patient has a MYD88 mutation, and the dose is between about 175 mg and about 300 mg. In another embodiment, the cancer is Waldenstrom's macroglobulinemia, the patient has a MYD88 mutation, and the dose is between about 200 mg and about 300 mg. In another embodiment, the cancer is Waldenstrom's macroglobulinemia, the patient has a MYD88 mutation, and the dose is between about 225 mg and about 300 mg. In another embodiment, the cancer is Waldenstrom's macroglobulinemia, the patient has a MYD88 mutation, and the dose is between about 250 mg and about 300 mg. In another embodiment, the cancer is Waldenstrom's macroglobulinemia, the patient has a MYD88 mutation, and the dose is between about 275 mg and about 300 mg. In another embodiment, the cancer is Waldenstrom's macroglobulinemia, the patient has a MYD88 mutation, and the dose is between about 120 mg and about 200 mg. In another embodiment, the cancer is Waldenstrom's macroglobulinemia, the patient has a MYD88 mutation, and the dose is between about 125 mg and about 200 mg. In another embodiment, the cancer is Waldenstrom's macroglobulinemia, the patient has a MYD88 mutation, and the dose is between about 150 mg and about 200 mg. In another embodiment, the cancer is Waldenstrom's macroglobulinemia, the patient has a MYD88 mutation, and the dose is between about 175 mg and about 200 mg. In another embodiment, the cancer is Waldenstrom's macroglobulinemia, the patient has a MYD88 mutation, and the dose is between about 120 mg and about 150 mg. In another embodiment, the cancer is Waldenstrom's macroglobulinemia, the patient has a MYD88 mutation, and the dose is between about 125 mg and about 150 mg.

In another embodiment, the cancer is Waldenstrom's macroglobulinemia and the patient has a CXCR4 mutation. In another embodiment, the cancer is Waldenstrom's macroglobulinemia, the patient has a CXCR4 mutation, and the dose is between about 120 mg and about 300 mg. In another embodiment, the cancer is Waldenstrom's macroglobulinemia, the patient has a CXCR4 mutation, and the dose is between about 125 mg and about 300 mg. In another embodiment, the cancer is Waldenstrom's macroglobulinemia, the patient has a CXCR4 mutation, and the dose is between about 150 mg and about 300 mg. In another embodiment, the cancer is Waldenstrom's macroglobulinemia, the patient has a CXCR4 mutation, and the dose is between about 175 mg and about 300 mg. In another embodiment, the cancer is Waldenstrom's macroglobulinemia, the patient has a CXCR4 mutation, and the dose is between about 200 mg and about 300 mg. In another embodiment, the cancer is Waldenstrom's macroglobulinemia, the patient has a CXCR4 mutation, and the dose is between about 225 mg and about 300 mg. In another embodiment, the cancer is Waldenstrom's macroglobulinemia, the patient has a CXCR4 mutation, and the dose is between about 250 mg and about 300 mg. In another embodiment, the cancer is Waldenstrom's macroglobulinemia, the patient has a CXCR4 mutation, and the dose is between about 275 mg and about 300 mg. In another embodiment, the cancer is Waldenstrom's macroglobulinemia, the patient has a CXCR4 mutation, and the dose is between about 120 mg and about 200 mg. In another embodiment, the cancer is Waldenstrom's macroglobulinemia, the patient has a CXCR4 mutation, and the dose is between about 125 mg and about 200 mg. In another embodiment, the cancer is Waldenstrom's macroglobulinemia, the patient has a CXCR4 mutation, and the dose is between about 150 mg and about 200 mg. In another embodiment, the cancer is Waldenstrom's macroglobulinemia, the patient has a CXCR4 mutation, and the dose is between about 175 mg and about 200 mg. In another embodiment, the cancer is Waldenstrom's macroglobulinemia, the patient has a CXCR4 mutation, and the dose is between about 120 mg and about 150 mg. In another embodiment, the cancer is Waldenstrom's macroglobulinemia, the patient has a CXCR4 mutation, and the dose is between about 125 mg and about 150 mg.

In another embodiment, the cancer is Waldenstrom's macroglobulinemia and the patient is post stem cell transplant. In another embodiment, the cancer is Waldenstrom's macroglobulinemia, the patient is post stem cell transplant, and the dose is between about 120 mg and about 300 mg. In another embodiment, the cancer is Waldenstrom's macroglobulinemia, the patient is post stem cell transplant, and the dose is between about 25 mg and about 300 mg. In another embodiment, the cancer is Waldenstrom's macroglobulinemia, the patient is post stem cell transplant, and the dose is between about 150 mg and about 300 mg. In another embodiment, the cancer is Waldenstrom's macroglobulinemia, the patient is post stem cell transplant, and the dose is between about 175 mg and about 300 mg. In another embodiment, the cancer is Waldenstrom's macroglobulinemia, the patient is post stem cell transplant, and the dose is between about 200 mg and about 300 mg. In another embodiment, the cancer is Waldenstrom's macroglobulinemia, the patient is post stem cell transplant, and the dose is between about 225 mg and about 300 mg. In another embodiment, the cancer is Waldenstrom's macroglobulinemia, the patient is post stem cell transplant, and the dose is between about 250 mg and about 300 mg. In another embodiment, the cancer is Waldenstrom's macroglobulinemia, the patient is post stem cell transplant, and the dose is between about 275 mg and about 300 mg. In another embodiment, the cancer is Waldenstrom's macroglobulinemia, the patient is post stem cell transplant, and the dose is between about 120 mg and about 200 mg. In another embodiment, the cancer is Waldenstrom's macroglobulinemia, the patient is post stem cell transplant, and the dose is between about 125 mg and about 200 mg. In another embodiment, the cancer is Waldenstrom's macroglobulinemia, the patient is post stem cell transplant, and the dose is between about 150 mg and about 200 mg. In another embodiment, the cancer is Waldenstrom's macroglobulinemia, the patient is post stem cell transplant, and the dose is between about 175 mg and about 200 mg. In another embodiment, the cancer is Waldenstrom's macroglobulinemia, the patient if is post stem cell transplant, and the dose is between about 120 mg and about 150 mg. In another embodiment, the cancer is Waldenstrom's macroglobulinemia, the patient is post stem cell transplant, and the dose is between about 125 mg and about 150 mg. Preferably, the stem cells are autologous. Preferably, the stem cells are allogeneic.

In another embodiment, the cancer is plasma cell neoplasms. In another embodiment, the cancer is plasma cell neoplasms and the dose is between about 120 mg and about 300 mg. In another embodiment, the cancer is plasma cell neoplasms and the dose is between about 125 mg and about 300 mg. In another embodiment, the cancer is plasma cell neoplasms and the dose is between about 150 mg and about 300 mg. In another embodiment, the cancer is plasma cell neoplasms and the dose is between about 175 mg and about 300 mg. In another embodiment, the cancer is plasma cell neoplasms and the dose is between about 200 mg and about 300 mg. In another embodiment, the cancer is plasma cell neoplasms and the dose is between about 225 mg and about 300 mg. In another embodiment, the cancer is plasma cell neoplasms and the dose is between about 250 mg and about 300 mg. In another embodiment, the cancer is plasma cell neoplasms and the dose is between about 275 mg and about 300 mg. In another embodiment, the cancer is plasma cell neoplasms and the dose is between about 120 mg and about 200 mg. In another embodiment, the cancer is plasma cell neoplasms and the dose is between about 125 mg and about 200 mg. In another embodiment, the cancer is plasma cell neoplasms and the dose is between about 150 mg and about 200 mg. In another embodiment, the cancer is plasma cell neoplasms and the dose is between about 175 mg and about 200 mg. In another embodiment, the cancer is plasma cell neoplasms and the dose is between about 120 mg and about 150 mg. In another embodiment, the cancer is plasma cell neoplasms and the dose is between about 125 mg and about 150 mg.

In another embodiment, the cancer is multiple myeloma. In another embodiment, the cancer is multiple myeloma and the dose is between about 120 mg and about 300 mg. In another embodiment, the cancer is multiple myeloma and the dose is between about 125 mg and about 300 mg. In another embodiment, the cancer is multiple myeloma and the dose is between about 150 mg and about 300 mg. In another embodiment, the cancer is multiple myeloma and the dose is between about 175 mg and about 300 mg. In another embodiment, the cancer is multiple myeloma and the dose is between about 200 mg and about 300 mg. In another embodiment, the cancer is multiple myeloma and the dose is between about 225 mg and about 300 mg. In another embodiment, the cancer is multiple myeloma and the dose is between about 250 mg and about 300 mg. In another embodiment, the cancer is multiple myeloma and the dose is between about 275 mg and about 300 mg. In another embodiment, the cancer is multiple myeloma and the dose is between about 120 mg and about 200 mg. In another embodiment, the cancer is multiple myeloma and the dose is between about 125 mg and about 200 mg. In another embodiment, the cancer is multiple myeloma and the dose is between about 150 mg and about 200 mg. In another embodiment, the cancer is multiple myeloma and the dose is between about 175 mg and about 200 mg. In another embodiment, the cancer is multiple myeloma and the dose is between about 120 mg and about 150 mg. In another embodiment, the cancer is multiple myeloma and the dose is between about 125 mg and about 150 mg.

In another embodiment, the cancer is hairy cell leukemia. In another embodiment, the cancer is hairy cell leukemia and the dose is between about 120 mg and about 300 mg. In another embodiment, the cancer is hairy cell leukemia and the dose is between about 125 mg and about 300 mg. In another embodiment, the cancer is hairy cell leukemia and the dose is between about 150 mg and about 300 mg. In another embodiment, the cancer is hairy cell leukemia and the dose is between about 175 mg and about 300 mg. In another embodiment, the cancer is hairy cell leukemia and the dose is between about 200 mg and about 300 mg. In another embodiment, the cancer is hairy cell leukemia and the dose is between about 225 mg and about 300 mg. In another embodiment, the cancer is hairy cell leukemia and the dose is between about 250 mg and about 300 mg. In another embodiment, the cancer is hairy cell leukemia and the dose is between about 275 mg and about 300 mg. In another embodiment, the cancer is hairy cell leukemia and the dose is between about 120 mg and about 200 mg. In another embodiment, the cancer is hairy cell leukemia and the dose is between about 125 mg and about 200 mg. In another embodiment, the cancer is hairy cell leukemia and the dose is between about 150 mg and about 200 mg. In another embodiment, the cancer is hairy cell leukemia and the dose is between about 175 mg and about 200 mg. In another embodiment, the cancer is hairy cell leukemia and the dose is between about 120 mg and about 150 mg. In another embodiment, the cancer is hairy cell leukemia and the dose is between about 125 mg and about 150 mg.

In another embodiment, the cancer is follicular lymphoma. In another embodiment, the cancer is follicular lymphoma and the dose is between about 120 mg and about 300 mg. In another embodiment, the cancer is follicular lymphoma and the dose is between about 125 mg and about 300 mg. In another embodiment, the cancer is follicular lymphoma and the dose is between about 150 mg and about 300 mg. In another embodiment, the cancer is follicular lymphoma and the dose is between about 175 mg and about 300 mg. In another embodiment, the cancer is follicular lymphoma and the dose is between about 200 mg and about 300 mg. In another embodiment, the cancer is follicular lymphoma and the dose is between about 225 mg and about 300 mg. In another embodiment, the cancer is follicular lymphoma and the dose is between about 250 mg and about 300 mg. In another embodiment, the cancer is follicular lymphoma and the dose is between about 275 mg and about 300 mg. In another embodiment, the cancer is follicular lymphoma and the dose is between about 120 mg and about 200 mg. In another embodiment, the cancer is follicular lymphoma and the dose is between about 125 mg and about 200 mg. In another embodiment, the cancer is follicular lymphoma and the dose is between about 150 mg and about 200 mg. In another embodiment, the cancer is follicular lymphoma and the dose is between about 175 mg and about 200 mg. In another embodiment, the cancer is follicular lymphoma and the dose is between about 120 mg and about 150 mg. In another embodiment, the cancer is follicular lymphoma and the dose is between about 125 mg and about 150 mg.

Also provided herein is a method of treating MCL in a patient in need of treatment wherein the patient received a prior BTK inhibitor comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating MCL in a patient in need of treatment wherein the patient received at least one prior anti-cancer therapy, comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating CLL/SLL in a patient in need of treatment wherein the patient received at least two prior anti-cancer therapies comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating CLL/SLL in a patient in need of treatment wherein the patient received at least one prior anti-cancer therapy, comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating CLL/SLL in a patient in need of treatment wherein the patient received at least two prior anti-cancer therapies that includes at least one BTK inhibitor based therapy, comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating CLL/SLL in a patient in need of treatment wherein the patient received at least one prior anti-cancer therapy that includes at least one BTK inhibitor based therapy, comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating CLL/SLL in a patient in need of treatment wherein the patient received at least two prior anti-cancer therapies comprising administering to the patient a daily dose of between about 120 mg and about 600 mg of a compound that is BTK-I or a pharmaceutically acceptable salt thereof in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose of between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a method of treating CLL/SLL in a patient in need of treatment wherein the patient received at least one prior anti-cancer therapy, comprising administering to the patient a daily dose of between about 120 mg and about 600 mg of a compound that is BTK-I or a pharmaceutically acceptable salt thereof in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose of between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a method of treating CLL/SLL in a patient in need of treatment wherein the patient received at least two prior anti-cancer therapies that includes at least one BTK inhibitor based therapy, comprising administering to the patient a daily dose of between about 120 mg and about 600 mg of a compound that is BTK-I or a pharmaceutically acceptable salt thereof in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose of between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a method of treating CLL/SLL in a patient in need of treatment wherein the patient received at least one prior anti-cancer therapy that includes at least one BTK inhibitor based therapy, comprising administering to the patient a daily dose of between about 120 mg and about 600 mg of a compound that is BTK-I or a pharmaceutically acceptable salt thereof in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose of between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a method of treating CLL/SLL in a patient in need of treatment wherein the patient received no prior anti-cancer therapy, comprising administering to the patient a daily dose of between about 120 mg and about 600 mg of a compound that is BTK-I or a pharmaceutically acceptable salt thereof in simultaneous, separate, or sequential administration with an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a method of treating CLL/SLL in a patient in need of treatment wherein the patient has a 17p deletion, comprising administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating Waldenstrom's macroglobulinemia in a patient in need of treatment, comprising administering to the patient a daily dose of between about 120 mg and about 600 mg of BTK-I or a pharmaceutically acceptable salt thereof in simultaneous, separate, or sequential administration with an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is rituximab.

Also provided herein is a method of treating marginal zone lymphoma in a patient in need of treatment wherein the patient received at least one prior anti-cancer therapy and requires systemic therapy, comprising administering to the patient a daily dose of about 120 mg and about 600 mg of BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a method of treating marginal zone lymphoma in a patient in need of treatment wherein the patient received at least one prior anti-CD20 based therapy and requires systemic therapy, comprising administering to the patient a daily dose of between about 120 mg and about 600 mg of BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of MCL wherein the compound or salt is administered to a patient at a daily dose of between about 120 mg and about 600 mg and wherein the patient received a prior BTK inhibitor. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of MCL wherein the compound or salt is administered to a patient at a daily dose of between about 120 mg and about 600 mg and wherein the patient received at least one prior anti-cancer therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least two prior anti-cancer therapies. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least one prior anti-cancer therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least two prior anti-cancer therapies that includes at least one BTK inhibitor based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least one prior anti-cancer therapy that includes at least one BTK inhibitor based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least two prior anti-cancer therapies, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least one prior anti-cancer therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least two prior anti-cancer therapies that includes at least one BTK inhibitor based therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received at least one prior anti-cancer therapy that includes at least one BTK inhibitor based therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on 15 day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received no prior anti-cancer therapy, in simultaneous, separate, or sequential administration with an anti-CD20 based therapy. In another embodiment, the daily dose is between about 125 mg and 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is a compound which is BTK-I or a pharmaceutically acceptable salt thereof for use in the treatment of CLL/SLL wherein the compound or salt is administered to a patient at a daily dose of between about 120 mg and about 600 mg and wherein the patient received has a 17p deletion. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt thereof for use in the treatment of Waldenstrom's macroglobulinemia wherein the compound or salt is administered to a patient at a daily dose of between about 120 mg and about 600 mg in simultaneous, separate, or sequential administration with an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is rituximab.

Also provided herein is a compound which is BTK-I or a pharmaceutically acceptable salt thereof for use in the treatment of marginal zone lymphoma wherein the compound or salt is administered to a patient at a daily dose between about 120 mg and about 600 mg and the patient received at least one prior anti-cancer therapy and requires systemic therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a compound which is BTK-I or a pharmaceutically acceptable salt for use in the treatment of marginal zone lymphoma wherein the compound or salt is administered to a patient at a daily dose of between about 120 mg and about 600 mg and the patient received at least one prior anti-CD20 based therapy and requires systemic therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of MCL wherein the compound or salt is administered to a patient at a daily dose of between about 120 mg and about 600 mg and wherein the patient received a prior BTK inhibitor. In another embodiment, the daily dose is between about 125 mg and about 600 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of MCL wherein the compound or salt is administered to a patient at a daily dose of between about 120 mg and about 600 mg and wherein the patient received at least one prior anti-cancer therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least two prior anti-cancer therapies. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least one prior anti-cancer therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least two prior anti-cancer therapies that includes at least one BTK inhibitor based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least one prior anti-cancer therapy that includes at least one BTK inhibitor based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least two prior anti-cancer therapies, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least one prior anti-cancer therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least two prior anti-cancer therapies that includes at least one BTK inhibitor based therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m² or as a split dose on day 1 and 2. Preferably, rituximab is administered on day 1 +/−3 days of a first 28-day cycle at about 375 mg/m² or as a split dose on day 1 and 2. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m² or as a split dose on day 1 and 2 and rituximab is then either administered at about 500 mg/m² on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received at least one prior anti-cancer therapy that includes at least one BTK inhibitor based therapy, in simultaneous, separate, or sequential administration with a BCL-2 inhibitor and an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m² or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received no prior anti-cancer therapy, in simultaneous, separate, or sequential administration with an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is administered on day 1 of a first 28-day cycle or as a split dose on day 1 and 2. Preferably, the anti-CD20 based therapy is administered on day 1 +/−3 days of a first 28-day cycle at about 375 mg/m$^2$ or as a split dose on day 1 and 2. Preferably, the anti-CD20 based therapy is administered on day 1 of a first 28-day cycle or as a split dose on day 1 and 2 and then the anti-CD20 based therapy is either administered on day 1 or not at all during each of any subsequent cycles. Preferably, the BCL-2 inhibitor is administered during a fourth 28-day cycle. Preferably, the anti-CD20 based therapy is administered on day 1 of a first 28-day cycle or as a split dose on day 1 and 2 and the anti-CD20 based therapy is then either administered on day 1 or not at all during each of any subsequent cycles and the BCL-2 inhibitor is administered during a fourth 28-day cycle. Preferably, BTK-I is administered daily starting on day 1, the anti-CD20 based therapy is administered on day 1 of a first 28-day cycle or as a split dose on day 1 and 2 and the anti-CD20 based therapy is then either administered on day 1 or not at all during each of any subsequent cycles, and the BCL-2 inhibitor is administered during a fourth 28-day cycle. Preferably, the BCL-2 inhibitor is venetoclax. Preferably, the BCL-2 inhibitor is BCL2-I or a pharmaceutically acceptable salt thereof. Preferably, the BCL-2 inhibitor is BCL2-I. Preferably, the anti-CD20 based therapy is rituximab. Preferably, the anti-CD20 based therapy is obinutuzumab. Preferably, the anti-CD20 based therapy is R-CHOP. Preferably, rituximab is administered on day 1 of a first 28-day cycle at about 375 mg/m$^2$ or as a split dose on day 1 and 2. Preferably, rituximab is administered on day 1 +/−3 days of a first 28-day cycle at about 375 mg/m$^2$ or as a split dose on day 1 and 2. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles. Preferably, venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles. Preferably, BTK-I is administered at about 200 mg daily, rituximab is administered on day 1 of a first 28-day cycle at about 375 mg/m$^2$ or as a split dose on day 1 and 2 and rituximab is then either administered at about 500 mg/m$^2$ on day 1 or not at all during each of any subsequent cycles and venetoclax is administered during a fourth 28-day cycle at a dose of about 20 mg for days 1-7 of the cycle, about 50 mg for days 8-14 of the cycle, about 100 mg for days 15-21 of the cycle, and about 200 mg for days 22-28 of the cycle, and then is daily dosed at about 400 mg for any subsequent cycles.

Also provided herein is use of a compound which is BTK-I or a pharmaceutically acceptable salt thereof for the manufacture of a medicament for the treatment of CLL/SLL wherein the compound or salt is administered to a patient at a daily dose of between about 120 mg and about 600 mg and wherein the patient received has a 17p deletion. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is use of a compound which is BTK-I or a pharmaceutically acceptable salt thereof for the manufacture of a medicament for the treatment of Waldenstrom's macroglobulinemia wherein the compound or salt is administered to a patient at a daily dose of between about 120 mg and about 600 mg in simultaneous, separate, or sequential administration with an anti-CD20 based therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I. Preferably, the anti-CD20 based therapy is rituximab.

Also provided herein is use of a compound which is BTK-I or a pharmaceutically acceptable salt thereof for the manufacture of a medicament for the treatment of marginal zone lymphoma wherein the compound or salt is administered to a patient at a daily dose of between about 120 mg and about 600 mg and the patient received at least one prior anti-cancer therapy and requires systemic therapy. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

Also provided herein is a use of a compound which is BTK-I or a pharmaceutically acceptable salt thereof for the manufacture of a medicament for the treatment of marginal zone lymphoma wherein the compound or salt is administered to a patient at a daily dose of between about 120 mg and about 600 mg and the patient received at least one prior anti-CD20 based therapy and requires systemic therapy. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

The present invention also provides a method of treating cGVHD in a patient in need thereof. In one embodiment, the method comprises administering to the patient a daily dose of between about 120 mg and about 600 mg of a compound that is BTK-I or a pharmaceutically acceptable salt thereof. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

The present invention also provides a compound which is BTK-I or pharmaceutically acceptable salt thereof for use in the treatment of cGVHD. Also provided herein is a compound which is BTK-I or pharmaceutically acceptable salt thereof for use in the treatment of cGVHD wherein the compound or salt is administered at a daily dose of between about 120 mg and about 600 mg. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

The present invention also provides use of a compound which is BTK-I or pharmaceutically acceptable salt thereof for the manufacture of a medicament for the treatment of cGVHD wherein the compound or salt is administered at a daily dose of between about 120 mg and about 600 mg. In another embodiment, the daily dose is between about 125 mg and about 600 mg. In another embodiment, the daily dose is between about 120 mg and about 300 mg. In another embodiment, the daily dose is between about 125 mg and about 300 mg. In another embodiment, the daily dose is between about 150 mg and about 300 mg. In another embodiment, the daily dose is between about 175 mg and about 300 mg. In another embodiment, the daily dose is between about 200 mg and about 300 mg. In another embodiment, the daily dose is about 150 mg. In another embodiment, the daily dose is about 200 mg. In another embodiment, the daily dose is about 300 mg. Preferably, the compound is BTK-I.

In another embodiment of the methods and uses described herein, the autoimmune disease is selected from: multiple sclerosis, lupus, Sjögren's syndrome, rheumatoid arthritis, Pemphigus vulgaris, and bullous pemphigoid.

In another embodiment of the methods and uses described herein, BTK-I or a pharmaceutically acceptable salt thereof is administered to patients in an oral form, Preferably, in tablets or capsule. In one preferred embodiment, each of the tablets or capsules are formulated to contain about 25 mg, or about 50 mg, or about 100 mg of BTK-I or a pharmaceutically acceptable salt thereof. Patients can be administered one or more of the tablets or capsules each containing the same or different amounts of BTK-I or a pharmaceutically acceptable salt thereof to provide the desired dose.

In another embodiment of the methods and uses described herein, BTK-I or a pharmaceutically acceptable salt thereof is administered in combination with other standard-of-care treatments for patients. The standard of care treatment can include one or more of the following: surgery or excision of all or part of the tumor, radiation therapy, and stem cell transplant.

As used herein, the term "treat", "treating", or "treatment" refers to restraining, slowing, stopping, or reversing the progression or severity of an existing symptom or disorder. Note that as used herein, the term "treatment" is interchangeable with the terms "regimen" and "therapy".

As used herein, the term, "treatment naïve" refers to the lack of a patient receiving any prior anti-cancer therapy for the particular condition. Also known as first line treatment.

As used herein, the term "patient" refers to a human, which is afflicted with a disease, disorder, or condition. Preferably, the term patient refers to a human, which is afflicted with cancer.

As used herein, the term "systemic therapy" refers to any type of cancer treatment that targets the entire body. For example, chemotherapy is the most common form of systemic cancer treatment.

As used herein the term "relapse" refers to evidence of disease progression according to disease-defined criteria in a patient who has previously achieved a complete response (CR) or partial response (PR) for ≥6 months (Waldenstrom's macroglobulinemia (WM) patients with an International Workshop on Waldenstrom's macroglobulinemia (IWWM) defined minor response for ≥6 months would also be considered as relapsed at time of disease progression).

As used herein the term "refractory" refers to treatment failure as defined by less than CR or PR (i.e., stable disease (SD), nonresponse, PD, PD death from any cause) or progression within 6 months from the last dose of therapy. WM patients with an IWWM defined minor response for ≥6 months would also be considered as refractory at time of disease progression.

As used herein the term "$IC_{90}$" refers to the concentration of drug required for 90% inhibition. $IC_{90}$ is an operational term dependent on the assay conditions.

As used herein the term "intolerant" or "treatment intolerance" refers to patients who have experienced: ≥1 Grade 3 or ≥2 Grade 2 non-hematologic toxicities, or ≥Grade 3 neutropenia with infection or fever, or ≥1 Grade 4 hematologic toxicity. The above leads to treatment discontinuation for ≥14 days without disease progression (the patient could have progressed after 14 days). Toxicities should resolve to ≤Grade 1 off therapy (Hallek, Cheson et al., "IWCLL guidelines for diagnosis, indications for treatment, response assessment, and supportive management of CLL." Blood, 2018, 131(25): 2745-2760.)

The compound, (S)-5-amino-3-(4-((5-fluoro-2-methoxybenzamido)methyl)phenyl)-1-(1,1,1-trifluoropropane-2-yl)-1H-pyrazole-4-carboxamide, also known as 5-amino-3-[4-[[[(5-fluoro-2-methoxy-benzoyl)amino]methyl]phenyl]-1-[(1S)-2,2,2-trifluoro-1-methyl-ethyl]pyrazole-4-carboxamide, and also known as BTK-I, has the structure illustrated below as Formula I.

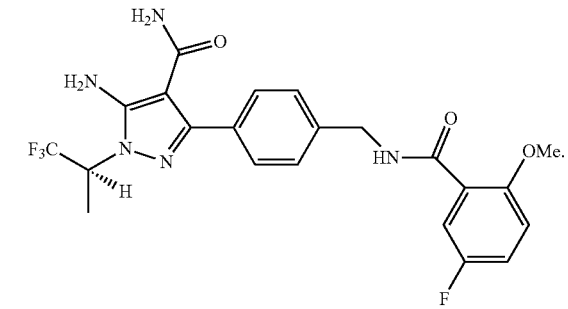

Formula I

As used herein, the term "cycle," "administration cycle," or "treatment cycle" refers to the drug treatment period. Most chemotherapy treatments are given in repeating cycles. The length of a cycle depends on the treatment being given. Most cycles range from 2 to 6 weeks. The number of treatment doses scheduled within each cycle also varies depending on patient's response and any adverse events as determined by a medical provider. Most patients will receive several cycles of chemotherapy. BTK-I or a pharmaceutically acceptable salt thereof can be administered daily for a 28-day cycle. BTK-I or a pharmaceutically acceptable salt thereof can also be administered twice daily for a 28-day cycle.

As used herein, the term "once daily" or "QD" refers to administration of BTK-I or a pharmaceutically acceptable salt thereof once per 24-hour period of time. For clarity and by way of example, administration of a 150 mg dose once daily means administration of 150 mg of BTK-I or a pharmaceutically acceptable salt thereof once during a 24-hour period.

As used herein, the term "twice daily" or "BID" refers to two times during a 24-hour period of time, typically, but not always, about 12 hours apart. For clarity and by example, administration of 150 mg twice daily means administration of two separate 150 mg doses of BTK-I or a pharmaceutically acceptable salt thereof over about a 24-hour period totaling 300 mg dose for the 24-hour period.

As used herein, the term "continuous daily dose regimen" refers to dosing every day on a particular schedule, for example QD dosing starting on day 1 of a 28-day cycle. Subsequent cycles may be administered as determined by a treating physician.

As used herein, the term "progression of the BTK-mediated cancer" or "disease progression" refers to the period of time in which the cancer or disease has become worse or has spread in the body. Such progression may readily be determined by a treating physician.

As used herein, the term "unacceptable toxicity" refers to toxicity that is considered unacceptable due to its severity and/or irreversibility. Such unacceptability may readily be determined by a treating physician.

As used herein, the term "effective amount" or "therapeutically effective amount" refers to the amount or dose of compound of the invention, or a pharmaceutically acceptable salt thereof which, upon single or multiple dose administration to the patient, provides the desired effect in the patient under diagnosis or treatment.

As used herein the term "about" refers to ±5%.

As used herein the term "AUC" refers to the area under the curve. AUC is a measure of how much drug reaches a patient's bloodstream in a given period of time after a dose is given.

As used herein a "BTK-mediated disease" refers to cancer, lymphoma, leukemia, autoimmune disease, inflammatory disorder, hyperimmune condition, or fibrosis that is mediated by BTK.

As used herein the term "BTK-mediated cancer" refers to both B-cell lymphomas and B-cell leukemia. B-cell lymphomas refers to Hodgkin's (also known as Hodgkin) lymphomas and non-Hodgkin's (also known as non-Hodgkin) lymphomas, multiple myeloma, and immunoproliferative diseases. Specific examples include DLBCL, ABC-DLBCL, MCL, follicular lymphoma, MZL, SLL, and Waldenstrom's macroglobulinemia. B-cell leukemia includes CLL, acute lymphoblastic leukemia (ALL), B-cell prolymphocytic leukemia, and hairy cell leukemia.

As used herein the terms "B-cell non-Hodgkin lymphoma", "B-cell non-Hodgkin's lymphoma", "B-cell NHL" refer to a cancerous condition well understood by those skilled in the art. It is a cancer that starts in B-cells. Examples of B-cell NHL include, but are not limited to, DLBCL, AVBC-DLBCL, MCL, MZL, CLL/SLL, Waldenstrom's macroglobulinenia, and follicular lymphoma.

As used herein the term "anti-cancer therapy" or "anti-cancer therapies" refers to chemotherapy, radiation therapy, surgery, immunotherapy such as anti-CD20 based therapy, antibodies, antibody drug conjugates, small molecule inhibitors (for example BCL-2 inhibitors, mTOR inhibitors, proteasome inhibitors, PI3K inhibitors or lenalidomide), stem cell transplant (autologous or allogeneic), siRNAs, bispecific antibodies/T-cell engaging therapy, and CAR-T cell therapy. Unless otherwise stated, anti-cancer therapy May include a BTK inhibitor based therapy.

As used herein, the term "anti-CD20 based therapy" refers to a medical treatment that includes the use of an anti-CD20 antibody for example rituximab or obinutuzumab, or R-CHOP (rituximab, cyclophosphamide, doxorubicin hydrochloride, vincristine sulfate, and prednisone) or a CD20 inhibitor.

As used herein, the term "BTK inhibitor" refers to an in inhibitor of a tyrosine kinase that is encoded by the BTK gene in humans. Examples of BTK inhibitors include ibrutimb, acalabrutinib, zanubrutinib, and tirabrutinib, As used herein, the term "BTK inhibitor based therapy" or "BTK inhibitor-based regimen" refers to a medical treatment that includes the use of a BTK inhibitor.

As used herein, the term "BTK inhibitor based therapy naïve" refers to the lack of a patient receiving a prior medical treatment that includes the use of a BTK inhibitor for a particular condition.

As used herein, the term "BCL-2 inhibitor" refers to inhibitors of B-cell lymphoma 2. Examples of BCL-2 inhibitors include venetoclax, BCL2-I, and compounds disclosed in WO2018/027097, WO2019/210828, WO2017/132474, WO2019/139899, WO2018/127130, and WO2018/192462, and any pharmaceutically acceptable salts thereof. Likewise, BCL-2 and BCL2 are used herein interchangeably.

The compound, N-[[(3S)-3-benzyl-5-nitro-3,4-dihydro-2H-1,4-benzoxazin-7-yl]sulfonyl]-4-[4-[[2-(4-chlorophenyl)-4,4-dimethyl-cyclohexen-1-yl]methyl]piperazin-1-yl]-2-(1H-pyrrolo[2,3-b]pyridin-5-yloxy)benzamide, also known as (S)-2-((1H-pyrrolo[2,3-b]pyridine-5-yl)oxy)-N-((3-benzyl-5-nitro-3,4-dihydro-2H-benzo[b][1,4]oxazin-7-yl)sulfonyl)-4-(4-((4'-chloro-5,5-dimethyl-3,4,5,6-tetrahydro-[1,1'-biphenyl]-2-yl)methyl)piperazin-1-yl) benzamide, and also known as BCL2-I, has the structure illustrated below as Formula II.

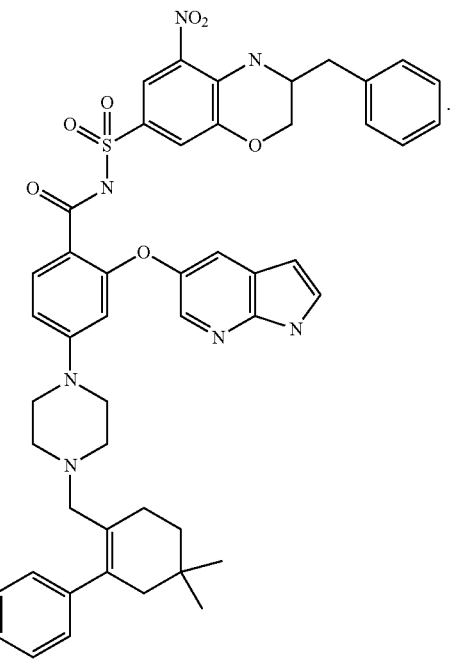

Formula II

As used herein, the term "CLL/SLL" refers to chronic lymphocytic leukemia and/or small lymphocytic lymphoma. CLL and SLL are the same disease, but in CLL cancer cells are found mostly in the blood and bone marrow. In SLL cancer cells are found mostly in the lymph nodes. CLL/SLL is a type of non-Hodgkin lymphoma.

The following non-limiting examples and assays further illustrate the present invention and the unexpected benefits thereof.

The following assays, analysis and results illustrating the unexpected improvements of the dosing for BTK-I as tumor inhibition and pharmacokinetics.

The following assays and clinical study designs further illustrate the invention, but should not be construed to limit the scope of the invention in anyway.

Certain abbreviations are defined as follows: "BCA" refers to bicinchoninic acid; "DMEM" refers to Dulbecco's Modified Eagle's Medium; "DMSO" refers to dimethyl sulfoxide; "DPBS" refers to Dulbecco's phosphate buffered saline; "FBS" refers to Fetal Bovine Serum; "HEK" refers to human embryonic kidney; "hr" refers to hour or hours; "NCI CTCAE" refers to National Cancer Institute common terminology criteria for adverse events; and "WT" refers to wild type.

In Vivo Mouse Studies

In all studies, test articles are administered alone and in combination, following different dosing regimens. The table below shows the test compound(s), dosing frequency, cell line used, disease, model BTK status (WT) or C481S), and mouse strain, for each study.

Human TMD8 BTK WT, TMD8 BTK C481S or REC-1 cells are injected subcutaneously in the right flank of mice. When tumors reach a mean volume between 150 $mm^3$ and 400 mm³, mice are randomized based on their tumor volumes. Mice are next dosed for 14 to 23 days depending on the study design. The potencies of the compounds standalone or in combination on the inhibition of the tumor growth are assessed based on the tumor volume changes and weights after collection at the end of the study. Additionally, in the TMD8 studies, the plasma concentrations of test articles are measured at multiple time points after the last dose.

In Vivo Studies

| Study | Test Compound | Test Compound 2/Frequency | Cell line | BTK status | Disease | Mouse strain |
|---|---|---|---|---|---|---|
| 1 | BTK-I/BID | | TMD8 | WT | DLBCL | Balb/s Scid |
| 2 | BTK-I/BID | | REC-1 | WT | MCL | Hsd-Athymic Nude-Foxn 1$^{NU}$ |
| 3 | BTK-I/BID | | TMD8 C481S | C481S | DLBCL | Balb/c SCID |
| 4 | BTK-I/BID | Venetoclax/QD | TMD8 | WT | DLBCL | Balb/c SCID |
| 5 | BTK-I/BID | Venetoclax/QD | REC-1 | WT | MCL | Hsd-Athymic Nude-Foxn 1$^{NU}$ |
| 6 | BTK-I/BID | Venetoclax/QD | TMD8 C481S | C481S | DLBCL | Balb/c SCID |
| 7 | BTK-I/BID | Rituximab + CHO (cyclophosphamide, doxorubicin hydrochloride, vincristine sulfate) (Q7 D + P (prednisone)/QD(3/7) (collectively, R-CHOP) | TMD8 | WT | DLBCL | Balb/c SCID |
| 8 | BTK-I/BID | Obinutuzumab | TMD8 | WT | DLBCL | Balb/c SCID |

BID, twice a day; QD, once a day; Q7 D, every 7 days; QD(3/7), 3 consecutive days every 7 days.

All treatments were well tolerated without any significant body weight loss or clinical signs being observed in the mice. BTK-I potently inhibited the growth of BTK WT and BTK C481S driven xenograft tumors. In all combinations tested, greater tumor growth inhibition was observed in groups where BTK-I was co-administered with clinically approved agents.

Inhibition Activity of BTK-I Against BTK Y223 Autophosphorylation on BTK Wild Type and C481S Mutant Expressed in HEK293 Cells HEK293 cell lines stably expressing BTK wild type and the mutant form C481S are generated using standard transfection methods. For assessment of cellular inhibition potency, cells are grown in DMEM+10% FBS+1 μg/mL puromycin (complete growth media) at 37° C. in a C02 incubator. Cells are harvested according to standard protocols using TrypLE (Gibco #12604-013), counted, resuspended in complete growth media, and added to 6 well assay plates at 4×10≡cell/well in 2 mL. Plates are incubated overnight at 37° C. with 5% C02. The following day, cells are treated for 2 hours with BTK-I, prepared as a 6-point dose curve, 1:3 dilution series with final concentrations starting at a maximum concentration of 300 nM and a constant DMSO concentration of 0.5% (v/v). Control wells contain 0.5% (v/v) DMSO alone (no inhibition control). All samples are tested in triplicate. Following compound incubation, growth medium is discarded, cells are washed with DPBS (1×) (Gibco #14190-144) and lysed in 1 mL of CelLytic™ M (Sigma #C2978) containing 1× Halt phosphatase and protease inhibitor cocktails (Pierce #78442). Plates are placed on ice for 1 hour with gentle agitation and stored at −80° C. overnight. The next day, cell lysates are placed in 1.5 mL tubes and cleared by centrifugation at 16,000×g for 10 minutes at 4° C. Supernatants are quantified by BCA (Pierce #23225) and stored at −80° C. Samples are analyzed by Simple Western (Protein Simple) with anti-phospho-BTK (Y223) (Cell signaling technologies (cst) #5082) and anti-BTK (cst #8547). β-actin is the used as a loading control and detected by regular Western blot with an anti-β-actin antibody (cst #4970). Simple Western results are analyzed with Compass software (Protein Simple). BTK Y223 phosphorylation signal is normalized to total BTK, and IC$_{50}$ values are calculated using a 4-parameter fit in GraphPad Prism 7.04 software.

BTK-I inhibited autophosphorylation of BTK Y223 in both wild type and the C481S mutant proteins with IC$_{50}$ values of 8.6±0.3 nM and 8.8±1.8 nM, respectively. BTK-I has an IC$_{90}$ of 77.4 nM which translates to about 806 ng/mL total drug in human plasma and has an IC$_{90}$ of 79.2 nM for C481S which translates to 824 ng/mL total drug in human plasma.

Clinical Studies

The study is an open-label, multi-center study of oral BTK-I to evaluate safety and efficacy as monotherapy and as part of combination therapy in patients with CLL/SLL and NHL who have failed or are intolerant to standard of care. This study includes monotherapy as well as combination treatment parts. The monotherapy part includes Phase 1 dose escalation and dose expansion as well as Phase 2. The combination therapy part is a Phase 1b (safety assessment and expansion) of BTK-I in combination with venetoclax, with or without anti-CD20 therapy. Phase 1 dose escalation will proceed prior to start of Phase 1b or Phase 2. Once a recommended Phase 2 dose (RP2D) is identified in Phase 1, enrollment can commence to the Phase 1b combination therapies and Phase 2 monotherapy cohorts.

Phase 1 (BTK-I Monotherapy)

The primary objectives of the Phase 1 Dose Escalation and Expansion part of the study is to determine the maximum tolerated dose (MTD)/RP2D of oral BTK-I in patients with previously treated CLL/SLL and B-cell NHL.

Patients are enrolled with histologically confirmed CLL/SLL or B-cell NHL who have failed or are intolerant to at least two prior standard of care regimens given in combination or sequentially or have received at least one prior BTK inhibitor-containing regimen when BTK inhibitor is approved in first line.

BTK-I is administered in oral tablet form. Dose escalation will follow a 3+3 design starting with a 25 mg QD dose (followed by 50 mg QD (dose level cohort 2), 100 mg QD (dose level cohort 3), 150 mg QD (dose level cohort 4), 200 mg QD (dose level cohort 5), 250 mg QD (dose level cohort 6), and 300 mg QD (dose level cohort 7)). Cycle length will be 28 days. The drug limiting toxicity (DLT) period will be 28 days, commencing with the first dose of BTK-I.

For Phase 1, BTK-I monotherapy, the DLT definitions are:
1. Any ≥Grade 3 non-hematologic toxicity except for:
   First occurrence of Grade 3 electrolyte abnormalities and/or creatinine clearance decrease resolving to Grade 2 (or baseline if baseline is ≥Grade 2) within 48 hours with supportive treatment;
   Grade 3 fatigue, nausea, vomiting, diarrhea or other manageable constitutional symptom that is responsive to supportive therapy;
   Grade 3 infection responding to appropriate antibiotic/anti-viral therapy.
2. Any ≥Grade 3 thrombocytopenia that does not result in bleeding
   Grade 3 neutropenia without fever;
   Grade 4 neutropenia without fever lasting 5 days or less;
   Grade 3 thrombocytopenia that does not result in bleeding or transfusion;
   Grade 3/4 lymphopenia/lymphocytosis;
   Grade 3/4 leukopenia/leukocytosis
3. Any toxicity, regardless of the NCI CTCAE v.5 grade, resulting in discontinuation, does reduction or considered a DLT unless the SRC determines the toxicity if clearly unrelated to study drug (i.e., related to the patient's underlying disease other medical condition or concomitant medications).

For toxicity management, dose reductions for the starting dose of BTK-I may be reduced by 50 mg, then by 100 mg, and then by 150 mg.

Phase 2 (BTK-I Monotherapy):

The primary objective of the Phase 2 is to assess the primary anti-tumor activity of BTK-I based on overall response rate (ORR) and as assessed by the Independent Review Committee.

At the RP2D up to ~600 patients with CLL/SLL or NHL will be enrolled to one of the following cohorts:
Cohort 1: Non-blastoid MCL patients treated with a prior BTK-inhibitor.
Cohort 2: CLL/SLL patients treated with 2 or more prior regimens, including a BTK inhibitor-containing regimen.
Cohort 3: CLL/SLL patients with no prior therapy.
Cohort 4: CLL/SLL patients treated with prior therapy, BTK inhibitor naive.
Cohort 5: WM patients treated with a prior BTK inhibitor containing regimen.
Cohort 6: MZL patients treated with a prior BTK inhibitor containing regimen.
Cohort 7: (Not otherwise specified) defined as CLL/SLL or NHL not otherwise specified in Cohorts 1 through 6, inclusive of CLL/SLL or NHL, Richter's transformation, blastoid MCL, and patients with history of CNS involvement or primary CNS lymphoma.

Dosing during Phase 2 will be at the RP2D of 200 mg QD. The cycle length will be 28 days. BTK-I will be administered to the Phase 2 patients in oral tablet form at the RP2D. The dose (and schedule) chosen for Phase 2 may be changed by the SRC based on emerging data (e.g., PK, safety, and/or efficacy) as long as the new dose is not greater than the highest dose that has a DLT <33% and is determined to be safe by the SRC in Phase 1. If the RP2D is changed based on emerging data, patients enrolled to Phase 2 at a different dose may have the dose changed to the new dose.

Dosing for an individual should be at a consistent time each day.

BTK-I may be taken with or without food and drink.

For toxicity management, dose reductions for the starting dose may be reduced by 50 mg, then by 100 mg, and then by 150 mg.

Phase 1 Cycles 2 and Beyond and Phase 2 all Cycles

A patient who experiences a clinically significant adverse event (AE; e.g., intolerable Grade 2, or more than 1 grade change from baseline if baseline is Grade 2 or above) may have BTK-I dosing held for up to 28 days to evaluate the AE and to allow for recovery (to Grade 1 or less or baseline if baseline is Grade 2 or above).

Upon recovery, the patient may restart therapy if it is considered in his/her best interest to continue therapy and with documented Sponsor approval. Upon restarting, the patient may have the dose reduced by not more than 1 dose level. If the AE does not recover to Grade 1 or less, or baseline if baseline is Grade 2 within 28 days, the patient will have treatment permanently discontinued, unless there is a compelling clinical rationale for additional dose reduction(s) articulated by the Investigator and approved by the Sponsor. For each patient, a maximum of 3 dose reductions will be allowed, unless there is a compelling clinical rationale for additional dose reduction(s) articulated by the Investigator and approved by the Sponsor.

Phase 1b BTK-I in Combinations

Two Phase 1b arms will be opened to evaluate the safety of BTK-I in combination with approved recommended starting doses of venetoclax, rituximab, or anti-CD20 biosimilar. The starting dose of BTK-I will be the 200 mg QD RP2D given as monotherapy in Phase 1. The Phase 1b evaluations will determine the safety of BTK-I given as part of combination therapy. Upon establishment of safety, in up to 6 patients, a total of up to approximately 30 additional patients may enroll to each combination arm to further characterize safety.

Phase 1/2 Results

As of 27 Sep. 2020, of the 323 patients treated with BTK-I between 21 Mar. 2019 and 27 Sep. 2020, 269 patients were efficacy evaluable, including (139 CLL/SLL, 56 MCL, 19 WM, and 55 with other B-cell lymphomas were treated on 7 dose levels (25 mg to 300 mg QD). BTK-I demonstrated activity across all dose levels and demonstrated high oral exposures, with doses ≥100 mg QD exceeding BTK $IC_{90}$ for the entirety of the dosing interval. There were no dose limiting toxicities or dose reductions. The only treatment emergent adverse events regardless of attribution or grade in ≥10% of patients (n=323) were fatigue (n=65, 20%), diarrhea (n=55, 17%), and contusion (n=42, 13%). Responses were observed at the first dose level of 25 mg QD. A RP2D of 200 mg QD, corresponding to unbound BTK-I trough steady-state exposures with BTK $IC_{96}$ target coverage, was selected for future studies. At the data cut, 237 of 323 (73%) of all treated patients remained on BTK-I.

CLL/SLL

In 139 efficacy-evaluable patients with CLL/SLL treated across all dose levels, the ORR was 63% (95% CI: 55-71) including 69 partial response (PR), 19 PR-L, 45 stable disease (SD), 1 progressive disease (PD), and 5 patients discontinued prior to their first response assessment and were considered non-evaluable (NE). In the 121 efficacy-evaluable BTK-pretreated patients, the ORR was 62% (CI: 53-71%). As expected with on target BTK inhibition, lymphocytosis occurred early in Cycle 1, preceding maximal nodal regression. Consistent with this, responses deepened over time, achieving an ORR of 71% (35/49) in patients with the opportunity to be followed for at least 8 months, and 86% (25/29) at ≥10 months. The ORR was similar in patients who previously discontinued a covalent BTK inhibitor for progression (67% [53/79]) versus toxicity or another reason (52% [22/42]). Among patients with progression on a prior covalent BTK inhibitor, ORR was also similar in those with a BTK C481 mutation (75% [15/20]) and those without (60% [18/30]). Consistent with this, BTK C481 mutant allele fraction from peripheral blood mononuclear cells decreased over time with treatment in the majority of responding patients). Finally, in the 28 patients with a 17p deletion, TP53 mutation, or both, the ORR was 79%.

In total, 88% of all CLL/SLL patients remain on BTK-I. Median follow-up for 139 efficacy-evaluable CLL/SLL patients was 6 months (range, 0.6-17.8+ months). Of the 88 responding CLL/SLL patients, all except 5 remain on therapy (4 progressed and 1 achieved a PR and electively discontinued). The longest-followed responding patient continues on treatment at 17.8+ months.

For patients with CLL/SLL, the availability of effective and safe therapies after failure of either covalent BTK inhibitors or BCL-2 inhibitors remains an area of high unmet need. Importantly, the activity of chemotherapy combinations, anti-CD20 antibodies, and PI3K inhibitors following failure of covalent BTK inhibitors and/or venetoclax has not been evaluated prospectively, but available observational data suggest limited activity and poor tolerance. The efficacy observed in CLL/SLL with BTK-I following treatment with both covalent BTK inhibitors and venetoclax is therefore particularly noteworthy. Furthermore, unlike venetoclax, which requires a 5-week dose ramp-up with intensive monitoring, BTK-I was able to be safely administered starting at a full dose without the need for such close monitoring.

Mantle Cell Lymphoma

In the 56 efficacy-evaluable patients with MCL the ORR was 52% (95% CI: 38-65) including 14 CR, 15 PR, 10 SD, 12 PD, and 5 NE. Among the 52 patients who had received a prior covalent BTK inhibitor, the ORR was also 52% (95% CI: 38-66). Responses in MCL were observed in patients who received prior cellular therapy, including 64% (9/14) of patients with prior autologous or allogeneic transplant, and 2 of 2 with prior CAR-T. Responses were also observed in 2 of 4 patients with blastoid variant MCL. Median time to first response was 1.8 months, corresponding with first response assessment.

In total, 57% of all MCL patients remain on BTK-I. Median follow-up for efficacy-evaluable MCL patients was 6 months (range, 0.7-18.3+ months). Of the 29 responding patients, only 5 have discontinued treatment (4 for PD and 1 in CR who electively discontinued treatment to undergo allogeneic stem cell transplant). While covalent BTK inhibitors have also transformed the management of relapsed/refractory MCL, responses are generally less durable than in CLL. Specifically, in relapsed/refractory MCL, covalent BTK inhibitors have a median progression-free survival less than 2 years and median DOR in the 18-24 month range. Moreover, BTK C481 mutations are rarely observed in MCL, with activation of parallel pathways more commonly implicated. Following progression on BTK inhibitors, survival of patients with MCL is very poor at only 4-10 months. While CD19-targeted CAR-T therapy has recently been approved in the US, this approach is resource intensive, limited in availability to large tertiary centers, and often associated with risk of severe toxicities that collectively limit usage. Moreover, CD19-targeted CAR-T therapy require an effective bridging therapy, which can be difficult in BTK inhibitor-resistant patients. Thus, the activity of BTK-I in relapsed, BTK-pretreated MCL is particularly promising and addresses an important unmet clinical need.

Waldenstrom's Macroglobulinemia, Follicular Lymphoma, Richter's Transformation, and Other B-Cell Malignancies In 19 efficacy-evaluable WM patients, the ORR was 68% including 9 PR, 4 minor response (MR), and 3 SD. Among 13 patients who had received a prior covalent BTK inhibitor, the ORR was 69% (5 PR, and 4 MR). Ten of 13 WM responders are ongoing at a median follow-up of 4.6 (range, 0.8-9.2+ months). Among 8 efficacy-evaluable patients with follicular lymphoma, responses were observed in 4 patients. Among 8 patients with Richter's transformation identified prior to enrollment, responses were observed in 6 (75%). Of the remaining 39 efficacy-evaluable patients, 8 responses were observed (6/25 patients with DLBCL, 2/9 patients with MZL).

In this initial Phase I/2 experience of BTK-I, the data demonstrate favorable safety and promising efficacy in multiple B-cell neoplasms, including heavily pretreated CLL, MCL WM, and FL. Importantly, activity was seen in patients with multiple B-cell neoplasms previously treated with covalent BTK inhibitors, including those with resistance mediated by BTK C481 mutations, those with uncharacterized resistance mechanisms, and those who discontinued their prior BTK inhibitor due to intolerance. Consistent with its highly selective profile, BTK-I appeared to be well tolerated, with a wide therapeutic index, as demonstrated by the observed efficacy at all dose levels tested and the lack of an MTD. To date, low rates of important BTK-mediated toxicities including atrial arrhythmias and major bleeding have been observed, despite permitting patients with history of these events and patients on concurrent anticoagulation. Collectively, these data suggest that the reversible BTK binding mode and PK properties of BTK-I result in a clinically distinct profile with important implications for future clinical development and the treatment paradigm of these diseases. Pharmacokinetic analyses during the dose escalation phase demonstrated dose-5 dependent and linear increases in BTK-I exposure with increasing dose. Starting at the 50 mg QD dose, BTK-I delivered >IC90 target coverage for wild-type and C481S-mutated BTK, based on estimates from cell-based potencies. Despite the high plasma concentration levels DLTS have not been observed in the treated patients.

BTK-I exhibited linear dose-proportional exposures (Cmax and AUC) and low interpatient variability throughout the entire dosing range of 25 mg to 300 mg daily. Observed half-life was approximately 20 hours. Efficacy was observed at all dose levels and safety data supported selection of a 200 mg dose.

The pharmacokinetic profiles and adverse events for BTK-I doses are summarized in the below tables.

Pharmacokinetic Parameters of BTK-I—in Cancer Patients at Steady State (Cycle 1 Day 8)

| Dose Level | N | $C_{max}$ (ng/mL) Geo mean (% CV) | $T_{max}$ (h) Median (min, max) | $AUC_{0-8}$ (ng*h/mL) Geo mean (% CV) | $AUC_{0-24}$ (ng*h/mL) Geo mean (% CV) | CL/F (L/h) Geo mean (% CV) | $T_{1/2}$ (h) Geo mean (% CV) | Ratio $AUC_{0-8}$ Day 8/Day 1 Geo mean (% CV) |
|---|---|---|---|---|---|---|---|---|
| 25 mg QD | 5 | 734 (11.0%) | 2 (1, 8) | 4240 (12.4%) | 9800 (25.8%) | 1.55$^a$ (69.6%) | 18.2$^a$ (60.1%) | 1.44 (23.0%) |
| 50 mg QD | 6 | 1420 (19.2%) | 1.5 (1, 4) | 8660 (24.7%) | 20100 (34.9%) | 2.62$^b$ (36.7%) | 17.6$^b$ (39.6%) | 1.51 (25.9%) |
| 100 mg QD | 9 | 3910 (35.6%) | 2 (1, 4) | 22000 (37.2%) | 52400 (39.7%) | 0.968$^c$ (63.0%) | 22.2$^c$ (33.9%) | 1.88 (42.8%) |
| 150 mg QD | 20 | 4680 (29.1%) | 2 (1, 8) | 28000 (29.6%) | 64400 (39.6%) | 1.36$^d$ (66.7%) | 18.1$^d$ (51.8%) | 1.74 (24.9%) |
| 200 mg QD | 99 | 5770 (47.7%) | 2 (1, 8) | 36900 (40.8%) | 91000 (42.0%) | 1.14$^e$ (61.8%) | 19.9$^e$ (56.2%) | 1.69$^h$ (29.6%) |
| 250 mg QD | 25 | 8100 (28.1%) | 2 (1, 4) | 49700 (31.3%) | 111000 (38.7%) | 1.26$^f$ (1.08%) | 17.4$^f$ (50.6%) | 1.68 (24.5%) |
| 300 mg QD | 17 | 10700 (26.6%) | 2 (1, 4) | 65800 (35.9%) | 158000 (49.2%) | 1.63$^g$ (42.5%) | 30.1$^g$ (102%) | 2.15 (31.2%) |

Abbreviations: $AUC_{0-24}$ = area under the concentration-time curve from time 0 to 24 hours; CL/F = apparent oral clearance; $C_{max}$ = maximum drug concentration, Geo mean = Geometrical mean, N = number of subjects; PK = pharmacokinetic; QD = once daily; CV = coefficient of variation; $T_{1/2}$ = half-life; $T_{max}$ = time of maximal plasma concentration.
$^a$N = 4,
$^b$N = 5,
$^c$N = 8,
$^d$N = 18,
$^e$N = 64,
$^f$N = 21,
$^g$N = 16,
$^h$N = 73
SDTM Transfer: Sep. 30$^{th}$ 2020.
Following administration of the recommended Phase 2 dose 200 mg QD, mean trough plasma levels of BTK-I exceeded the concentration required for 96% inhibition of BTK in vitro ($IC_{50}$ = 92 ng/mL, $IC_{96}$ = 2200 ng/mL).

Mean Patient Plasma Concentration Per Dose Over Time

| Dose (mg) | TIME (hr) | | | | | |
|---|---|---|---|---|---|---|
| | 0 | 1 | 2 | 4 | 8 | 24 |
| | Mean CONC ng/mL (SD) | | | | | |
| 25 | 262.60 (122.21) | 572.40 (194.09) | 649.80 (109.47) | 537.80 (75.10) | 495.40 (145.61) | 262.60 (122.21) |
| 50 | 571.17 (330.45) | 1154.00 (322.75) | 1296.67 (92.23) | 1168.67 (438.62) | 1015.33 (442.73) | 571.17 (330.45) |
| 100 | 1580.33 (718.86) | 2173.88 (1270.43) | 3673.75 (1312.36) | 2801.25 (780.36) | 2358.75 (563.19) | 1580.33 (718.86) |
| 150 | 1803.15 (860.64) | 3668.95 (1566.51) | 4636.50 (1228.38) | 3660.50 (788.13) | 3324.00 (1180.22) | 1803.15 (860.64) |
| 200 | 2767.94 (1569.89) | 4937.36 (2691.42) | 6163.26 (2892.76) | 5272.44 (1961.25) | 4664.65 (1677.87) | 2767.94 (1569.89) |
| 250 | 3160.36 (1632.99) | 6907.20 (2551.23) | 7869.60 (2303.02) | 6842.80 (2073.26) | 5501.20 (1904.55) | 3160.36 (1632.99) |
| 300 | 5514.35 (3058.59) | 9732.35 (2926.68) | 10663.89 (2946.39) | 8420.53 (2821.60) | 7509.47 (2794.90) | 5514.35 (3058.59) |

Date: 4 Sep. 2020.
Note:
Concentration at 24 hours was not measured, but was inferred based on predose.

Treatment-Emergent Adverse Events b Preferred Term—All Treated—Phase 1

| Preferred Term | 25 mg QD (N = 5) n(%) | 50 mg QD (N = 6) n(%) | 100 mg QD (N = 9) n(%) | 150 mg QD (N = 20) n(%) | 200 mg QD (N = 238) n(%) | 250 mg QD (N = 25) n(%) | 300 mg QD (N = 20) n(%) | Overall (N = 323) n (%) |
|---|---|---|---|---|---|---|---|---|
| Subjects with Any TEAEs | 5 (100.0) | 6 (100.0) | 8 (88.9) | 20 (100.0) | 181 (6.1) | 25 (100.0) | 19 (95.0) | 264 (81.7) |
| Fatigue | 3 (60.0) | 3 (50.0) | 2 (22.2) | 3 (15.0) | 39 (16.4) | 10 (40.0) | 5 (25.0) | 65 (20.1) |
| Diarrhoea | 3 (60.0) | 1 (16.7) | 3 (33.3) | 5 (25.0) | 33 (13.9) | 5 (20.0) | 5 (20.0) | 55 (17.0) |
| Contusion | 0 (0.0) | 2 (33.3) | 0 (0.0) | 3 (15.0) | 28 (11.8) | 5 (20.0) | 4 (20.0) | 42 (13.0) |
| Nausea | 2 (40.0) | 2 (33.3) | 1 (11.1) | 1 (5.0) | 16 (6.7) | 5 (20.0) | 3 (15.0) | 30 (9.3) |
| Cough | 3 (60.0) | 2 (33.3) | 0 (0.0) | 3 (15.0) | 15 (6.3) | 3 (12.0) | 3 (15.0) | 29 (9.0) |
| Headache | 2 (40.0) | 1 (16.7) | 1 (11.1) | 4 (20.0) | 14 (5.9) | 3 (12.0) | 4 (20.0) | 29 (9.0) |
| Dyspnoea | 0 (0.0) | 0 (0.0) | 2 (22.2) | 2 (10.0) | 16 (6.7) | 2 (8.0) | 4 (20.0) | 26 (8.0) |
| Constipation | 0 (0.0 | 0 (0.0) | 0 (0.0) | 5 (25.0) | 14 (5.9) | 3 (12.0) | 3 (15.0) | 25 (7.7) |
| Anaemia | 0 (0.0) | 0 (0.0) | 2 (22.2) | 3 (15.0) | 16 (6.7) | 2 (8.0) | 1 (5.0) | 24 (7.4) |
| Neutropenia | 0 (0.0) | 1 (16.7) | 0 (0.0) | 4 (20.0) | 15 (6.3) | 1 (4.0) | 3 (5.0) | 24 (7.4) |
| Pyrexia | 1 (0.0) | 0 (0.0) | 1 (11.1) | 1 (5.0) | 17 (7.1) | 2 (8.0) | 1 (5.0) | 23 (7.1) |
| Upper respiratory tract infection | 1 (20.0) | 3 (50.0) | 1 (11.1) | 7 (35.0) | 3 (1.3) | 6 (24.0) | 2 (10.0) | 23 (7.1) |
| Back pain | 0 (0.0) | 0 (0.0) | 0 (0.0) | 5 (25.0) | 14 (5.9) | 3 (2.0) | 3 15.0) | 25 (7.7) |
| Oedema peripheral | 1 (20.0) | 1 (16.7) | 0 (0.0) | 3 (15.0) | 14 (5.9) | 2 (8.0) | 1 (5.0) | 22 (6.8) |
| Neutrophil count decreased | 1 (20.0) | 0 (0.0) | 0 (0.0) | 3 (15.0) | 10 (4.2) | 3 (2.0) | 5 (25.0) | 22 (6.8) |

-continued

| Preferred Term | 25 mg QD (N = 5) n(%) | 50 mg QD (N = 6) n(%) | 100 mg QD (N = 9) n(%) | 150 mg QD (N = 20) n(%) | 200 mg QD (N = 238) n(%) | 250 mg QD (N = 25) n(%) | 300 mg QD (N = 20) n(%) | Overall (N = 323) n (%) |
|---|---|---|---|---|---|---|---|---|
| Rash maculopapular | 0 (0.0) | 0 (0.0) | 1 (11.1) | 2 (10.0) | 12 (5.0) | 2 (8.0) | 3 (5.0) | 20 (6.2) |
| Abdominal pain | 1 (20.0) | 0 (0.0) | 2 (2.2) | 1 (5.0) | 14 (5.9) | 0 (0.0) | 2 (10.0) | 20 (6.2) |
| Dizziness | 2 (40.0) | 0 (0.0) | 1 (11.1) | 2 (10.0) | 10 (4.2) | 1 (4.0) | 2 (10.0) | 18 (5.6) |

Data cutoff date: 24 Oct. 2020.

Data cutoff date: 24 Oct. 2020.

Additional Embodiments

Embodiment 1. A method of treating cancer or an autoimmune disease in a patient in need thereof comprising administering to the patient a daily dose of between about 120 mg and about 600 mg of a compound which is (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof.

Embodiment 2. The method according to embodiment 1 wherein the method is treating cancer.

Embodiment 3. The method according to either embodiment 1 or 2 wherein the dose is between about 125 mg and about 600 mg.

Embodiment 4. A method of inhibiting proliferation and/or survival of activated B-cells in a patient suffering from a BTK-mediated cancer, comprising: orally administering to the patient suffering from the BTK-mediated cancer a therapeutically effective amount of a compound which is (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof, on a continuous daily dose regimen until progression of the BTK-mediated cancer or unacceptable toxicity occurs,
wherein the therapeutically effective amount of the compound or salt thereof is an amount that results in greater than 90 percent inhibition of BTK at steady state in the patient 24 hours following administration and wherein proliferation and survival of the activated B-cells are inhibited.

Embodiment 5. A method of inhibiting proliferation and/or survival of activated B-cells in a patient suffering from a BTK-mediated cancer, comprising: orally administering to the patient suffering from the BTK-mediated cancer a therapeutically effective amount of a compound which is (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof, on a continuous daily dose regimen until progression of the BTK-mediated cancer or unacceptable toxicity occurs,
wherein said administration of the therapeutically effective amount results in an AUC$_{(0-2)}$ of greater than or equal to about 52400 ng*h/mL; and
wherein said administration of the therapeutically effective amount results in an exposure of greater than or equal to about 806 ng/mL twenty-four hours following said administration.

Embodiment 6. The method according to any one of embodiments 1 to 5 wherein the compound is (S)-5-amino-3-(4-((5-fluoro-2-methoxybenzamido)methyl)phenyl)-1-(1,1,1-trifluoropropane-2-yl)-1H-pyrazole-4-carboxamide.

Embodiment 7. The method according to any one of embodiments 1 to 6 wherein the dose is administered daily for a 28-day cycle.

Embodiment 8. The method according to any one of embodiments 1 to 2 or 4 to 7 wherein a maximum dose administered per day is between about 120 and about 300 mg.

Embodiment 9. The method according to any one of embodiments 1 to 8 wherein the dose is between about 125 mg and about 300 mg.

Embodiment 10. The method according to any one of embodiments 1 to 9 wherein the dose is between about 150 mg and about 300 mg.

Embodiment 11. The method according to any one of embodiments 1 to 10 wherein the dose is between about 175 mg and about 300 mg.

Embodiment 12. The method according to any one of embodiments 1 to 11 wherein the dose is between about 200 mg and about 300 mg.

Embodiment 13. The method according to any one of embodiments 1 to 10 wherein the dose is about 150 mg.

Embodiment 14. The method according to any one of embodiments 1 to 12 wherein the dose is about 200 mg.

Embodiment 15. The method according to any one of embodiments 1 to 12 wherein the dose is about 300 mg.

Embodiment 16. The method according to embodiment 14 wherein the dose is reduced to 100 mg.

Embodiment 17. The method according to either embodiment 14 or 16 wherein the dose is reduced to 50 mg.

Embodiment 18. The method according to any one of embodiments 1 to 17 wherein the cancer is B-cell non-Hodgkin lymphoma.

Embodiment 19. The method according to embodiment 18 wherein the B-cell non-Hodgkin lymphoma is low-grade B-cell non-Hodgkin lymphoma with transformation.

Embodiment 20. The method according to embodiment 18 wherein the B-cell non-Hodgkin lymphoma is B-cell non-Hodgkin lymphoma with CNS involvement or is a primary CNS lymphoma.

Embodiment 21. The method according to any one of embodiments 1 to 17 wherein the cancer is mantle cell lymphoma.

Embodiment 22. The method according to embodiment 21 wherein the mantle cell lymphoma is blastoid mantle cell lymphoma.

Embodiment 23. The method according to embodiment 21 wherein the mantle cell lymphoma is non-blastoid mantle cell lymphoma.

Embodiment 24. The method according to embodiment 21 wherein the mantle cell lymphoma is with an overexpression of cyclin D1 and/or t(11;14).

Embodiment 25. The method according to any one of embodiments 1 to 17 wherein the cancer is chronic lymphocytic leukemia/small lymphocytic lymphoma.

Embodiment 26. The method according to either embodiment 21 or 25 wherein the patient has Richter's transformation.

Embodiment 27. The method according to either embodiment 21 or 25 wherein the patient has a 17p deletion.

Embodiment 28. The method according to any one of embodiments 21, 25, or 27 wherein the patient has a TP53 mutation.

Embodiment 29. The method according to embodiment 25 wherein the patient has an 11q deletion.

Embodiment 30. The method according to embodiment 25 wherein the patient has unmutated IGHV.

Embodiment 31. The method according to any one of embodiments 1 to 17 wherein the cancer is diffuse large B-cell lymphoma.

Embodiment 32. The method according to embodiment 31 wherein the diffuse large B-cell lymphoma is double hit.

Embodiment 33. The method according to embodiment 31 wherein the diffuse large B-cell lymphoma is double expressor.

Embodiment 34. The method according to any one of embodiments 1 to 17 wherein the cancer is marginal zone lymphoma.

Embodiment 35. The method according to any one of embodiments 1 to 17 wherein the cancer is Waldenstrom's macroglobulinemia.

Embodiment 36. The method according to embodiment 35 wherein the patient has a MYD88 mutation.

Embodiment 37. The method according to embodiment 35 wherein the patient has a CXCR4 mutation.

Embodiment 38. The method according to any one of embodiments 1 to 17 wherein the cancer is multiple myeloma.

Embodiment 39. The method according to any one of embodiments 1 to 17 wherein the cancer is follicular lymphoma.

Embodiment 40. The method according to any one of embodiments 1 to 17 wherein the cancer is B-cell prolymphocytic leukemia.

Embodiment 41. The method according to any one of embodiments 1 to 17 wherein the cancer is hairy cell leukemia.

Embodiment 42. The method according to any one of embodiments 1 to 41 wherein the patient is relapsed or refractory.

Embodiment 43. The method according to any one of embodiments 1 to 41 wherein the patient is treatment naive.

Embodiment 44. The method according to any one of embodiments 1 to 42 wherein the patient received at least one prior anti-cancer therapy.

Embodiment 45. The method according to embodiment 44 wherein the patient received at least one prior anti-cancer therapy that includes at least one BTK inhibitor based therapy.

Embodiment 46. The method according to any one of embodiments 1 to 42 or 44 wherein the patient received no prior anti-cancer therapy containing a BTK inhibitor.

Embodiment 47. The method according to any one of embodiments 1 to 42 or 44 to 46 wherein the patient received one prior anti-cancer therapy.

Embodiment 48. The method according to any one of embodiments 1 to 42 or 44 to 46 wherein the patient received two prior anti-cancer therapies.

Embodiment 49. The method according to any one of embodiments 1 to 42 or 44 to 46 wherein the patient received more than two prior anti-cancer therapies.

Embodiment 50. The method according to any one of embodiments 1 to 49 which further comprises the simultaneous, separate, or sequential administration with a BCL-2 inhibitor and/or an anti-CD20 based therapy.

Embodiment 51. The method according to embodiment 50 wherein the BCL-2 inhibitor is venetoclax.

Embodiment 52. The method according to embodiment 50 wherein the BCL-2 inhibitor is BCL2-I or a pharmaceutically acceptable salt thereof.

Embodiment 53. The method according to any one of embodiments 50 to 52 wherein the anti-CD20 based therapy is rituximab.

Embodiment 54. The method according to any one of embodiments 50 to 52 wherein the anti-CD20 based therapy is R-CHOP Embodiment 55. The method according to any one of embodiments 50 to 52 wherein the anti-CD20 based therapy is obinutuzumab.

Embodiment 56. A compound which is (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof for use in the treatment of cancer or an autoimmune disease wherein the compound or salt is administered at a daily dose of between about 120 mg and about 600 mg.

Embodiment 57. The compound or salt for use according to embodiment 56 wherein the use is in the treatment is cancer.

Embodiment 58. The compound or salt for use according to either embodiment 56 or 57 wherein the dose is between about 125 mg and about 600 mg.

Embodiment 59. A compound which (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof for use in inhibiting proliferation and/or survival of activated B-cells in a patient suffering from a BTK-mediated cancer, wherein the compound or salt is orally administered to the patient suffering from the BTK-mediated cancer a therapeutically effective amount of the compound or salt, on a continuous daily dose regimen until progression of the BTK-mediated cancer or unacceptable toxicity occurs, wherein the therapeutically effective amount of the compound or salt is an amount that results in greater than 90 percent inhibition of BTK at steady state in the patient 24 hours following administration and wherein proliferation and survival of the activated B-cells are inhibited.

Embodiment 60. A compound which is (S)-5-amino-3-(4-((5-fluoro-2-methoxybenzamido)methyl)phenyl)-1-(1,1,1-trifluoropropane-2-yl)-1H-pyrazole-4-carboxamide or a pharmaceutically acceptable salt thereof for use in inhibiting proliferation and/or survival of activated B-cells in a patient suffering from a BTK-mediated cancer, comprising: orally administering to the patient suffering from the BTK-mediated cancer a therapeutically effective amount of the compound or salt thereof, on a continuous daily dose regimen until progression of the BTK-mediated cancer or unacceptable toxicity occurs, wherein said administration of the therapeutically effective amount results in an $AUC_{(0-2)}$ of greater than or equal to about 52400 ng*h/mL; and wherein said administration of the therapeutically effective amount results in an exposure of greater than or equal to about 806 ng/mL twenty-four hours following said administration.

Embodiment 61. The compound or salt for use according to any one of embodiments 56 to 60 which is (S)-5-amino-3-(4-((5-fluoro-2-methoxybenzamido)methyl)phenyl)-1-(1,1,1-trifluoropropane-2-yl)-1H-pyrazole-4-carboxamide.

Embodiment 62. The compound or salt for use according to any one of embodiments 56 to 61 wherein the dose is administered daily for a 28-day cycle.

Embodiment 63. The compound or salt for use according to any one of embodiments 56 to 57 and embodiments 59 to 62 wherein a maximum dose administered per day is between about 120 mg and about 300 mg.

Embodiment 64. The compound or salt for use according to any one of embodiments 56 to 63 wherein the dose is between about 125 mg and about 300 mg.

Embodiment 65. The compound or salt for use according to any one of embodiments 56 to 64 wherein the dose is between about 150 mg and about 300 mg.

Embodiment 66. The compound or salt for use according to any one of embodiments 56 to 65 wherein the dose is between about 175 mg and about 300 mg.

Embodiment 67. The compound or salt for use according to any one of embodiments 56 to 66 wherein the dose is between about 200 mg and about 300 mg.

Embodiment 68. The compound or salt for use according to any one of embodiments 56 to 65 wherein the dose is about 150 mg.

Embodiment 69. The compound or salt for use according to any one of embodiments 56 to 67 wherein the dose is about 200 mg.

Embodiment 70. The compound or salt for use according to any one of embodiments 56 to 67 wherein the dose is about 300 mg.

Embodiment 71. The compound or salt for use according to embodiment 69 wherein the dose is reduced to 100 mg.

Embodiment 72. The compound or salt for use according to either embodiment 69 or 71 wherein the dose is reduced to 50 mg.

Embodiment 73. The compound or salt for use according to any one of embodiments 56 to 72 wherein the cancer is B-cell non-Hodgkin lymphoma.

Embodiment 74. The compound or salt for use according to embodiment 73 wherein the B-cell non-Hodgkin lymphoma is low-grade B-cell non-Hodgkin lymphoma with transformation.

Embodiment 75. The compound or salt for use according to embodiment 73 wherein the B-cell non-Hodgkin lymphoma is B-cell non-Hodgkin lymphoma with CNS involvement or is a primary CNS lymphoma.

Embodiment 76. The compound or salt for use according to any one of embodiments 56 to 72 wherein the cancer is mantle cell lymphoma.

Embodiment 77. The compound or salt for use according to embodiment 76 wherein the mantle cell lymphoma is blastoid mantle cell lymphoma.

Embodiment 78. The compound or salt for use according to embodiment 76 wherein the mantle cell lymphoma is non-blastoid mantle cell lymphoma.

Embodiment 79. The compound or salt for use according to embodiment 76 wherein the mantle cell is with overexpression of cyclin D1 and/or t(11;14).

Embodiment 80. The compound or salt for use according to any one of embodiments 56 to 72 wherein the cancer is chronic lymphocytic leukemia/small lymphocytic lymphoma.

Embodiment 81. The compound or salt for use according to either embodiment 76 or 80 wherein the compound or salt is administered to a patient that has Richter's transformation.

Embodiment 82. The compound or salt for use according to either embodiment 76 or 80 wherein the compound or salt is administered to a patient that has a 17p deletion.

Embodiment 83. The compound or salt for use according to any one of embodiments 76, 80 or 82 wherein the compound or salt is administered to a patient that has a TP53 mutation.

Embodiment 84. The compound or salt for use according to embodiment 80 wherein the compound or salt is administered to a patient that has an 11q deletion.

Embodiment 85. The compound or salt for use according to embodiment 80 wherein the compound or salt is administered to a patient that has unmutated IGHV.

Embodiment 86. The compound or salt for use according to any one of embodiments 56 to 72 wherein the cancer is diffuse large B-cell lymphoma.

Embodiment 87. The compound or salt for use according to embodiment 86 wherein the diffuse large B-cell lymphoma is double hit.

Embodiment 88. The compound or salt for use according to embodiment 86 wherein the diffuse large B-cell lymphoma is double expressor.

Embodiment 89. The compound or salt for use according to any one of embodiments 56 to 72 wherein the cancer is marginal zone lymphoma.

Embodiment 90. The compound or salt for use according to any one of embodiments 56 to 72 wherein the cancer is Waldenstrom's macroglobulinemia.

Embodiment 91. The compound or salt for use according to embodiment 90 wherein the compound or salt is administered to a patient having a MYD88 mutation.

Embodiment 92. The compound or salt for use according to embodiment 90 wherein the compound or salt is administered to a patient having a CXCR4 mutation.

Embodiment 93. The compound or salt for use according to any one of embodiments 56 to 72 wherein the cancer is multiple myeloma.

Embodiment 94. The compound or salt for use according to any one of embodiments 56 to 72 wherein the cancer is follicular lymphoma.

Embodiment 95. The compound or salt for use according to any one of embodiments 56 to 72 wherein the cancer is B-cell prolymphocytic leukemia.

Embodiment 96. The compound or salt for use according to any one of embodiments 56 to 72 wherein the cancer is hairy cell leukemia.

Embodiment 97. The compound or salt for use according to any one of embodiments 56 to 96 wherein the compound or salt is administered to a patient who is relapsed or refractory.

Embodiment 98. The compound or salt for use according to any one of embodiments 56 to 96 wherein the compound or salt is administered to a patient who is treatment naive.

Embodiment 99. The compound or salt for use according to any one of embodiments 56 to 97 wherein the compound or salt is administered to a patient who received at least one prior anti-cancer therapy.

Embodiment 100. The compound or salt for use according to embodiment 99 wherein the compound or salt is administered to a patient who received at least one prior anti-cancer therapy that includes at least one BTK inhibitor based therapy.

Embodiment 101. The compound or salt for use according to any one of embodiments 56 to 97 or 99 wherein the compound or salt is administered to a patient who received no prior anti-cancer therapy containing a BTK inhibitor.

Embodiment 102. The compound or salt for use according to any one of embodiments 56 to 97 or 99 to 101 wherein the compound or salt is administered to a patient who received one prior anti-cancer therapy.

Embodiment 103. The compound or salt for use according to any one of embodiments 56 to 97 or 99 to 101 wherein the compound or salt is administered to a patient who received two prior anti-cancer therapies.

Embodiment 104. The compound or salt for use according to any one of embodiments 56 to 97 or 99 to 101 wherein the compound or salt is administered to a patient who received more than two prior anti-cancer therapies.

Embodiment 105. The compound or salt for use according to any one of embodiments 56 to 104 wherein the compound or salt is administered in simultaneous, separate, or sequential administration with a BCL-2 inhibitor and/or an anti-CD20 based therapy.

Embodiment 106. The compound or salt for use according to embodiment 105 wherein the BCL-2 inhibitor is venetoclax.

Embodiment 107. The compound or salt for use according to embodiment 105 wherein the BCL-2 inhibitor is BCL2-I or a pharmaceutically acceptable salt thereof.

Embodiment 108. The compound or salt for use according to any one of embodiments 105 to 107 wherein the anti-CD20 based therapy is rituximab.

Embodiment 109. The compound or salt for use according to any one of embodiments 105 to 107 wherein the anti-CD20 based therapy is R-CHOP.

Embodiment 110. The compound or salt for use according to any one of embodiments 105 to 107 wherein the anti-CD20 based therapy is obinutuzumab.

We claim:

1. A method of treating low-grade B-cell non-Hodgkin lymphoma (NHL) with Richter's transformation in a patient in need of treatment thereof, comprising administering to the patient a compound which is(S)-5-amino-3-(4-((5-fluoro-2-methoxybenzamido)methyl)phenyl)-1-(1,1,1-trifluoropropane-2-yl)-1H-pyrazole-4-carboxamide, or a pharmaceutically acceptable salt thereof.

2. The method according to claim 1, wherein the low-grade B-cell NHL is chronic lymphocytic leukemia (CLL)/small lymphocytic lymphoma (SLL).

3. The method according to claim 1, wherein the low-grade B-cell NHL is CLL.

4. The method according to claim 1, wherein the low-grade B-cell NHL is SLL.

5. The method according to claim 1, wherein the compound or pharmaceutically acceptable salt thereof is administered at a daily dose of 200 mg.

6. The method according to claim 2, wherein the compound or pharmaceutically acceptable salt thereof is administered at a daily dose of 200 mg.

7. The method according to claim 3, wherein the compound or pharmaceutically acceptable salt thereof is administered at a daily dose of 200 mg.

8. The method according to claim 4, wherein the compound or pharmaceutically acceptable salt thereof is administered at a daily dose of 200 mg.

* * * * *